United States Patent
Madabhushi et al.

(10) Patent No.: US 9,292,933 B2
(45) Date of Patent: Mar. 22, 2016

(54) METHOD AND APPARATUS FOR SHAPE BASED DEFORMABLE SEGMENTATION OF MULTIPLE OVERLAPPING OBJECTS

(76) Inventors: Anant Madabhushi, South Plainfield, NJ (US); Sahirzeehan Ali, Houston, TX (US)

(*) Notice: Subject to any disclaimer, the term of this patent is extended or adjusted under 35 U.S.C. 154(b) by 101 days.

(21) Appl. No.: 13/978,763

(22) PCT Filed: Jan. 10, 2012

(86) PCT No.: PCT/US2012/020816
§ 371 (c)(1),
(2), (4) Date: Sep. 2, 2014

(87) PCT Pub. No.: WO2012/096988
PCT Pub. Date: Jul. 19, 2012

(65) Prior Publication Data
US 2015/0030219 A1    Jan. 29, 2015

Related U.S. Application Data

(60) Provisional application No. 61/431,297, filed on Jan. 10, 2011, provisional application No. 61/435,615, filed on Jan. 24, 2011.

(51) Int. Cl.
*G06K 9/00* (2006.01)
*G06T 7/00* (2006.01)

(52) U.S. Cl.
CPC .......... *G06T 7/0089* (2013.01); *G06T 7/0083* (2013.01); *G06T 7/0087* (2013.01); *G06T 7/0097* (2013.01); *G06T 2207/20081* (2013.01); *G06T 2207/20116* (2013.01); *G06T 2207/20124* (2013.01); *G06T 2207/20152* (2013.01); *G06T 2207/30024* (2013.01); *G06T 2207/30096* (2013.01)

(58) Field of Classification Search
None
See application file for complete search history.

(56) References Cited

U.S. PATENT DOCUMENTS

| 7,171,036 B1 * | 1/2007 | Liu | G06T 7/0006 382/145 |
| 2003/0053667 A1 * | 3/2003 | Paragios | G06T 7/0083 382/128 |

(Continued)

OTHER PUBLICATIONS

Dambreville et al, Nonlinear Shape Prior from Kernel Space for Geometric Active Contours, Image Processing: Algorithms and Systems, Neural Networks, and Machine Learning edited by E.R. Dougherty, J.T. Astola, K.O. Egiazarian, N. M. Nasrabadi, S.A. Rizvi Proc. of SPIE-IS&T Electronic Imaging, SPIE vol. 6064, 2008.*

(Continued)

*Primary Examiner* — Andrae S Allison
(74) *Attorney, Agent, or Firm* — Fox Rothschild LLP

(57) ABSTRACT

The present invention provides a system and method for simultaneous variational and adaptive segmentation of single non-overlapping and multiple overlapping/occluded-objects in an image scene. The method according to the present invention synergistically combines shape priors with boundary and region-based active contours in a level set formulation with a watershed scheme for model initialization for identifying and resolving multiple object overlaps in an image scene. The method according to the present invention comprises learning a shape prior for a target object of interest and applying the shape prior into a hybrid active contour model to segment overlapping and non-overlapping objects simultaneously.

44 Claims, 15 Drawing Sheets

(56) References Cited

U.S. PATENT DOCUMENTS

| | | | |
|---|---|---|---|
| 2003/0228032 A1* | 12/2003 | Rui | G06K 9/00234 382/103 |
| 2004/0019467 A1 | 1/2004 | Paragios et al. | |
| 2005/0226506 A1 | 10/2005 | Aharon et al. | |
| 2007/0014462 A1* | 1/2007 | Rousson | G06T 7/0081 382/128 |
| 2007/0031003 A1 | 2/2007 | Cremers | |
| 2007/0099219 A1 | 5/2007 | Teverovskiy et al. | |
| 2007/0160277 A1* | 7/2007 | Slabaugh | G06K 9/342 382/128 |
| 2008/0075375 A1* | 3/2008 | Unal | G06K 9/621 382/243 |
| 2008/0144917 A1* | 6/2008 | Liu | G01N 21/956 382/141 |
| 2009/0052756 A1* | 2/2009 | Saddi | G06K 9/6209 382/131 |
| 2009/0054740 A1* | 2/2009 | Gudmundsson | G06F 19/3443 600/300 |
| 2009/0067693 A1* | 3/2009 | Shinagawa | G06T 7/0012 382/128 |
| 2010/0067775 A1 | 3/2010 | Marcelpoil et al. | |
| 2010/0098306 A1 | 4/2010 | Madabhushi et al. | |
| 2010/0131432 A1 | 5/2010 | Kennedy et al. | |
| 2012/0230572 A1* | 9/2012 | Kohlberger | G06K 9/6209 382/131 |
| 2013/0077842 A1* | 3/2013 | El-Zehiry | G06T 7/0081 382/131 |

OTHER PUBLICATIONS

Derraz, F.; Taleb-Ahmed, A.; Pinti, A.; Chikh, A.; Bereksi-Reguig, F., "A Geometrical Active Contour Based on Statistical Shape Prior Model," in Signal Processing and Information Technology, 2008. ISSPIT 2008. IEEE International Symposium on , vol., No., pp. 432-436, Dec. 16-19, 2008.*

T. F. Chan and L. A. Vese. Active contours without edges. IEEE Transactions on Image Processing, 10: 266-277, 2001.*

* cited by examiner (a)　　　(b)　　　(c)

(a)

(b)

METHOD AND APPARATUS FOR SHAPE BASED DEFORMABLE SEGMENTATION OF MULTIPLE OVERLAPPING OBJECTS

CROSS-REFERENCE TO RELATED APPLICATIONS

This application is the US. National Phase of International patent application Ser. No. PCT/US2012/020816, filed Jan. 10, 2012, which claims priority from U.S. provisional patent application Ser. No. 61/431,297, entitled "Method and apparatus for shape based deformable segmentation of multiple overlapping objects", tiled Jan. 10, 2011, and U.S. provisional patent application Ser. No. 61/435,615, entitled "Method and apparatus for shape based deformable segmentation of multiple overlapping objects", filed Jan. 24, 2011. The disclosure of each of these applications is incorporated herein by reference in its entirety.

FIELD OF THE INVENTION

This invention relates to the use of prior knowledge within level set representations that can be used in conjunction with computer vision applications, such as, segmentation, tracking, and reconstruction, that are used in various domains, for example, medical, surveillance, and automotive. This invention can be integrated with an existing, data-driven variational method and system capable of performing image segmentation for physically corrupted and incomplete data.

BACKGROUND OF THE INVENTION

Active contours and active shape models (ASM) have been widely employed in image segmentation. ASMs are, however, limited in their inability to (a) resolve boundaries of intersecting objects and (b) to handle occlusion. Multiple overlapping objects are typically segmented out as a single object. In addition, ASMs are limited by point correspondence issues, since object landmarks need to be identified across multiple objects for initial object alignment. ASMs also are constrained in that they can usually only segment a single object in an image and hence are unable to resolve multiple overlapping objects.

Statistical Shape Models (SSM) (Cootes, T. F. et al., "Active Shape Models—Their Training and Application," Computer Vision and Image Understanding, January 1995, 61(1): 38-59) and Active Contours (AC) have been used heavily to segment objects of interest in an array of applications involving biomedical imaging. (Veltri, R. W. et al., "Nuclear Roundness Variance Predicts Prostate Cancer Progression, Metastasis, and Death: A Prospective Evaluation With up to 25 Years of Follow-Up After Radical Prostatectomy," The Prostate, 2010, 70, 1333-1339; Fatakdawala, H. et al., "Expectation Maximization driven Geodesic Active Contour with Overlap Resolution (EMaGACOR): Application to Lymphocyte Segmentation on Breast Cancer Histopathology," Biomedical Engineering, IEEE Transactions on, 2010, 57(7): 1676-1689).

In recent years, shape based active contour models have emerged as a way to overcome overlap resolution. However, most of these shape-based methods are limited to finding and resolving one object overlap per scene and require user intervention for model initialization. A fundamental problem when computing SSMs is the determination of correspondences between training instances of the object of interest, especially when the surfaces are represented by point clouds. (Cootes, T. F. et al., "Active Shape Models—Their Training and Application," Computer Vision and Image Understanding, January 1995, 61(1): 38-59). Often, homologies between the points are assumed, which might lead to an imprecise model of the shape.

A number of deformable segmentation schemes have been developed to date. They can be divided into two categories: boundary-based (first generation) and region-based (second generation) models.

Boundary-based approaches such as geodesic/geometric active contours (ACs) are popular for their reliable performance and fast computation. (Kass, M. et al., "Snakes: active contour models," International Journal of Computer Vision, 1987, pp. 321-331; Caselles, V. et al., "Geodesic active contours," Int. J. Comput. Vision, 1997, 22(1): 61-79; Kichenassamy, S. wt al., "Conformal curvature flows: From phase transitions to active vision," In Archive for Rational Mechanics and Analysis, 1996, 134(3): 275-301, 1996). However, as only the edge information is utilized, their performance is limited by the strength of the image gradient. Such boundary-based models are typically unable to handle object occlusion or scene clutter.

AC models based on edge/boundary detection are typically referred to as the first generation of active contours. (Kass, M. et al., "Snakes: active contour models," International Journal of Computer Vision, 1987, pp. 321-331; Caselles, V. et al., "Geodesic active contours," Int. J. Comput. Vision, 1997, 22(1): 61-79).

Kass et al. described a boundary-based geodesic active contour model. According to the Kass et al. model, the segmentation of any object in a given image, which is well discernible and whose edges can be described by a closed curve, is equivalent to the location of sharp image intensity variations by iteratively deforming a curve $\mathscr{C}$ towards the edges of the object. Such a model is entirely dependent on the chosen parametrization of the initial curve $\mathscr{C}(p)=(x(p), y(p)) \in \Omega, p \in [0,1]$ Caselles et al. described a method to solve the parametrization dependency problem with the Geodesic Active Contour (GAC) model. Caselles et al. introduced a new intrinsic energy functional which is independent of the initial curve parametrization, and minimization of which results in a geodesic in Riemannian space. The associated evolution equation can be written as $\partial_t C = F \cdot \mathscr{N}$, where F is a speed term derived from an energy functional and $\mathscr{N}$ is the exterior unit normal vector to the curve $\mathscr{C}$. $\partial_t$ is the partial derivative at an instance of time t. C represents a two-dimensional Cartesian grid of pixels $c=(x, y)$.

To overcome limitations associated with topological changes of object boundaries, such as splitting and merging, the evolution curve is handled by a level set method described by Osher et al. (Osher, S. et al., "Fronts propagating with curvature-dependent speed: algorithms based on Hamilton-Jacobi formulations," Journal of Computational Physics, 1988, 79(1): 12-49). The level set method includes representing the curve as the level zero of a higher dimensional function $\phi$, which is often a signed distance function. Thus, each active contour (AC) or active shape within a given training set of sample shapes is embedded as a zero level set of a higher dimensional surface. A Signed Distance Function (SDF) is a functional that depends on the AC providing the boundaries. The level set function $\phi$ evolves in time as: $\partial_t \phi = F \cdot |\Delta \phi|$ and the interface at the level zero corresponds to the model's evolving contour.

However, the use of edge-based active contours in segmentation methods is limited because of high sensitivity to noise, requiring careful initialization. To overcome such limitations, segmentation models based on region statistics such as mean, variance, and probability density functions (PDFs) have been developed.

Chan (2005) proposed a 2-phase segmentation method based on a mean descriptor where the AC evolves in such a way that the difference between the gray level intensity average between the foreground and the background was maximized. (Chan, T. "Level set based shape prior segmentation," IEEE Computer Society Conference on Computer Vision and Pattern Recognition, 2005, 2: 1164-1170). Region-based approaches rely on statistics obtained from the entire region. Color or textural attributes being often employed to detect the object. (Chan, T. F. et al., "Active contours without edges," IEEE Trans. on Image Processing, 2001, 10(2): 266-277). However, these models typically require far more computations and, like the boundary-based approaches, are limited in their ability to deal with object occlusions and scene clutter.

Third generation AC models involve combining a shape prior with geometric/geodesic active contours that simultaneously achieves registration and segmentation. A number of methods incorporating various shape priors into active contour formulation to resolve overlaps have been described.

Cootes et al. (1995) described a principal component analysis (PCA) method to capture the main shape variations of parametric active contours (active shapes) within a training set and thus to represent the prior shape information. (Cootes, T. F. et al., "Active Shape Models—Their Training and Application," Computer Vision and Image Understanding, January 1995, 61(1): 38-59). Consequently, the Cootes et al. model is not parametrization free.

Leventon, et al. described a method of introducing prior shape information into AC, intrinsically represented by level set functions. Such a method applies PCA on the signed distance functions (SDF) of the parametric Geodesic Active Contours (GACs). (Leventon et al., "Statistical shape influence in geodesic active contours," in CVJR, 2000, pp. 316-323). Such a feature allows construction of an intrinsic and parametrization free shape model. SDFs have the additional advantage that they are more robust to slight misalignments of the training sequence compared to parametric curves. However, the shape functions resulting from a PCA are not exactly SDFs, but are nonetheless used in practice since they are close to real SDFs. Rousson et al (2002) described a method for introducing shape priors into level set representations targeting 2D closed structures. (Rousson, M. et al., "Shape priors for level set representation," European Conference on Computer Vision, 2002, pp. 78-92).

Chan described a method of combining a statistical shape prior with geometric/geodesic active contours via a variational model that allows for simultaneous registration and segmentation. (Chan, T., "Level set based shape prior segmentation", IEEE Computer Society Conference on Computer Vision and Pattern Recognition, 2005, 2: 1164-1170). Bresson, et al. (Bresson, X. et al., "A priori information in image segmentation: energy functional based on shape statistical model and image information," IEEE Int. Conf. on Image Processing, September 2003, 3: 425-428) described a method integrating a geometric shape prior described in Leventon et al. (Leventon et al., "Statistical shape influence in geodesic active contours," in CVJR, 2000, pp. 316-323) into the segmentation framework based on AC as well as on a region driven energy term described in Chan (Chan, T. "Level set based shape prior segmentation," IEEE Computer Society Conference on Computer Vision and Pattern Recognition, 2005, 2: 1164-1170). Paragios et al. (Paragios, N. et al., "Unifying boundary and region-based information for geodesic active tracking," IEEE Conference on Computer Vision and Pattern Recognition, 1999, 2: 300-305) and Rousson et al (Rousson, M. et al., "Shape priors for level set representation," European Conference on Computer Vision, 2002, pp. 78-92) describe a method of computing signed distance functions of the training images and capturing the statistics of the signed distance training set via the PCA method. Such a method assumes that the probability distribution function (PDF) of the training set is Gaussian.

A limitation of third generation AC models is that they introduce shape priors into a level set framework in such a way that usually only one pair of overlapping objects can be accurately resolved into independent shapes within an image scene. (Fang, W. et al., "Statistical Shape Influence in Geodesic Active Contours," IEEE Conference on Computer Vision and Pattern, 2007, 40(8): 2163-2172; Bresson, X. et al., "A priori information in image segmentation: energy functional based on shape statistical model and image information," IEEE Int. Conf. on Image Processing, September 2003, 3: 25-428) Further, all third generation AC methods are sensitive to model initialization and typically require varying degrees of user intervention.

The flexibility of the level set method has traditionally resulted in long computation times (up to several hours for large images with several thousand structures to segment) and therefore of limited practical utility in dealing with very large histopathological images. As a result, processing times in a clinical setting may be impractical. Thus there is a clear need to accelerate these segmentation schemes by using a parallel algorithm executed on a Graphical Processing Unit (GPU). Lefohn et al. (Lefohn A. E. et al., "GPU based, three-dimensional level set solver with curvature flow," Technical report uucs-02-017, School of Computing, University of Utah, (2002)) and Tejada et al. (Tejada E. et al., "Large steps in GPU-based deformable bodies simulation," Simulat Model Pract Theory, 2005, 13(8):703-715) describe a method using graphical processing unit (GPU) architectures employing higher-level segmentation approaches, such as deformable models, by considering implicit deformable models such as image lattices (e.g. a 2D curve is implicitly represented as the iso-value of a field encoded as a 2D image). Level-sets approaches became particularly popular in the GPU-segmentation community as significant speed-ups and interactive rendering were made available. Geodesic active contours, which are a combination of traditional active contours (snakes) and level-sets evolution, were efficiently implemented in GPU by using the total variation formulation, mostly to quickly segment structures by foreground and background separation in 2D images. (Schmid, J. et al., "A GPU framework for parallel segmentation of volumetric images using discrete deformable model," The Visual Computer, 2011, 27(2): 85-95). Ruiz et al. described a GPU accelerated segmentation schemes with applications to biomedical histopathology. (Ruiz, A. et al., "Pathological image segmentation for neuroblastoma using the GPU," Biomedical Imaging: From Nano to Macro, IEEE International Symposium on, pp. 296-299, (2008).)

In the rapidly emerging field of digital pathology, the ability to segment multiple objects, especially the ability to deal with object overlap and occlusion, is highly critical in the context of a number of different diagnostic and prognostic applications. (Gurcan, M. et al., "Histopathological Image Analysis: A Review," IEEE Reviews in Biomedical Engineering, 2009, 2: 147-171; Madabhushi, A, "Digital Pathology Image Analysis: Opportunities and Challenges," (Editorial), Imaging in Medicine, 2009, 1(1): 7-10).

Currently, the diagnosis of diseases, such as prostate cancer and breast cancer, is done manually by visual analysis of tissue samples, typically obtained from a patient via biopsy. (Fatakdawala, H. et al., "Expectation Maximization driven Geodesic Active Contour with Overlap Resolution (EMaGACOR): Application to Lymphocyte Segmentation on Breast Cancer Histopathology," Biomedical Engineering, IEEE Transactions on, 2010, 57(7): 1676-1689; Basavanhally, A. et al., "Computerized Image-Based Detection and Grading of Lymphocytic Infiltration in HER2+ Breast Cancer Histopathology," Biomedical Engineering, IEEE Transactions on, 2010, 57 (3): 642-653). The architectural arrangement of nuclear and glandular structures on histopathology is highly relevant in the context of disease grading. (Fatakdawala, H. et al., "Expectation Maximization driven Geodesic Active Contour with Overlap Resolution (EMaGACOR): Application to Lymphocyte Segmentation on Breast Cancer Histopathology," Biomedical Engineering, IEEE Transactions on, 2010, 57(7): 1676-1689; Doyle, S. et al., "Automated Grading of Prostate Cancer using Architectural and Textural Image Features," International Symposium on Biomedical Imaging (ISBI), 2007, pp. 1284-87; Basavanhally, A. et al., "Computerized Image-Based Detection and Grading of Lymphocytic Infiltration in HER2+ Breast Cancer Histopathology," Biomedical Engineering, IEEE Transactions on, 2010, 57 (3): 642-653).

Cancer grade in the context of breast and prostate cancer is a key feature used to predict patient prognosis and in prescribing a treatment. (Gurcan, M. et al., "Histopathological Image Analysis: A Review," IEEE Reviews in Biomedical Engineering, 2009, 2: 147-171). While grading systems exist in the context of both breast cancer and prostate cancer, manual grading is time consuming and prone to human errors due to observer variability and can lead to variable prognosis and suboptimal treatment. Automated segmentation and quantification of nuclear and glandular structures is critical for classification and grading of cancer. (Fatakdawala, H. et al., "Expectation Maximization driven Geodesic Active Contour with Overlap Resolution (EMaGACOR): Application to Lymphocyte Segmentation on Breast Cancer Histopathology," Biomedical Engineering, IEEE Transactions on, 2010, 57(7): 1676-1689; Doyle, S. et al., "Automated Grading of Prostate Cancer using Architectural and Textural Image Features," International Symposium on Biomedical Imaging (ISBI), 2007, pp. 1284-87).

In the context of prostate cancer (CaP), pathologists grade histopathological specimens by visually characterizing gland morphology and architecture in regions they suspect are malignant. The Gleason grading system is used to describe CaP aggressiveness; lower Gleason grade structures, such as glands, are medium-sized with round shapes, while in higher Gleason grade patterns, such as glands, tend to be small and have irregular shapes. Gleason grading ranges from very well differentiated (grade 1) to very poorly differentiated (grade 5). Doyle, et al. (2007) showed that spatial graphs (eg. Voronoi, Delaunay, minimum spanning tree) built using nuclei as vertices in digitized histopathology images yielded a set of quantitative feature that allowed for improved separation between intermediate gleason patterns. (Doyle, S. et al., "Automated Grading of Prostate Cancer using Architectural and Textural. Image Features," International Symposium on Biomedical Imaging (ISBI), 2007, pp. 1284-87). Veltri, et al. (2010) showed that nuclear shape and morphology was reflective of disease aggressiveness and patient outcome. (Veltri, R. W. et al., "Nuclear Roundness Variance Predicts Prostate Cancer Progression, Metastasis, and Death: A Prospective Evaluation With up to 25 Years of Follow-Up After Radical Prostatectomy," The Prostate, 2010, 70, 1333-1339). Both of these methods require accurate segmentation of prostate nuclei as an initial step, but had previously employed manual or semi-automated approaches.

Lymphocyte Infiltration (LI) has been identified as an important prognostic marker of outcome in Her2+ breast cancer and in other diseases as well. (Basavanhally, A. et al., "Computerized Image-Based Detection and Grading of Lymphocytic Infiltration in HER2+ Breast Cancer Histopathology," Biomedical Engineering, IEEE Transactions on, 2010, 57 (3): 642-653; Zhang, L. et al., "Intratumoral T Cells, Recurrence, and Survival in Epithelial Ovarian Cancer," New England. Journal of Medicine, 2003, 348(3): 203-213). Lymphocyte segmentation in hematoxylin and eosin (H&E) stained BC histopathology images is complicated by the similarity in appearance between lymphocyte nuclei and other structures (e.g., cancer nuclei) in the image. This may lead to incorrect determination of the extent of LI. Automated detection and quantification of these structures on histopathology imagery could potentially result in the development of a digital prognostic tool for predicting patient outcome (and hence deciding treatment strategies). However, an automated lymphocyte or nuclear detection algorithm on H&E images has to be able to deal with (1) variability in digital slide appearance due to inconsistencies in histological staining, (2) poor image quality with tissue samples due to slide digitization, and (3) tissue fixation. Moreover, LI may be characterized by a high density of lymphocytes or nuclei, which can cause significant overlap among lymphocyte nuclei and other structures on the H&E images. Such a method often results in adjacent nuclei visually appearing as one single lymphocyte. Basavanhally, et al. quantified the extent of lymphocytic infiltration (LI) in HER2+ breast cancers using a nuclear detection and graph feature based approach. (Basavanhally, A. et al., "Computerized Image-Based Detection and Grading of Lymphocytic Infiltration in HER2+ Breast Cancer Histopathology," Biomedical Engineering, IEEE Transactions on, 2010, 57 (3): 642-653). Fatakdwala, et al. combined an expectation maximization scheme with an explicit concavity based overlap resolution scheme to separate overlapping lymphocytic nuclei. (Fatakdawala, H. et al., "Expectation Maximization driven Geodesic Active Contour with Overlap Resolution (EMaGACOR): Application to Lymphocyte Segmentation on Breast Cancer Histopathology," Biomedical Engineering, IEEE Transactions on, 2010, 57(7): 1676-1689).

The present invention provides a method for segmenting single non-overlapping objects or multiple overlapping/occluded objects in an image scene via a hybrid adaptive active contour model. The method synergistically combines shape priors with boundary and region-based active contours in a level set formulation with a watershed scheme for model initialization for identifying and resolving multiple object overlaps in an image scene. The method comprises learning a shape prior for a target object of interest and applying the shape prior into a hybrid active contour model to segment overlapping and non-overlapping objects simultaneously.

The hybrid active contour model is able to handle overlaps between multiple intersecting and adjacent objects and is implemented through a graphical processing unit (GPU) framework comprises representing active contours of an object in an image scene using the level set method. The level set method comprises representing the contour implicitly as the zero level of a higher dimensional embedding function, and performing contour propagation by evolving the embedding function by minimizing variational energy. The method allows ease of handling of topological changes of object boundary such as splitting or merging. By leveraging the commodity GPU, the segmentation method provides real-time speed ups, which are otherwise masked by latencies incurred due to the complexities of the algorithm.

SUMMARY

According to one aspect, the described invention provides a method for segmenting single non-overlapping objects or multiple overlapping/occluded objects in an image scene via a hybrid adaptive active contour model incorporating shape priors, which comprises: (a) inputting the image scene via a computing device; (b) collecting a plurality of shapes via the computing device, wherein the shapes correspond to the objects in the image scene; (c) determining a set of alignment parameters via the computing device, by performing a similarity transformation; (d) aligning the plurality of collected shapes in (b) via the computing device to create a plurality of aligned shapes, such that the plurality of aligned shapes have the same pose compared to a reference shape based on the similarity transformation of (b); (e) creating a training set via the computing device, wherein the training set comprises the plurality of aligned shapes in (d), wherein each aligned shape of the plurality of aligned shapes is embedded as a zero level set of a higher dimensional surface; (f) generating a shape prior via the computing device; (g) integrating a shape term via the computing device, wherein each aligned shape of the plurality of aligned shapes is embedded as the zero level set of the higher dimensional surface, and wherein the shape term is a signed distance function (SDF) used to encode the distance of the shape contour of each aligned shape to the nearest point in the shape space of the higher dimensional surface; (h) integrating a boundary-based term via the computing device to direct the hybrid adaptive active contour model to a boundary of at least one object of the objects in the image scene; (i) integrating a region homogeneity term via the computing device, wherein the region homogeneity term drives the shape term towards a homogeneous intensity region using the shape prior; (j) initializing the hybrid adaptive active contour model via the computing device by a watershed transformation method comprising delineating object boundaries of at least one target object in the image scene; (k) performing contour propagation of the delineated shape boundaries via the computing device by evolving the integrated synergistic shape functional by minimizing variational energy; and (l) achieving final segmentation of the image scene via the computing device. According to one embodiment of the method, step (f) generating a shape prior via the computing device comprises: (i) minimizing the probability distribution function (PDF) of the training set, (ii) computing a similarity transform of the shape prior, and (iii) encoding the similarity transform of the shape prior into the hybrid active contour model. According to another embodiment, step (h) integrating a boundary-based term via the computing device to direct the hybrid adaptive active contour model to a boundary of at least one object of the objects in the image scene is by changing a size of a principle axis with a Gaussian probability function to generate the shape, and encoding the shape described by a Signed Distance Function (SDF). According to another embodiment, the watershed transformation method in step (j) comprising delineating object boundaries of at least one target object in the image scene further comprises: (1) creating a binary mask enclosing the target object to form a closed sub-contour surrounding the target object; (2) detecting concavity points in the at least one target object by comparing an area enclosed within the closed sub-contour surrounding the at least one target object with a predetermined area of a reference object; (3) determining a number of the detected concavity points; and (4) ascertaining a condition of the at least one target object based on the determined number of concavity points, such that the determined number of concavity points is equal to the number of overlapping target objects in the image scene, wherein the condition of the at least one target object is selected from the group consisting of: (i) the at least one target object in the image scene includes a single non-overlapping object or (ii) the at least one target object in the image scene includes multiple overlapping/occluded objects; (5) selecting at least one energy functional selected from the group consisting of (A) the shape term, (B) the boundary-based term, (C) the region homogeneity term, or a combination thereof, based on the ascertained condition of the at least one target object such that if the ascertained condition is (i), the region homogeneity term is selected; or if the ascertained condition is (ii), the shape term, the boundary-based term, and the region homogeneity term are selected; (6) combining the at least one selected energy functional with the shape prior to yield at least one initial level set described by an integrated synergistic shape functional; and (7) placing the at least one initial level set on the at least one target object in the image scene. According to another embodiment, in (5), if the ascertained condition of the at least one target object is (i), the region homogeneity term is selected. According to another embodiment, in (5) if the ascertained condition of the at least one target object is (ii), the shape term, the boundary-based term, and the region homogeneity term are selected. According to another embodiment, (h) integrating a boundary-based term via the computing device to direct the hybrid adaptive active contour model to a boundary of at least one object of the objects in the image scene is by changing a size of a principle axis with a Gaussian probability function by applying Principle Component Analysis (PCA). According to another embodiment, the method resolves multiple overlapping/occluded objects simultaneously in a histopathology sample. According to another embodiment, the overlapping/occluded objects in the histopathology sample comprise nuclear and glandular structures. According to another embodiment, the overlapping/occluded objects in the histopathology sample comprise lymphocytes and nuclei. the method resolves segment overlapping/occluded lymphocytes and nuclei in the histopathology sample with at least 90% accuracy. According to another embodiment, the histology sample is prepared from a patient with a cancer. According to another embodiment, the cancer is selected from prostate cancer or breast cancer. According to another embodiment, the hybrid adaptive active model is implemented through a graphical processing unit (GPU) framework. According to another embodiment, run time for completion of the segmenting method is in a range of from 70 seconds to 80 seconds. According to another embodiment, the method further comprises classifying the image scene, by: (m) extracting from the segmented objects via the computing device, at least one signature feature and computing at least one quantitative signature for the image scene; (n) selecting, via the computing device, at least one reference feature in a dataset comprising reference features according to a minimum Redundancy Maximum Relevance (mRMR) feature selection scheme to identify a selected subset of reference features; (o) discriminating, via the computing device, the at least one quantitative signature feature of the image scene from the selected subset of reference features to identify a class corresponding to the image scene; and (p) outputting, via the computing device, the class corresponding to the image scene. According to another embodiment, the at least one signature feature is selected from the group consisting of nuclear morphology, nuclear architecture, nuclear texture, and a combination thereof. According to another embodiment, the at least one quantitative signature feature is selected from the group consisting of nuclear morphology, nuclear architecture, nuclear texture, and a combination thereof. According to another embodiment, the class corresponding to the image scene is a grade of the cancer. According to another embodiment, the grade of the cancer is selected from the group consisting of Gleason grade 1, Gleason grade 2, Gleason grade 3, Gleason grade 4 or Gleason grade 5. According to another embodiment, the cancer is selected from prostate cancer or breast cancer. According to another embodiment, the hybrid adaptive active model of claim 1 is implemented through a graphical processing unit (GPU) framework. According to another embodiment, run time for completion of the classifying method is within a range of between 70 seconds to 80 seconds.

According to another aspect, the described invention provides a system for segmenting single non-overlapping objects or multiple overlapping/occluded objects in an image scene via a hybrid adaptive active contour model incorporating shape priors, comprising: (a) a computing device configured to input the image scene; (b) the computing device configured to collect a plurality of shapes, wherein the shapes correspond to the objects in the image scene; (c) the computing device configured to determine a set of alignment parameters by performing a similarity transformation; (d) the computing device configured to align the plurality of collected shapes in (b) to create a plurality of aligned shapes, such that the plurality of aligned shapes have the same pose compared to a reference shape based on the similarity transformation of (b); (e) the computing device configured to create a training set, wherein the training set comprises the plurality of aligned shapes in (d), wherein each aligned shape of the plurality of aligned shapes is embedded as a zero level set of a higher dimensional embedding function describing a surface; (f) the computing device configured to generate a shape prior; (g) the computing device configured to integrate a shape term, wherein each aligned shape of the plurality of aligned shapes is embedded as the zero level set of the higher dimensional surface, and wherein the shape term is a signed distance function (SDF) used to encode the distance of the shape contour of each aligned shape to the nearest point in the shape space of the higher dimensional surface; (h) the computing device configured to integrate a boundary-based term to direct the hybrid adaptive active contour model to a boundary of at least one object of the objects in the image scene; (i) the computing device configured to integrate a region homogeneity term, wherein the region homogeneity term drives the shape term towards a homogeneous intensity region using the shape prior; (j) the computing device configured to initialize the hybrid adaptive active contour model by a watershed transformation method comprising delineating object boundaries of at least one target object in the image scene, (k) the computing device configured to perform contour propagation of the delineated shape boundaries by evolving the integrated synergistic shape functional by minimizing variational energy; and (l) the computing device configured to achieve final segmentation of the image scene. According to one embodiment, the computing device (h) configured to integrate the boundary-based term to direct the hybrid adaptive active contour model to a boundary of the at least one object of the objects in the image scene, is further configured to change a size of a principle axis with a Gaussian probability function by applying Principle Component Analysis (PCA). According to another embodiment, the computing device (j) configured to initialize the hybrid adaptive active contour model by the watershed transformation method comprising the computing device configured to delineate object boundaries of at least one target object in the image scene, is further configured: (1) to create a binary mask enclosing the target object to form a closed sub-contour surrounding the target object; (2) to detect concavity points in the at least one target object by comparing an area enclosed within the closed sub-contour surrounding the at least one target object with a predetermined area of a reference object; (3) to determine a number of the detected concavity points; (4) to ascertain a condition of the at least one target object based on the determined number of concavity points, such that the determined number of concavity points is equal to the number of overlapping target objects in the image scene, wherein the condition of the at least one target object is selected from: (i) the at least one target object in the image scene includes a single non-overlapping object or (ii) the at least one target object in the image scene includes multiple overlapping/occluded objects; (5) to select at least one energy functional selected from the group consisting of (A) the shape term, (B) the boundary-based term, (C) the region homogeneity term, or a combination thereof, based on the ascertained condition of the at least one target object; (6) to combine the at least one selected energy functional with the shape prior to yield at least one initial level set described by an integrated synergistic shape functional; and (7) to place the at least one initial level set on the at least one target object in the image scene. According to another embodiment, in (5), if the ascertained condition of the at least one target object is (i), the region homogeneity term is capable of being selected. According to another embodiment, in (5) if the ascertained condition of the at least one target object is (ii), the shape term, the boundary-based term, and the region homogeneity term are capable of being selected. According to another embodiment, the computing device (h) configured to integrate the boundary-based term to direct the hybrid adaptive active contour model to a boundary of the at least one object of the objects in the image scene is further configured to change a size of a principle axis with a Gaussian probability function by applying Principle Component Analysis (PCA). According to another embodiment, the system is capable of resolving multiple overlapping/occluded objects simultaneously in a histopathology sample. According to another embodiment, the overlapping/occluded objects in the histopathology sample comprise nuclear and glandular structures. According to another embodiment, the overlapping/occluded objects in the histopathology sample comprise lymphocytes and nuclei. According to another embodiment, the system is capable of resolving segment overlapping/occluded lymphocytes and nuclei in the histopathology sample with at least 90% accuracy. According to another embodiment, the histology sample is prepared from a patient with a cancer. According to another embodiment, the cancer is selected from prostate cancer or breast cancer. According to another embodiment, the hybrid adaptive active model is capable of being implemented through a graphical processing unit (GPU) framework. According to another embodiment, run time for completion of the segmenting method is in a range of from 70 seconds to 80 seconds. According to another embodiment, the computing device is capable of classifying the image scene, and is further configured: (m) to extract from the segmented objects via the computing device, at least one signature feature and computing at least one quantitative signature for the image scene; (n) to select at least one reference feature in a dataset comprising reference features according to a minimum Redundancy Maximum Relevance (mRMR) feature selection scheme to identify a selected subset of reference features; (o) to discriminate the at least one quantitative signature feature of the image scene from the selected subset of reference features to identify a class corresponding to the image scene; and (p) to output the class corresponding to the image scene. According to another embodiment, the at least one signature feature is selected from the group consisting of nuclear morphology, nuclear architecture, nuclear texture, and a combination thereof. According to another embodiment, the at least one quantitative signature feature is selected from the group consisting of nuclear morphology, nuclear architecture, nuclear texture, and a combination thereof. According to another embodiment, the class corresponding to the image scene is a grade of the cancer. According to another embodiment, the grade of the cancer is selected from the group consisting of Gleason grade 1, Gleason grade 2, Gleason grade 3, Gleason grade 4 or Gleason grade 5. According to another embodiment, the cancer is selected from prostate cancer or breast cancer. According to another embodiment, the hybrid adaptive active model of claim 1 is capable of being implemented through a graphical processing unit (GPU) framework. According to another embodiment, run time for completion of the classifying method is within a range of between 70 seconds to 80 seconds.

DETAILED DESCRIPTION

Glossary

Figure 1:
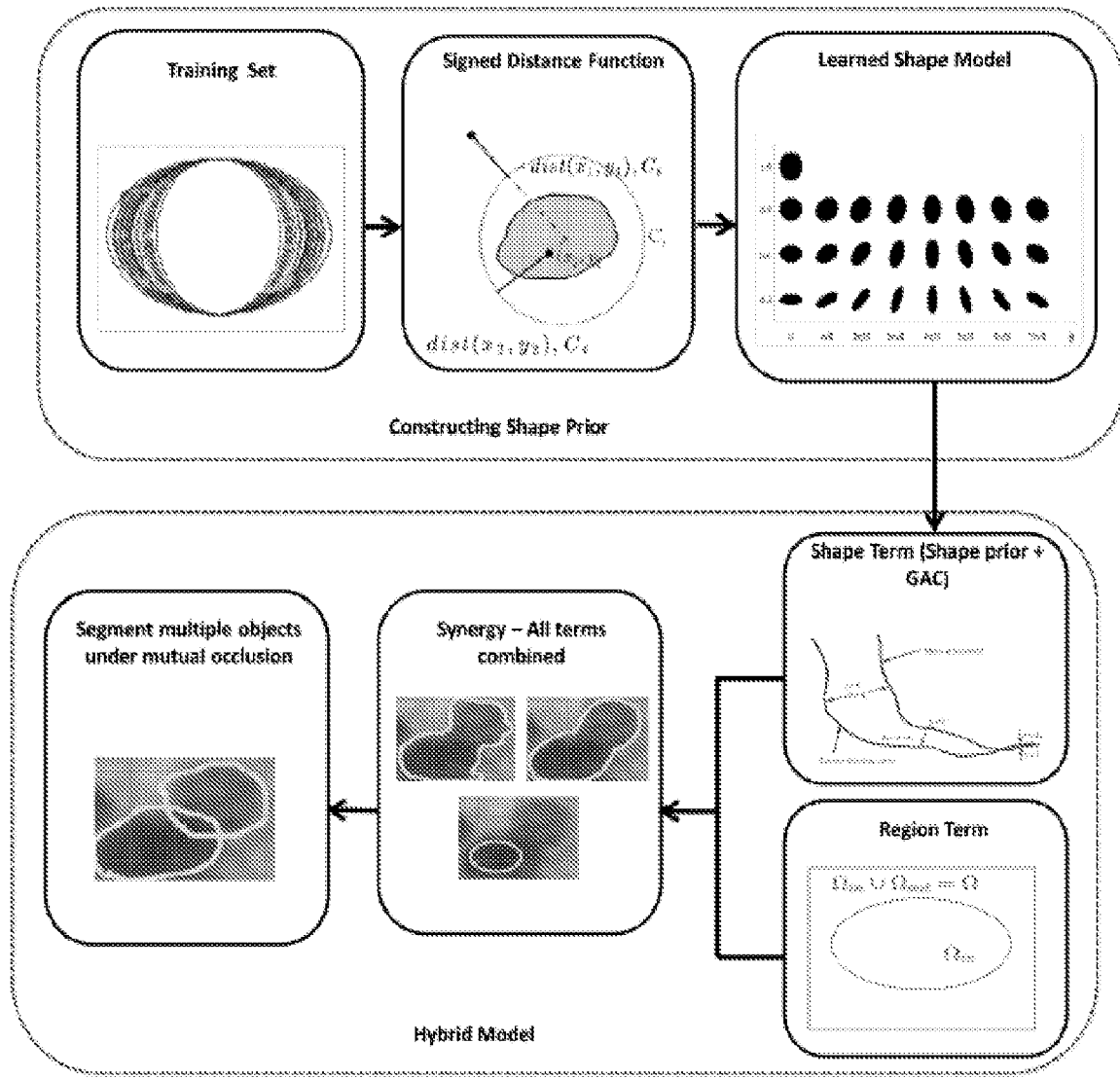
FIG. 1 is a flow chart showing the steps of the method for segmenting single non-overlapping objects or multiple overlapping/occluded objects in an image scene.

The term "ASM" as used herein refers to an active shape model, also known as an active contour (AC) model or statistical shape model (SSM), for example as described in Kass et al. (Kass, M. et al., "Snakes: active contour models," International Journal of Computer Vision, 1987, pp. 321-331), Caselles et al. (Caselles, V. et al., "Geodesic active contours," Int. J. Comput. Vision, 1997, 22(1): 61-79), Kichenassamy et al. (Kichenassamy, S. wt al., "Conformal curvature flows: From phase transitions to active vision," In Archive for Rational Mechanics and Analysis, 1996, 134(3): 275-301, 1996), Cootes et al. (Cootes, T. F. et al., "Active Shape Models—Their Training and Application.", Computer Vision and Image Understanding, January 1995, 61(1): 38-59), Veltri et al. (Veltri, R. W. et al., "Nuclear Roundness Variance Predicts Prostate Cancer Progression, Metastasis, and Death: A Prospective Evaluation With up to 25 Years of Follow-Up After Radical Prostatectomy", The Prostate, 2010, 70, 1333-1339), Fatakdawala et al. (Fatakdawala, H. et al., "Expectation Maximization driven Geodesic Active Contour with Overlap Resolution (EMaGACOR): Application to Lymphocyte Segmentation on Breast Cancer Histopathology", Biomedical Engineering, IEEE Transactions on, 2010, 57(7): 1676-1689), etc.

The term "active contour" as used herein refers to a mathematical model for delineating an object outline/boundary from a noisy two-dimensional image.

The term "affine transformation" as used herein refers to a mathematical transformation that preserves straight lines. Exemplary affine transformations include but are not limited to translation, rotation and scale.

The term "BC" as used herein refers to breast cancer.

The term "binary mask" refers to an image where all pixels except for the foreground are unity and all background pixels are zero. A binary mask converts an image to black and white wherein the object of interest is white and the rest of the image is black.

The term "boundary-based term" as used herein refers to a functional $F_{boundary}$ described as: $F_{boundary}=\int_\Omega g(f(x))|\nabla H(\phi)|dx$, where g is an edge detecting function, $f(x)$ is the data (image), and $\nabla H(\phi)$ denotes the gradient of Heaviside function $\phi$ is a level set.

The term "CaP" as used herein refers to prostate cancer.

The term "contour" as used herein refers to shape of an object that segments object boundaries. An object in an image scene is inherently associated with a contour.

The term "CUDA" as used herein refers to Compute Unified Device Architecture, a GPU technology that allows for programming of the GPU without any graphics knowledge.

The term "Dirac function" as used herein refers to a function on a real line which is zero everywhere except at the origin, where it is infinite. A Dirac function $\delta(\phi)$ is described as:

$$\delta(\phi) = \begin{cases} +\infty, & \phi(c) = 0 \\ 0, & \phi(c) \neq 0 \end{cases},$$

where $\phi(c)$ is a level set function. A Dirac function is also referred to as a Dirac delta function or $\delta$ function.

The term "DRAM" as used herein refers to a type of random-access memory that stores each bit of data in a separate capacitor within an integrated circuit.

The term "EST" as used herein refers to a Euclidean Similarity Transformation (EST). An EST of a point $x_p$ into a point $x'_p$ is defined by the transformation described as in Equation (1): $x'_p=\alpha R x_p+T$ (1), wherein a is the isotropic scaling factor, R is the rotation matrix, and T is the translation vector. For each training shape, the set of parameters ($\alpha$, R, 7) is found in order to adjust the training shape to the same pose (i.e., same position, orientation and scale) as compared to a predefined reference shape, that is arbitrarily chosen.

The term "GAC" as used herein refers to a Geodesic Active Contour model, such as described in Caselles et al. (Caselles, V. et al., "Geodesic active contours," Int. J. Comput. Vision, 1997, 22(1): 61-79).

The term "GPU" as used herein refers to a graphical processing unit. A GPU, for example describes a processor, such as with a specialized circuit configured to rapidly manipulate and alter memory in such a way so as to accelerate the building of images in a frame buffer intended for output to a display at high processing speeds.

The term "grade" as used herein refers to describing the appearance of thin slices of cancer tissue when observed under a microscope.

The term "HD" as used herein refers to Hausdorff distance, a boundary-based metric, computed via a computing device, describing a delineated object in an image scene upon segmentation. Exemplary boundary-based metrics include but are not limited to mean absolute distance (MAD), area overlap metrics (true positive area ($TP_a$), false-positive area ($FP_a$), true-negative area ($TN_{60}$), and false-negative area ($FN_a$)).

The term "H&E" as used herein refers to hematoxylin and eosin staining of histopathology images.

The term "Heaviside function" as used herein refers to a function H, which is an integral of the Dirac delta function. Hence, $H'=\delta(\phi)$. The Heaviside function $H(\phi)$ is described as:

$$H(\phi) = \begin{cases} 1, & \phi(c) \geq 0; \\ 0, & \phi(c) < 0. \end{cases},$$

where $\phi(c)$ is a level set function.

The term "histological sample" as used herein refers to a sample prepared from an animal or plant tissue for sectioning, staining and diagnosis. Histological sample preparation includes steps such as processing, embedding, sectioning, fixing etc.

The term "integrated synergistic shape functional" as used herein refers to a functional F, according to the hybrid adaptive active contour model described in Equation (10): $F=F_1+F_{region}(\psi, u_{in}, u_{out})$, wherein the term, $F_1$ is related to a shape and boundary force term, defined as: $F_1=\delta_1 F_{boundary}(C)+\delta_2 F_{shape}(\phi,\psi)$, wherein and $\beta_1$ and $\beta_2$ are arbitrary positive constants that balance the contributions of the boundary-based, and shape terms, respectively.

The term "LI" as use herein refers to Lymphocyte Infiltration.

The term "MAD" as used herein refers to mean absolute distance, a boundary-based metric, computed via a computing device, describing a delineated object in an image scene upon segmentation. Exemplary boundary-based metrics include but are not limited to Hausdorff distance (HD), and area overlap metrics (true positive area ($TP_a$), false-positive area ($FP_a$), true-negative area ($TN_a$), and false-negative area ($FN_a$)).

The term "MS model" as used herein refers to a Mumford-Shah (MS) model used to segment objects with smooth intensity surface, as described in Chan et al., "Active contours without edges," IEEE TIP, vol. 10, no. 2, pp. 266-277, February 2001.

The term "mRMR" as used herein refers to a minimum Redundancy Maximum Relevance (mRMR) feature selection scheme as described in Peng et al. (Peng H, Long F, Ding C. Feature selection based on mutual information criteria of max-dependency, max-relevance, and min-redundancy. Pattern Analysis and Machine Intelligence, IEEE Transactions on 2005; 27:1226-1238), which is used to identify an ensemble of features, for example to allow for optimal classification of a histological sample, e.g. a prostate cancer histological sample into a Gleason grade 3 versus grade 4.

The term "pose" as used herein refers to position, orientation and scale.

The term "PCA" as used herein refers to a principal component analysis method to capture the main shape variations of parametric active contours (active shapes) within a training set and thus to represent the prior shape information, such as described in Cootes et al. (Cootes, T. F. et al., "Active Shape Models—Their Training and Application," Computer Vision and Image Understanding, January 1995, 61(1): 38-59).

The term "PDF" as used herein refers to a probability distribution function or a probability density function. A PDF is for example, a Gaussian or normal function, such as describing a continuous probability distribution or a bell-shaped probability density curve.

The term "QDA classifier" as used herein refers to a quadratic discriminant analysis classifier that finds, via a computing device, a transformation of the input features that is able to optimally discriminate between the classes in the dataset.

The term "RD" as used herein refers to a Rousson shape-based model described in Rousson et al. (Rousson M. et al., "Shape priors for level set representation," European Conference on Computer Vision, pp. 78-92, 2002).

The term "region homogeneity term" as used herein refers to a functional $F_{region}$ described as in Equation (8) incorporating the shape function $\psi$ and statistics of partitioned foreground and background regions, $u_{in}$ and $u_{out}$:
$F_{region}(\psi, u_{in}, u_{out}) = \int_\Omega \Theta_{in} H_\psi dx + \int_\Omega \Theta_{out} H_{-\psi} dx$ (8), where $\psi$ is the shape prior, and $H(\cdot)$ is a Heaviside function, $\Theta_r$, defined as: $\Theta_r = |I - u_r|^2 + \mu |\nabla u_r|^2$ and $r \in \{in, out\}$.

The term "SDF" as used herein refers to a Signed Distance Function. SDF is a level set function, computed using a level set method that applies PCA and introduces prior shape information into ACs that are intrinsically represented by the level set functions, such as described in Leventon et al. (Leventon et al., "Statistical shape influence in geodesic active contours," in CVJR, 2000, pp. 316-323).

The term "segmentation" as used herein refers to a process of relating individual volumetric pixels in a volumetric scan of a tissue type, based on properties of observed intensities and anatomical knowledge about normal subjects. (Leventon et al., "Statistical shape influence in geodesic active contours," in CVJR, 2000, pp. 316-323).

The term "shape prior" as used herein refers to a prior shape information obtained by a probabilistic approach computed variation of shape over a given set of training samples. The shape prior is then incorporated into the process of segmenting an object into an image to build a shape model.

The term "shape term" as used herein refers to a functional $F_{shape}$ described in Equation (7) as: $F_{shape} = \int_\Omega (\phi(x) - \psi(x))^2 |\nabla \phi| \delta(\phi) dx$ (7), where $\phi(x)$ is a level set function, $\psi(x)$ is the shape prior, $\delta(\phi)$ is a Dirac function, and is a contour measure on $\{\phi = 0\}$.

The term "SSM" as used herein refers to a statistical shape model that incorporates the PCA method to capture the main shape variations of parametric active contours (active shapes) within a training set and thus to represent the prior shape information.

The term "synergistic" as used herein refers to as combined.

Method for Segmenting Objects

The present invention provides a method for simultaneous segmentation of single non-overlapping and multiple overlapping/occluded objects in an image scene using a hybrid adaptive active contour model that requires minimal user intervention and that segments all overlapping and non-overlapping objects simultaneously. The hybrid adaptive active contour model is able to handle overlaps between multiple intersecting and adjacent objects. The method synergistically combines shape priors with boundary and region-based active contours in a level set formulation with a watershed scheme for model initialization for identifying and resolving multiple object overlaps in an image scene. The method allows ease of handling of topological changes of object boundary such as splitting or merging.

According to one aspect, the method for segmenting single non-overlapping objects or multiple overlapping/occluded objects in an image scene via a hybrid adaptive active contour model incorporating shape priors via a computing device, comprises:
  (a) collecting and aligning shapes, via the computing device;
  (b) constructing a shape prior model via the computing device;
  (c) creating training data via the computing device, wherein each shape in a training sample is embedded as a zero level set of a higher dimensional surface;
  (d) generating a shape prior via the computing device by (i) changing a size of a principle axis with a Gaussian probability function (ii) encoding the shape, described by a Signed Distance Function (SDF); and (iii) applying Principle Component Analysis (PCA) to create a statistical shape model (SSM);
  (e) integrating, via the computing device, an active contour formulation via the computing device, wherein each shape in the training sample is embedded as the zero level set of a higher dimensional surface, wherein the signed distance function (SDF) is used to encode the distance to the nearest point in the shape;
  (f) driving, via the computing device, the shape prior model towards a homogeneous intensity region using the shape prior;
  (g) combining shape-based, boundary-based, and region-based functionals via the computing device; and
  (h) resolving, via the computing device, overlaps between multiple intersecting objects.

According to one embodiment, the method for segmenting single non-overlapping objects or multiple overlapping/occluded objects in an image scene via a hybrid adaptive active contour model incorporating shape priors, comprises:
  (a) inputting the image scene via a computing device;
  (b) collecting a plurality of shapes via the computing device, wherein the shapes correspond to the objects in the image scene;
  (c) determining a set of alignment parameters via the computing device, by performing a similarity transformation;
  (d) aligning the plurality of collected shapes in (b) via the computing device to create a plurality of aligned shapes, such that the plurality of aligned shapes have the same pose compared to a reference shape based on the similarity transformation of (b);
  (e) creating a training set via the computing device, wherein the training set comprises the plurality of aligned shapes in (d), wherein each aligned shape of the plurality of aligned shapes is embedded as a zero level set of a higher dimensional surface;
  (f) generating a shape prior via the computing device;
  (g) integrating a shape term via the computing device, wherein each aligned shape of the plurality of aligned shapes is embedded as the zero level set of the higher dimensional surface, and wherein the shape term is a signed distance function (SDF) used to encode the distance of the shape contour of each aligned shape to the nearest point in the shape space of the higher dimensional surface;

(h) integrating a boundary-based term via the computing device to direct the hybrid adaptive active contour model to a boundary of at least one object of the objects in the image scene;

(i) integrating a region homogeneity term via the computing device, wherein the region homogeneity term drives the shape term towards a homogeneous intensity region using the shape prior;

(j) initializing the hybrid adaptive active contour model via the computing device by a watershed transformation method comprising delineating object boundaries of at least one target object in the image scene;

(k) performing contour propagation of the delineated shape boundaries via the computing device by evolving the integrated synergistic shape functional by minimizing variational energy; and (l) achieving final segmentation of the image scene via the computing device.

According to some embodiments, any object of interest can be segmented with trained shape prior of the object of interest, i.e., applications of the method are not limited to medical imaging. According to some embodiments, the object of interest that can be segmented with trained shape prior of the object of interest is a medical imaging application. According to some embodiments, the method resolves single non-overlapping objects or multiple overlapping/occluded objects simultaneously in the image scene of a histopathology sample. According to some embodiments, the histopathology sample is stained by a histochemical staining method. Exemplary histochemical staining methods include but are not limited to a monoclonal antibody, a polyclonal antibody, CD34, hematoxylin & eosin, Hoeschst stain, 4′,6-diamidino-2-phenylindole (DAPI), etc. According to some such embodiments, the single non-overlapping objects or multiple overlapping/occluded objects in the image scene of the histopathology sample comprise nuclear and glandular structures. According to some such embodiments, the single non-overlapping objects or multiple overlapping/occluded objects in the image scene of the histopathology sample comprises cells, nuclei, and a combination thereof. Exemplary cells include but are not limited to epithelial cells, breast cancer cells, prostate cancer cells, lung cancer cells, pancreatic cancer cells, colon cancer cells, bone cancer cells, lymphocytes, and any other pluripotent cancer cells. According to some embodiments, the method includes segmenting overlapping structures of microscopic light and confocal images, e.g., cells on microscopic light and confocal images. According to some such embodiments, the overlapping/occluded objects in the image scene of the histopathology sample include nuclei.

According to some embodiments, the method resolves single non-overlapping objects or multiple overlapping/occluded lymphocytes and nuclei in the histopathology sample with at least 90% accuracy.

According to one embodiment, the hybrid adaptive active contour model defines an energy functional, F, which is composed of three complimentary terms (A) a shape term, $F_{shape}$; (B) a boundary-based region homogeneity term, $F_{region}$; and (C) a region homogeneity term, $F_{region}$.

(a) Inputting the Image Scene Step

According to some embodiments, the method for segmenting single non-overlapping objects or multiple overlapping/occluded objects in an image scene via a hybrid adaptive active contour model comprises step (a) inputting the image scene via a computing device.

(b) Collecting a Plurality of Shapes Via a Computing Device Step

According to some embodiments, the method for segmenting single non-overlapping objects or multiple overlapping/occluded objects in an image scene via a hybrid adaptive active contour model comprises step (b) collecting a plurality of shapes via a computing device, wherein the shapes correspond to the objects in the image scene. According to some embodiments, the shapes in the image scene are curves, circles, ellipses, parabolas, hyperbolas, planes, polygons, any two-dimensional shape of interest or a combination thereof. According to one embodiment, the plurality of shapes in the image scene comprises a plurality of ellipses.

According to one embodiment, the image scene is a multi-dimensional image scene described by a multi-dimensional grid comprising grid cells and grid points. According to one embodiment, the image scene is a two-dimensional image scene described by a two-dimensional grid comprising grid cells and grid points. According to one embodiment, the image scene is a three-dimensional image scene described by a three-dimensional grid comprising grid cells and grid points.

According to another embodiment, the image scene is a two-dimensional image scene described by a two-dimensional M-by-N grid comprising grid cells and grid points, wherein the spacing between the grid cells is h, and wherein the grid points are $(x_i, y_j)=(i_h, j_h)$, such that $0 \leq i \leq M$ and $0 \leq j \leq N$, and $M=\{1, 2, \ldots n\}$ and $N=\{1, 2, \ldots n\}$. According to one embodiment, the image scene is a two-dimensional image scene described by a two-dimensional 256×256 grid. According to one embodiment, the image scene is a two-dimensional image scene described by a two-dimensional 512×512 grid.

According to one embodiment, the two-dimensional image scene $\mathcal{E}$ is defined as $\mathcal{E} =(c, f)$, where C is a two-dimensional (2D) grid comprising a plurality of pixels c, wherein $c \in C$, $C=(x, y)$ representing Cartesian coordinates of a pixel c. A function $f(c)$ assigns intensity values to pixel c, $c \in C$, and is defined as $f(c) \in \mathbb{R}^3$. For gray scale or scalar images, a function $f_g(c)$ assigns intensity values to pixel c, $c \in C$, and is defined as $f_g(c) \in \mathbb{R}$. $\mathbb{R}$ is set of real numbers that defines a 2D region.

(c) Determining a Set of Alignment Parameters Via the Computing Device Step

According to some embodiments, the method for segmenting single non-overlapping objects or multiple overlapping/occluded objects in an image scene via a hybrid adaptive active contour model comprises step (c) determining a set of alignment parameters via the computing device, by performing a similarity transformation.

According to one embodiment, the set of alignment parameters comprises an isotropic scaling factor, a translation vector, a rotation matrix, and a combination thereof. According to one embodiment, the alignment method comprises performing via the computing device a Euclidean Similarity Transformation (EST).

An EST of a point $x_p$ into a point $x'_p$ is defined by the transformation described as in Equation (1): $x'_p = \alpha R x_p + T$ (1), wherein $\alpha$ is the isotropic scaling factor, R is the rotation matrix, and T is the translation vector. For each training shape, the set of parameters $(\alpha, R, T)$ is found in order to adjust the training shape to the same pose (i.e., same position, orientation and scale) as compared to a predefined reference shape, that is arbitrarily chosen.

(d) Aligning the Plurality of Collected Shapes Via the Computing Device Step

According to some embodiments, the method for segmenting single non-overlapping objects or multiple overlapping/ occluded objects in an image scene via a hybrid adaptive active contour model comprises step (d) aligning the plurality of collected shapes via the computing device to create a plurality of aligned shapes, such that the plurality of aligned shapes have the same pose compared to a reference shape based on the similarity transformation of (b).

According to one embodiment, aligning step (d) comprises computing, via the computing device, the distance between the centroid of a target training shape $(x_i, y_i)$ and the centroid of a reference shape $(x_j, y_j)$ to determine the translation vector T, described as in Equation (2): $T=\sqrt{(x'_i-x_j)^2+(y'_i-y_j)^2}$. (2). According to one embodiment, the aligning step (d) comprises computing, via the computing device, the ratio of enclosed area of a reference shape $(A_{reference})$ over area of a target training shape $(A_{target})$ to determine the isotropic scaling factor $\alpha$, described as in Equation (3):

$$\alpha = \frac{|A_{reference}|}{|A_{target}|}. \quad (3)$$

According to one embodiment, aligning step (d) comprises computing, via the computing device, a rotation matrix $R(\theta)$, described as in Equation (4):

$$R(\theta) = \begin{bmatrix} \cos(\theta) & -\sin(\theta) \\ \sin(\theta) & \cos(\theta) \end{bmatrix}. \quad (4)$$

(e) Creating a Training Set Via the Computing Device Step

According to one embodiment, a level set method is employed for the purposes of model training. According to one embodiment, the method for segmenting single non-overlapping objects or multiple overlapping/occluded objects in an image scene via a hybrid adaptive active contour model comprises step (e) creating a training set via the computing device, wherein the training set comprises the plurality of aligned shapes, wherein each aligned shape of the plurality of aligned shapes is embedded as a zero level set of a higher dimensional surface. According to one embodiment, the training set comprises shapes which are view angle independent or less affected by view angles. According to one embodiment, the training set comprises shapes which are subject to affine transformations.

According to one embodiment, the at least one shape of the plurality of aligned shapes is embedded as a zero level set of a higher dimensional embedding function describing a surface. According to one embodiment, the points on the surface encode the distance to the nearest point in the shape, with negative distance inside and positive distance outside the shape. According to one embodiment, each aligned shape of the plurality of aligned shapes is embedded as the zero level set of the higher dimensional surface.

According to one embodiment, the level set function $\psi_i$ is a matrix (or signed distance function). According to one embodiment, the level set function $\psi_i$ is of the same size as the training shape template. According to one embodiment, the level set function $\psi_i$ is defined as in Equation (5):

$$\psi_i = \begin{cases} 0 & S, \\ -D((x, y), S) & (x, y) \in \Omega_f, \\ D((x \cdot y), S) & (x, y) \in \Omega_b \end{cases} \quad (5)$$

where $D((x, y), S)$ is a function that returns the minimum Euclidean distance between the grid pixel $(x, y)$; S is the shape contour; $\Omega_f$ is the foreground region; and $\Omega_b$ is the background region.

According to one embodiment, creating step (e) comprises converting the level set function $\psi_i$ into feature vectors. The level set function $\psi_i$ is rearranged into column vectors, which form a matrix $M=\psi_1, \psi_2, \ldots, \psi_n$, where M is a N×n matrix, N is the dimensionality of the feature vectors and n is the number of training samples. The dimensionality of the data is reduced by applying principal component analysis (PCA). Assuming that the probability density function (PDF) of the training set is Gaussian, then the PDF associated with the projected data is given as in Equation (6):

$$P(x_{pca}) = \frac{1}{(2\pi)^{p/2}|\wedge_p|^{1/2}} \exp\left(-\frac{1}{2}x_{pca}^T \wedge_p^{-1} x_{pca}\right), \quad (6)$$

where $x_{pca}$ represents projected data from PCA and $\wedge_p$ is a diagonal matrix containing the first p eigenvalues.

(f) Generating a Shape Prior Via the Computing Device Step

According to one embodiment, the method for segmenting single non-overlapping objects or multiple overlapping/occluded objects in an image scene via a hybrid adaptive active contour model comprises step (f) generating a shape prior via the computing device. According to one embodiment, the shape prior is generated via the computing device by: (i) minimizing the probability distribution function (PDF) of the training set, (ii) computing a similarity transform of the shape prior, and (iii) encoding the similarity transform of the shape prior into the hybrid active contour model.

According to one embodiment, the shape prior is constructed using a statistical method described in Chan, T., "Level set based shape prior segmentation," IEEE Computer Society Conference on Computer Vision and Pattern Recognition, 2005, 2: 1164-1170.

According to one embodiment, minimizing step (i) minimizing the probability distribution function (PDF) of the training set as described in Equation (6) further comprises changing a size of a principle axis with a Gaussian probability function.

According to one embodiment, computing step (ii) computing the similarity transform of the shape prior comprises applying Principle Component Analysis (PCA) and a Signed Distance Function (SDF) and computing a similarity transform $A_s$ of the shape prior, described as $A_s=(\alpha, R, T)$ by performing a Euclidean Similarity Transformation (EST).

According to one embodiment, encoding step (iii) comprises encoding the similarity transform $A_3$, described as $A_s=(\alpha, R, T)$ of the shape prior into the hybrid active contour model to give $\psi(x_{pca})=\psi_0(A_s(x_{pca}))$.

An EST of a point $x_p$ into a point $x'_p$ is defined by the transformation described as in Equation (1): $x'_p=\alpha Rx_p+T$ (1), wherein $\alpha$ is the isotropic scaling factor, R is the rotation matrix, and T is the translation vector. For each training shape, the set of parameters $(\alpha, R, T)$ is found in order to adjust the training shape to the same pose (i.e., same position, orientation and scale) as compared to a predefined reference shape, that is arbitrarily chosen.

According to one embodiment, computing step (ii) further comprises computing, via the computing device, the distance between the centroid of a target training shape $(x_i, y_i)$ and the centroid of a reference shape $(x_i, y_i)$ to determine the translation vector T, described as in Equation (2): $T=\sqrt{(x'_i-x_j)^2+(y'_i-y_j)^2}$ . . . (2). According to one embodiment, computing step (ii) further comprises computing, via the computing device, the ratio of enclosed area of a reference shape ($A_{reference}$) over area of a target training shape ($A_{target}$) to determine the isotropic scaling factor α, described as in Equation (3):

$$\alpha = \frac{|A_{reference}|}{|A_{target}|}. \quad (3)$$

According to one embodiment, computing step (ii) further comprises computing, via the computing device, a rotation matrix R(θ), described as in Equation (4):

$$R(\theta) = \begin{bmatrix} \cos(\theta) & -\sin(\theta) \\ \sin(\theta) & \cos(\theta) \end{bmatrix}. \quad (4)$$

According to some embodiments, the shapes in the image scene are curves, circles, ellipses, parabolas, hyperbolas, a planes, polygons, or a combination thereof. According to one embodiment, the shapes in the image scene are ellipses.

According to one embodiment, generating a shape prior via the computing device step (f) comprises generating ellipses (i) by changing a size of a principle axis with a Gaussian probability function and (ii) by applying Principle Component Analysis (PCA) and a Signed Distance Function (SDF).

According to one embodiment, the shape prior is composed of the mean level set shape and a weighted sum of m strongest eigen modes of variation (obtained from the PCA of SDFs).

(g) Integrating a Shape Term Via the Computing Device Step

According to some embodiments, the method for segmenting single non-overlapping objects or multiple overlapping/occluded objects in an image scene via a hybrid adaptive active contour model comprises the step (g) integrating a shape term via the computing device, wherein each aligned shape of the plurality of aligned shapes is embedded as the zero level set of the higher dimensional surface, and wherein the shape term is a signed distance function (SDF) used to encode the distance of the shape contour of each aligned shape to the nearest point in the shape space of the higher dimensional surface.

(A) Shape Term—$F_{shape}$

According to one embodiment, the at least one shape of the plurality of aligned shapes is embedded as the zero level set of the higher dimensional embedding function describing the surface. According to one embodiment, the points on the surface encode the distance to the nearest point in the shape, with negative distance inside and positive distance outside the shape. According to one embodiment, each aligned shape of the plurality of aligned shapes is embedded as the zero level set of the higher dimensional surface.

According to one embodiment, the level set function is a signed distance function (SDF) used to encode the distance to the nearest point in the at least one shape of the plurality of collected and aligned shapes. According to one embodiment, the signed distance function (SDF) is a shape term $F_{shape}$, a functional that depends on the active contour providing the boundaries.

The shape term $F_{shape}$ evaluates the shape difference between the level set φ and the zero level set of the shape prior function ψ at each iteration of the model training process. It should be noted that PCA applied on aligned SDFs of a training set produces shape functions very similar to SDFs.

According to one embodiment, the shape term $F_{shape}$ is described in Equation (7) as: $F_{shape} = \int_\Omega (\phi(x) - \psi(x))^2 |\nabla\phi| \delta(\phi) dx$ (7), where φ(x) is a level set function, ψ(x) is the shape prior, δ(φ) is a Dirac function, and is a contour measure on {φ=0}. Since φ undergoes a similarity transformation to adjust the pose and scale, $F_{shape}$ can also be written in terms of rotation, translation and scaling factor using standard linear transformations, such as Euclidean Similarity Transformation (EST).

A Dirac function or Dirac delta function or δ function is a function on a real line which is zero everywhere except at the origin, where it is infinite. A Dirac function δ(φ) is described as:

$$\delta(\phi) = \begin{cases} +\infty, & \phi(c) = 0 \\ 0, & \phi(c) \neq 0 \end{cases},$$

where φ(c) is a level set function.

The shape prior ψ, can be obtained by a principal component analysis (PCA) as described in Cootes et al. who proposed to use principal component analysis (PCA) to capture the main shape variations of parametric active contours (active shapes) within a training set and thus to represent the prior shape information. (T. F. Cootes, D. Cooper, C. J. Taylor and J. Graham, "Active Shape Models—Their Training and Application," Computer Vision and Image Understanding. Vol. 61, No. 1, January 1995, pp. 38-59)

The shape prior ψ can be constructed using a level set function statistical method described in Chan, T., "Level set based shape prior segmentation," IEEE Computer Society Conference on Computer Vision and Pattern Recognition, 2005, 2: 1164-1170, the entire disclosure of which is incorporated herein by reference.

According to one embodiment, the level set function $\psi_i$, is a matrix (or signed distance function). According to one embodiment, the level set function $\psi_i$, is of the same size as the training shape template. According to one embodiment, the level set function $\psi_i$, is defined as in Equation (5):

$$\psi_i = \begin{cases} 0 & S, \\ -D((x, y), S) & (x, y) \in \Omega_f, \\ D((x \cdot y), S) & (x, y) \in \Omega_b \end{cases} \quad (5)$$

where D((x, y), S) is a function that returns the minimum Euclidean distance between the grid pixel (x, y); S is the shape contour; $\Omega_f$ is the foreground region; and $\Omega_b$ is the background region.

According to one embodiment, the shape term $F_{shape}$ introduces the shape prior in such a way that only objects of interest similar to the shape prior can be recovered, and all unfamiliar image structures are suppressed, such that a single level set that is consistent with the shape prior is solved.

(h) Integrating, Via the Computing Device, a Boundary-Based Term Step

According to one embodiment, the method for segmenting single non-overlapping objects or multiple overlapping/occluded objects in an image scene via a hybrid adaptive active contour model comprises step (h) integrating a boundary-based term via the computing device. According to one embodiment, the step of integrating a boundary-based term via the computing device is by (i) changing a size of a principle axis with a Gaussian probability function by applying Principle Component Analysis (PCA), to direct the hybrid adaptive active contour model to a boundary of at least one object of the objects in the image scene.

(B) Boundary-Based Term

According to one embodiment, the boundary-based term, $F_{boundary}$ directs the hybrid adaptive active contour model to the image gradient, where the image gradient is a derivative of the image scene.

According to one embodiment, $F_{boundary}$ is described as: $F_{boundary} = \int_0^J g(|\nabla I(C(q))|)|C'(q)|dq$, where C is the active contour, and g is an edge detecting function, q is the pixel value, and $\nabla I$ is the gradient of the image.

According to one embodiment, $F_{boundary}$ is defined as: $F_{boundary} = \int_\Omega g(f(x))|\nabla H(\phi)|dx$, where g is an edge detecting function, $f(x)$ is the data (image), and $\nabla H(\phi)$ denotes the gradient of Heaviside function, $\phi$ is a level set.

According to one embodiment, the shape prior $\psi$, is obtained by a principal component analysis (PCA) as described in Cootes et al. (T. F. Cootes, D. Cooper, C. J. Taylor and J. Graham, "Active Shape Models—Their Training and Application," Computer Vision and Image Understanding. Vol. 61, No. 1, January 1995, pp. 38-59), who proposed to use principal component analysis (PCA) to capture the main shape variations of parametric active contours (active shapes) within a training set and thus to represent the prior shape information.

According to one embodiment, the shape prior $\psi$ is constructed using a level set function by a statistical method described in Chan, T., "Level set based shape prior segmentation," IEEE Computer Society Conference on Computer Vision and Pattern Recognition, 2005, 2: 1164-1170.

According to one embodiment, the shape prior $\psi$ is obtained by: (i) minimizing the probability distribution function (PDF) of the training set as described in Equation (6), (ii) computing a similarity transform $A_s$ of the shape prior, described as $A_s=(\alpha, R, T)$ by performing a Euclidean Similarity Transformation (EST), and (iii) encoding the similarity transform $A_s$, described as $A_s=(\alpha, R, T)$ of the shape prior into the hybrid active contour model to give $\psi(x_{pc\alpha})=\psi_0(A_s(x_{pc\alpha}))$.

(i) Integrating a Region Homogeneity Term Via the Computing Device Step

According to some embodiments, the method for segmenting single non-overlapping objects or multiple overlapping/occluded objects in an image scene via a hybrid adaptive active contour model comprises step (i) integrating a region homogeneity term via the computing device, wherein the region homogeneity term drives the shape term towards a homogeneous intensity region using the shape prior.

(C) Region Homogeneity Term

According to one embodiment, the region homogeneity term, $F_{region}$, drives the shape prior and the active contour towards a homogeneous intensity region corresponding to the shape of interest.

A Mumford-Shah (MS) model is used to segment objects with smooth intensity surface, as described in Chan et al., "Active contours without edges," IEEE TIP, vol. 10, no. 2, pp. 266-277, February 2001. The region homogeneity term is computed by applying the Mumford-Shah (MS) model on the shape prior, as described in Chan et al., "Level set based shape prior segmentation," in CVPR, 2005, 2: 1164-1170. Application of the MS model on the shape prior globally drives the shape prior towards a homogenous intensity region with the shape of interest.

According to one embodiment, the functional $F_{region}$ can be described as in Equation (8), incorporating the shape function $\psi$ and statistics of partitioned foreground and background regions, $u_{in}$ and $u_{out}$:

$$F_{region}(\psi, u_{in}, u_{out}) = \int_\Omega \Theta_{in} H_\psi dx + \int_\Omega \Theta_{out} H_{-\psi} dx, \quad (8)$$

where $\psi$ is the shape prior, and $H(\bullet)$ is a Heaviside function, $\Theta_r$, defined as:

$$\Theta_r = |I-u_r|^2 + \mu|\nabla u_r|^2 \text{ and } r \in \{in, out\}.$$

A Heaviside function H is an integral of the Dirac delta function. Hence, $H'=\delta(\phi)$. The Heaviside function $H(\phi)$ is described as:

$$H(\phi) = \begin{cases} 1, & \phi(c) \geq 0; \\ 0, & \phi(c) < 0. \end{cases}$$

where $\phi(c)$ is a level set function.

(j) Initializing the Hybrid Adaptive Active Contour Via the Computing Device Step According to one embodiment, the method for segmenting single non-overlapping objects or multiple overlapping/occluded objects in an image scene via a hybrid adaptive active contour model comprises the step (j) initializing the hybrid adaptive active contour model via the computing device by a watershed transformation method comprising delineating object boundaries of at least one target object in the image scene. According to one embodiment, initializing step (j) comprising the step delineating object boundaries of at least one target object in the image scene further comprises the steps:

(1) creating a binary mask enclosing the target object to form a closed sub-contour surrounding the target object;

(2) detecting concavity points in the at least one target object by comparing an area enclosed within the closed sub-contour surrounding the at least one target object with a predetermined area of a reference object;

(3) determining a number of the detected concavity points; and (4) ascertaining a condition of the at least one target object based on the determined number of concavity points, such that the determined number of concavity points is equal to the number of overlapping target objects in the image scene, wherein the condition of the at least one target object is selected from the group consisting of: (i) the at least one target object in the image scene includes a single non-overlapping object or (ii) the at least one target object in the image scene includes multiple overlapping/occluded objects;

(5) selecting at least one energy functional selected from the group consisting of (A) the shape term, (B) the boundary-based term, (C) the region homogeneity term, or a combination thereof, based on the ascertained condition of the at least one target object such that if the ascertained condition is (i), the region homogeneity term is selected; or if the ascertained condition is (ii), the shape term, the boundary-based term, and the region homogeneity term are selected;

(6) combining the at least one selected energy functional with the shape prior to yield at least one initial level set described by an integrated synergistic shape functional; and (7) placing the at least one initial level set on the at least one target object in the image scene.

According to some embodiments, any object of interest can be segmented with trained shape prior of the object of interest, i.e., applications of the method are not limited to medical imaging. According to some embodiments, the object of interest that can be segmented with trained shape prior of the object of interest is a medical imaging application. According to some such embodiments, the single non-overlapping objects or multiple overlapping/occluded objects in the image scene of the histopathology sample comprise nuclear and glandular structures. According to some such embodiments, the single non-overlapping objects or multiple overlapping/occluded objects in the image scene of the histopathology sample comprises cells, nuclei, and a combination thereof. Exemplary cells include but are not limited to epithelial cells, breast cancer cells, prostate cancer cells, lung cancer cells, pancreatic cancer cells, colon cancer cells, bone cancer cells, lymphocytes, and any other pluripotent cancer cells. According to some such embodiments, the overlapping/occluded objects in the image scene of the histopathology sample include nuclei. According to some embodiments, the method includes segmenting overlapping structures on microscopic light and confocal images, e.g., cells.

(1) Creating a Binary Mask Step

According to one embodiment, initializing step (j) comprising the step delineating object boundaries of at least one target object in the image scene comprises (1) creating a binary mask enclosing the target object to form a closed sub-contour surrounding the target object. A binary mask refers to an image where all pixels except for the foreground are unity and all background pixels are zero. A binary mask converts an image to black and white wherein the object of interest is white and the rest of the image is black.

(2) Detecting Concavity Points Step

According to one embodiment, initializing step (j) comprising the step delineating object boundaries of at least one target object in the image scene further comprises (2) detecting concavity points in the at least one target object by comparing an area enclosed within the closed sub-contour surrounding the at least one target object with a predetermined area of a reference object.

Figure 2:
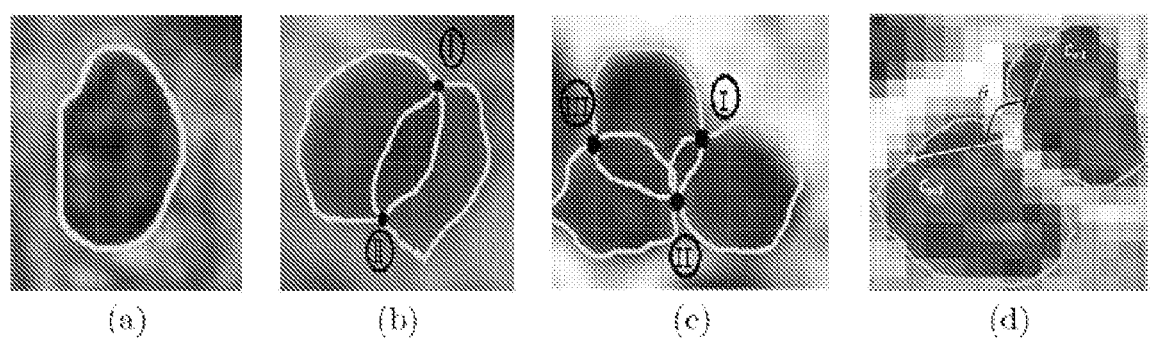
FIG. 2 illustrates the selective incorporation of variational terms based on the detection of concavity points in the method for segmenting single non-overlapping objects or multiple overlapping/occluded objects in an image scene according to the hybrid adaptive active contour model. In 2(a), the absence of concavity point reflects the presence of a single nucleus. In 2(b) and 2(c), detection of the number of concavity points represents the number of nuclei. 2(d) shows the concavity detection method, wherein three consecutive points on s ($c_{w-1}$, $c_w$ and $c_{w+1}$) are used to define two vectors (shown with arrows). The angle θ between the vectors is a measure of concavity/convexity of the point $c_w$.

For example, high concavity points are characteristic of contours that enclose multiple objects and represent junctions where object intersection occurs, for example as observed in nuclei, as depicted in FIG. 2. For example, an area $\mathcal{A}(s)$ of the closed sub-contours is compared to a predetermined area of reference object $T_{AA}$. The sub-contour can be further split, provided $\mathcal{A}(s) > T_{AA}$. Since $c=(x, y)$, the difference between any two points $c_w$ and $c_{w-1}$ represents a two-dimensional vector. Concavity points are detected by computing the angle between vectors defined by three consecutive points $(c_{w-1}, c_w, c_{w+1}) \in s$. The degree of concavity/convexity is proportional to an angle $\theta(c_w)$, for example as shown in FIG. 1(d). The angle $\theta(c_w)$ can be computed from the dot product relation as described in Equation (9):

$$\theta(c_w) = \pi - \arccos\left(\frac{(c_w - c_{w-1}) \cdot (c_{w+1} - c_w)}{\|c_w - c_{w-1}\| \|c_{w+1} - c_w\|}\right). \quad (9)$$

(3) Determining a Number of the Detected Concavity Points Step

According to one embodiment, initializing step (j) comprising the step delineating object boundaries of at least one target object in the image scene further comprises (3) determining a number of the detected concavity points.

According to one embodiment, when the number of detected concavity points is low, such that $c_w \leq 1$, the target object in the image scene includes a single non-overlapping object. According to one embodiment, when the number of detected concavity points is more than one, such that $c_w > 1$, the target object in the image scene includes multiple overlapping/occluded objects.

(4) Ascertaining a Condition of the at Least One Target Object Step

According to one embodiment, initializing step (j) comprising the step delineating object boundaries of at least one target object in the image scene further comprises (4) ascertaining a condition of the at least one target object based on the determined number of concavity points, such that the determined number of concavity points is equal to the number of overlapping target objects in the image scene, wherein the condition of the at least one target object is selected from the group consisting of: (i) the at least one target object in the image scene includes a single non-overlapping object or (ii) the at least one target object in the image scene includes multiple overlapping/occluded objects.

(5) Selecting at Least One Energy Functional Step

According to one embodiment, initializing step (j) comprising the step delineating object boundaries of at least one target object in the image scene further comprises (5) selecting at least one energy functional selected from the group consisting of (A) the shape term, (B) the boundary-based term, (C) the region homogeneity term, or a combination thereof, based on the ascertained condition of the at least one target object such that if the ascertained condition is (i), the region homogeneity term is selected; or if the ascertained condition is (ii), the shape term, the boundary-based term, and the region homogeneity term are selected.

(6) Combining at Least One Selected Energy Functional with the Shape Prior Step

According to one embodiment, initializing step (j) comprising the step delineating object boundaries of at least one target object in the image scene further comprises (6) combining the at least one selected energy functional with the shape prior to yield at least one initial level set described by an integrated synergistic shape functional.

According to one embodiment, combining step (6) comprises combining (A) the shape term $F_{shape}$, (B) the boundary-based term $F_{boundary}$, and (C) the region homogeneity term $F_{region}$ by integrating the shape prior with local and global intensity information obtained from the boundary-based term $F_{boundary}$ and the region homogeneity term $F_{region}$ to yield at least one level set described by an integrated synergistic shape functional F, according to the hybrid adaptive active contour model described in Equation (10):

$$F = F_1 + F_{region}(\psi, u_{in}, u_{out}), \quad (10)$$

where the term, $F_1$ is related to a shape and boundary force term, defined as:
$F_1 = \beta_1 F_{boundary}(C) + \beta_2 F_{shape}(\phi, \psi)$, wherein and $\beta_1$ and $\beta_2$ are arbitrary positive constants that balance the contributions of the boundary, and shape terms, respectively.

According to one embodiment, the term $F_1$ can be re-written as: $\beta_s \int_\Omega (\phi(x) - \psi(x))^2 |\nabla \phi| \delta(\phi) dx$, wherein $\beta_s$ is an arbitrary positive constant that balance the contributions of the boundary and shape terms.

According to one embodiment, Equation (10) can be rearranged as Equation (11) describing the level set formulation of the integrated synergistic shape functional, F:

$$F(\phi, \psi, u_{in}, u_{out}) = \beta_s \int_\Omega (\phi(x) - \psi(x))^2 |\nabla \phi| \delta(\phi) dx + \beta_T \int_\Omega (\Theta_{in} H_\psi + \int_\Omega \Theta_{out} H_{-\psi}) dx, \quad (11)$$

where $\beta_s$ and $\beta_T$ are arbitrary positive constants that balance the contributions of the boundary, shape and region terms According to one embodiment, the integrated synergistic shape functional allows for segmentation of a single non-overlapping object at a time.

According to one embodiment, the integrated synergistic shape functional F as described in Equation (11) allows for segmentation of a single object at a time.

According to some embodiments, the integrated synergistic shape functional allows for segmentation of multiple overlapping/occluded objects at the same time.

According to one embodiment, the integrated synergistic shape functional allows for segmentation of multiple overlapping/occluded objects at the same time by the method described in Zhang et al., "Segmenting multiple familiar objects under mutual occlusion," in ICH', 2006, for segmentation of objects of familiar shape simultaneously in the presence of occlusions.

According to one embodiment, combining step (6) comprises combining via the computing device (A) the shape term, (B) the boundary-based term, and (C) the region homogeneity term, by integrating the shape prior with local and global intensity information obtained from the boundary-based term and the region homogeneity term for an image with N independent multiply placed familiar objects of a set $O_i$, where $O_i \in \{O_1, O_2, \ldots, O_n\}$, and wherein $O_i$ is associated with a level set characteristic function, $\chi_i$ such that:

$$\chi_i(x) = \begin{cases} 1 & \text{if } x \in O_i, \\ 0 & \text{otherwise.} \end{cases}$$

to yield at least one level set described by an integrated synergistic shape functional $F(\phi, \psi, u_{in}, u_{out})$ according to the hybrid adaptive active contour model.

According to one embodiment, the one level set characteristic function is associated per object such that any $O_a$ and $O_b$ of the set $O_i$, where a, b$\in\{1, \ldots, n\}$ are allowed to overlap with each other within the image. In one embodiment, the level set characteristic function is positive within the area of overlap, such that the shape prior extracted from the objects of the image is enforced.

According to one embodiment, combining step (6) comprises combining the shape term, the boundary-based term, and the region homogeneity term, by integrating the shape prior with local and global intensity information for an image with N independent familiar objects of a set $O_i$, where $O_i \in \{O_1, O_2, \ldots, O_n\}$, and wherein $O_i$ is associated with a level set characteristic function, $\chi_i$ such that:

$$\chi_i(x) = \begin{cases} 1 & \text{if } x \in O_i, \\ 0 & \text{otherwise.} \end{cases}$$

where N=1, ..., n, to yield N level sets described by the integrated shape functional, $F(\phi, \psi, u_{in}, u_{out})$ according to the hybrid adaptive active contour model, wherein the integrated synergistic shape functional, $F(\phi, \psi, u_{in}, u_{out})$ is described as in equation (12):

$$F(\phi, \psi, u_{in}, u_{out}) = \qquad (12)$$

$$\sum_{a=1}^{N} \int_\Omega (\phi_a(x) - \psi(x))^2 |\nabla \phi_a| \delta(\phi_a) dx + \beta_r \int_\Omega \Theta_{in} H_{\chi 1 \vee \chi 2} dx +$$

$$\int_\Omega \Theta_{out} - H_{\chi 1 \vee \chi 2} dx + \omega \sum_{a \neq b} \int_\Omega H_{\chi 1 \wedge \chi 2} dx + \sum_{a=1}^{N} \int_\Omega (\phi_a - \psi_a)^2 dx$$

According to one embodiment, combining step (6) comprises combining via the computing device (A) the shape term $F_{shape}$, (B) the boundary-based term $F_{boundary}$, and (C) the region homogeneity term $F_{region}$, by integrating the shape prior with local and global intensity information obtained from the boundary-based term $F_{boundary}$ and the region homogeneity term $F_{region}$ for an image with two similarly placed familiar objects, $O_a$, and $O_b$ of the set $O_i$, where a, b$\in\{1, \ldots, n\}$, and wherein $O_i$ is associated with a level set characteristic function $\chi_i$ such that:

$$\chi_i(x) = \begin{cases} 1 & \text{if } x \in O_i, \\ 0 & \text{otherwise.} \end{cases}$$

and l=1, 2, to yield two level sets described by an integrated synergistic shape functional, $F(\phi, \psi, u_{in}, u_{out})$ according to the hybrid adaptive active contour model as described in Equation (13):

$$F(\phi, \psi, u_{in}, u_{out}) = \qquad (13)$$

$$\sum_{i=1}^{2} \int_\Omega (\phi_i(x) - \psi(x))^2 |\nabla \phi_i| \delta(\phi_i) dx + \beta_r \int_\Omega \Theta_{in} H_{\chi 1 \vee \chi 2} dx +$$

$$\int_\Omega \Theta_{out} - H_{\chi 1 \vee \chi 2} dx + \omega \int_\Omega H_{\chi 1 \wedge \chi 2} dx + \sum_{i=1}^{2} \int_\Omega (\phi_i - \psi_i)^2 dx,$$

wherein $H_{\chi 1 \vee \chi 2} = H_{\psi 1} + H_{\psi 2} - H_{\psi 1} H_{\psi 2}$, $H_{\chi 1 \wedge \chi 2} = H_{\psi 1} H_{\psi 2}$, $\phi = (\phi_1, \phi_2)$, and $\psi = (\psi_1, \psi_2)$. H is a Heaviside function.

The fourth term $$\sum_{i=1}^{2} \int_\Omega (\phi_i - \psi_i)^2 dx$$

in Equation (13) penalizes the overlapping area between the two regions being segmented, and it prevents the two evolving level set functions from becoming identical.

Proof For the integrated synergistic shape functional, $F(\phi, \psi, u_{in}, u_{out})$ described in Equation (13)

The proof for Equation (13) can be shown by the mathematical study of the problem (14):

$$\min_{\psi, u_{in}, u_{out}} \left\{ F = \int_\Omega (\phi(x) - \psi(x))^2 |\nabla \phi| \delta(\phi) dx + \beta_r \int_\Omega \int_\Omega \begin{pmatrix} \Theta_{in} H_\psi + \\ \Theta_{out} H_{-\psi} \end{pmatrix} dx \right\} \qquad (14)$$

The existence of a minimizer as described in Equation (13) can be proved by following the methods described in Chen et al. (Chen, Y. et al., "Using prior shapes in geometric active contours in a variational framework," Int. J. Comput. Vision, 2002 50(3): 315-328; and Chan et al. (Chan, T. F. et al., "Active contours without edges," IEEE Trans. on Image Processing, 2001, 10(2): 266-277) using a direct method of the calculus of variations and compactness theorems on the space of functions with bounded variation. The methods described in Evans et al. (Evans, L. C. et al., "Measure Theory and Fine Properties of Functions," CRC Press: Boca Raton, Fla. 1992), Crandall et al. (Crandall, M. G. et al., "Users guide to viscosity solutions of second order partial differential equations," 1992, Amer. Math. Soc. Bull., 27:167), Chen et al. (Chen, Y. et al., "Using prior shapes in geometric active contours in a variational framework," Int. J. Comput. Vision, 2002, 50(3):

315-328), Chan et al. (Chan, T. F. et al., "Active contours without edges," IEEE Trans. On Image Processing, 2001, 10(2): 266-277), and De Giorgi et al. (De Giorgi E. et al., "New functionals in the calculus of variations," Atti. Accad. Naz. Lincei Rend. Cl. Sci. Fis. Mat. Natur., 1998, 82(2):199-210) are further used in the proof of the minimization of problem (13).

The minimization problem is, considered among characteristic functions $\chi_E$ of sets E={x∈Ω|ϕ(x)≥0}. This minimization is over all $\chi_E$ in BV(Ω). The vector of PCA eigen-coefficients $x_{pca}=(x_{pca1}\ldots,x_{pcah})$ is defined on $\Omega_{pca}=[-3\lambda_1, 3\lambda_1]\times\ldots\times[-3\lambda_h,3\lambda_h]$. The functions $u_{in}$ and $u_{out}$ are supposed in $C^1(\Omega)$. The minimization problem involves a weighted total variation norm for the functions with finite perimeters. It also minimizes more than one argument. To study the existence for the problem (13), it is necessary to introduce the concept of weighted total variation norms for functions of bounded variation.

Definition 1

Let $\Omega \subset R^N$ be an open set and let $f \in L^1(\Omega)$. The total variation norm of $f$ is defined by Equation (14a):

$$TV(f) = \int_\Omega |\nabla f| = \sup_{\phi \in \Phi} \int_\Omega f(x) div\phi(x), \quad (14a)$$

$$\text{where } \phi = \{\phi \in C_0^1(\Omega, R^N) | |\phi(x)| \le 1, \text{ on } \Omega\}. \quad (14b)$$

Definition 2

The function $f \in L^1(\Omega)$ is said to have bounded variation in if its distributional derivative satisfies TV(f)<∞. We define BV(Ω) as the space of all functions in L'(Ω) with bounded variation and endowed with the norm (14c):

$$\|f\|_{BV(\Omega)}=\|f\|_{L^1(\Omega)}+TV(f) \quad (14c)$$

Hence BV(Ω) is a Banach space.

Theorem 1.

A measurable subset of E of $R_N$ has finite perimeter (per$_\Omega$) in Ω if and only if the characteristic function $x_E \in BV(\Omega)$, which can be further described as:

$$per_\Omega=TV(\chi_E)=\int_\Omega |\nabla\chi_E|<\infty.$$

Definition 3

Let $\Omega \subset R^N$ be an open set and let $f \in L^1(\Omega)$ and ϕ(x) be positive valued continuous and bounded functions on Ω. The weighted total variation norm (TV$_\Omega$) of $f$ is defined by Equation (14d)

$$TV_\varphi(f) = \int_\Omega \varphi(x)|\nabla f| = \sup_{\phi \in \Phi_\varphi} \int_\Omega f(x) div\phi(x), \quad (14d)$$

$$\text{where } \phi_\varphi = \{\phi \in C_0^1(\Omega, R^N) | |\phi(x)| \le \varphi(x), \text{ on } \Omega\} \quad (14e)$$

If a function f has a finite weighted total variation norm in Ω then it also belongs to BV(Ω).

Definition 4

A function $f \in BV(\Omega)$ is a special function of bounded variation if its distributional derivative is given by Equation (14f)

$$|Df| = TB(f) + \int_{\Omega \cap S_f} J_f dH^{N-1}, \quad (14f)$$

where $J_f$ is the jump part defined on the set of points $S_f$ and $\mathcal{H}^{N-1}$ is the (N-1)-dimensional Hausdorff measure, as described in De Giorgi, E. et al. (De Giorgi, E. et al., "Existence theorem for a minimum problem with free discontinuity set," Arch. Rational Mech. Anal., 1989, 108(3):195-218). The space of special functions of bounded variation SBV(Ω) is a Banach space, endowed with the norm (14g);

$$\|f\|_{SBV(\Omega)}=\|f\|_{L^1(\Omega)}+|D_f| \quad (14g).$$

Theorem 2.

Let $\Omega \subset R^N$ be an open set with a lipschitz boundary. If $\{f_n\}_{n\ge 1}$ is a bounded sequence in BV(Ω), then there exists a subsequence $\{f_{nj}\}$ of $\{f_n\}$ and a function $f \in BV(\Omega)$, such that $f_{nj} \to f$ strongly in $L^P(\Omega)$ for any $$1 \le p < \frac{N}{N-1} \text{ and } TV(f) \le 1 \lim_{f_{nj} \to \infty} infTV(f_{nj}). \quad (14h)$$

Theorem 3.

The following theorem is a generalization of the method described in Chen et al. (Chen, Y. et al., "Using prior shapes in geometric active contours in a variational framework," Int. J. Comput. Vision, 2002, 50(3): 315-328), the entire disclosure of which is incorporated herein by reference.

Let $\Omega \subset R^N$ be an open set with a lipschitz boundary. If $\{f_n\}_{n\ge 1}$ is a bounded sequence in BV(Ω), and if $\{f\}_{n\ge 1}$ is a positive valued continuous function that uniformly converges to α on Ω, then there exists a subsequence $\{f_{nj}\}$ of $\{f_n\}$ and a function $f \in BV(\Omega)$, such that $f_{nj} \to f$ strongly in $L^P(\Omega)$ for any $$1 \le p < \frac{N}{N-1} \text{ and } TV_\varphi(f) \le 1 \lim_{f_{nj} \to \infty} infTV_{\varphi nj}(f_{nj}). \quad (14i)$$

Theorem 4.

Let Ω be a bounded and open subset of R2 and $\mathcal{C}$ be an image with $\mathcal{C} \in L^\infty(\Omega)$. The minimization problem may be re-written in the following form (14j):

$$\min_{\alpha, u_{in}, u_{out}} \lceil F = \quad (14j)$$

$$\int_\Omega (\phi(x)-\psi(x))^2 + g(x)|\nabla\chi_E| + \beta_r F_{region}(u_{in}, u_{out}, \psi) \rceil$$

and has a solution $\chi_E \in BV(\Omega), x_{pca} \in \Omega_{pca}$, and $u_{in}, u_{out} \in C^1(\Omega)$.

Proof:

The direct method of the calculus of variations may be used to prove the theorems, as described in De Giorgi et al. (De Giorgi E. et al., "New functionals in the calculus of variations," Atti. Accad. Naz. Lincei Rend. Cl. Sci. Fis. Mat. Natur., 1998, 82(2):199-210), according to the following steps:

(i) Let $\{\chi_E, x_{pca}, u_{in}, u_{out}\}$ be a minimizing sequence of the form (14j) to the form (13k), as described, $$\lim_{n\to\infty} F(\chi_{E_n}, x_{pca_n}, u_{in_n}, u_{out_n}) = \inf_{\chi_E, x_{pca}, u_{in}, u_{out}} F(\chi_E, x_{pca}, u_{in}, u_{out}). \quad (14k)$$

(ii) Since $\chi_{E_n}$ is a sequence of characteristic functions $E_n$, then)$\chi_{E_n}(x) \in \{0,1\}$—a.e. in Ω. A constant M>0 exists uch that $\|\nabla\chi_{E_n}\|_{L^1(\Omega)} \le M, \forall n \ge 1$. Therefore, $\chi_{E_n}$ is a uniformly bounded sequence on BV($\Omega$). Since $\{\chi_{pca_n}\}$ are bounded sequences on compact space $\Omega_{pca}$, a subsequence $\{\chi_{pca_{nj}}\}$ that converge to limit $\chi_{pca}$ exists. The integrand $(\phi(x)-\psi(x))^2+g(x)$ is positive and bounded because both functions are bounded on. Since PCA is applied on continuous functions (SDFs), the shape prior is also continuous and converges uniformly on $\Omega$. Following theorem 3, a subsequence of $\chi_{E_n}$ that converges to a function $\chi_E$ strongly in $L^1(\Omega)$ exists. Moreover, Theorem 3 also state that:

$$\int_\Omega f|\nabla \chi_E| \leq \liminf_{nj\to\infty} \int_\Omega f_{nj}|\nabla \chi_{E_{nj}}|. \tag{14l}$$

(iii) In the region homogeneity term $F_{region}$ described in Equation (8):
$F_{region}(\psi,u_{in},u_{out})=\int_\Omega \Theta_{in} H_\psi dx + \int_\Omega \Theta_{out} H_{-\psi} dx$, the function $H_\psi$ is a characteristic function $\chi_G$ of sets $G = x\in\Omega|\psi(x)\geq 0$. Equation (8) can therefore be re-written as Equation (14m)

$$\int_\Omega \Theta_{in}\chi_G dx + \int_\Omega \Theta_{out}(1-\chi_G)dx \tag{14m}$$

and the function $u=u_{in}\chi_G+u_{out}(1-\chi_G)$ can be defined.

(iv) The minimization sequence of form (14j) in theorem 4 implies form $$\lim_{n\to\infty} F_{region}(x_{pca_{in}},u_{in_n},u_{out_n}) = \inf_{x_{pca},u_{in},u_{out}} F_{region}(x_{pca},u_{in},u_{out}). \tag{14n}$$

Since the function $\chi_G$ depends continuously on variable $\chi_{pca}$ and transformations $A_s$, we have $\chi_G(\psi)=\chi_{G_n}$ and $u_n=u_{in_n}\chi_{G_n}+u_{out_n}(1-\chi_{G_n})$. According to the methods described in De Giorgi et al. (De Giorgi E. et al., "New functionals in the calculus of variations," Atti. Accad. Naz. Lincei Rend. Cl. Sci. Fis. Mat. Natur., 1998, 82(2):199-210), it can be deduced that there is a $u\in SBV(\Omega)$, such that a subsequence $u_{nj}$ converges to $u$ a.e. in BV and $$F_{region}(x_{pca_n},u_{in_n},u_{out_n}) = F_{region}(u) \leq \liminf_{nj\to\infty} F_{region}(u_{nj}), \tag{14o}$$

which means that $u$ is a minimizer of $F_{region}$. Then by combining Equations (14l) and (14o), $\chi_E$, $\chi_{pca}$, $u_{in}$, and $u_{out}$ are minimizers of form (14j) under Theorem 4.

(7) Placing the at Least One Initial Level Set on the at Least One Target Object Step According to one embodiment, delineating step (A) further comprises (7) placing the at least one initial level set on the at least one target object in the image scene.

(k) Performing Contour Propagation Step

According to some embodiments, the method for segmenting single non-overlapping objects or multiple overlapping/occluded objects in an image scene via a hybrid adaptive active contour model comprises step (k) performing contour propagation of the delineated shape boundaries via the computing device by evolving the integrated synergistic shape functional by minimizing variational energy.

According to one embodiment, performing contour propagation step (k) further comprises minimizing variational energy in Equation (13) iteratively with respect to dynamic variables to yield Euler-Lagrange equations, that parameterize a descent direction of the delineated object boundaries of initializing step (i), in terms of rotation, scale and translation, by time t>0, for an image with N independent familiar objects, where N=1, . . . , n.

According to one embodiment, performing contour propagation step (k) further comprises minimizing variational energy in Equation (13) iteratively with respect to dynamic variables to yield Euler-Lagrange equations represented as Equation (15), that parameterize a descent direction of the delineated object boundaries of initializing step (i), in terms of rotation, scale and translation, by time t>0, for an image with two similarly placed objects, as follows:

$$\frac{\partial \phi_i}{\partial t} = \delta_{\phi_i}\mu\nabla\cdot\frac{\lfloor\nabla\phi\rfloor}{|\nabla\phi|} - \tag{15}$$
$$\left(((f-u_{in})^2+(f-u_{out})^2)(1-H_{\phi_j})\right)-2\nu(\phi_i-\psi_i),$$

$$\frac{\partial \theta_i}{\partial t} = 2\nu\int_\Omega (\phi_i-\psi_i)(\nabla\psi_i\cdot\nabla_\Theta A_i)dx$$

$$\frac{\partial T_i}{\partial t} = 2\nu\int_\Omega (\phi_i-\psi_i)(\nabla\psi_i\cdot\nabla_T A_i)dx$$

$$\frac{\partial \alpha_i}{\partial t} = 2\nu\int_\Omega (\phi_i-\psi_i)\left[-\frac{\psi_i}{s}+\nabla\psi_i\cdot\nabla_\alpha A_i\right]dx$$

$$i,j\in\{1,2\}, i\neq j$$

Equation (15) has a Euler-Lagrange set up extensible to N objects.

According to one embodiment, performing contour propagation step (k) further comprises updating $u_{in}$ and $u_{out}$ for each iteration as follows:

$$u_{in} = \frac{\int_\Omega fH_{\chi_1\vee\chi_2}dx}{\int_\Omega H_{\chi_1\vee\chi_2}dx}, u_{out} = \frac{\int_\Omega f(1-H_{\chi_1\vee\chi_2})dx}{\int_\Omega (1-H_{\chi_1\vee\chi_2})dx}. \tag{16}$$

According to one embodiment, performing contour propagation step (k) further comprises (1) discretizing on the two-dimensional image scene described by the two-dimensional M-by-N grid comprising grid cells and grid points, wherein the spacing between the grid cells is h and wherein the grid points are $(x_i,y_j)=(i_h,j_h)$, such that $0\leq i\leq M$ and $0\leq j\leq N$ and $M=\{1, 2, \ldots n\}$ and $N=\{1, 2, \ldots n\}$.

According to one embodiment, discretizing step (1) comprises discretizing the terms $u_{in}$ and $u_{out}$, on the two-dimensional image scene described by the two-dimensional M-by-N grid comprising grid cells and grid points, wherein the spacing between the grid cells is h and wherein the grid points are $(x_i,y_j)=(i_h,j_h)$, such that $0\leq i\leq M$ and $0\leq j\leq N$ and $M=\{$ and $N=1, 2, \ldots n\}$.

According to one embodiment, the discretizing step (1) comprises discretizing the term $$\nabla\cdot\frac{\nabla_\Theta}{|\nabla_\Theta|},$$

wherein the term $$\nabla\cdot\frac{\nabla_\Theta}{|\nabla_\Theta|}$$

is the divergence of the normalized gradient of φ, as described in Equation (16), as follows:

$$\nabla \cdot \frac{\nabla_\Theta}{|\nabla_\Theta|} = \frac{\phi_{xx}\phi_y^2 - 2\phi_{xy}\phi_x\phi_y + \phi_{yy}\phi_x^2}{(\phi_x + \phi_y)^{3/2}}, \quad (17)$$

wherein $\phi_x$, $\phi_y$ denote partial derivatives of φ, and $\phi_{xx}$, $\phi_{yy}$, and $\phi_{xy}$ are second-order partial derivatives of φ.

According to one embodiment, discretizing step (1) comprises (1) discretizing the term $$\nabla \cdot \frac{\nabla_\Theta}{|\nabla_\Theta|},$$

by the following:

(i) $\phi_x(i,j) = \frac{(x_{i-1}, x_j) - (x_{i+1}, x_j)}{2h}$ (ii) $\phi_y(i,j) = \frac{(x_i, x_{j-1}) - (x_i, x_{j+1})}{2h}$ (iii) $\phi_{xx}(i,j) = \frac{(x_{i-1}, x_j) - (x_{i+1}, x_j) + 2(x_i, x_j)}{h^2}$ (iv) $\phi_{yy}(i,j) = \frac{(x_i, x_{j-1}) - (x_i, x_{j+1}))/2 + 2(x_i, x_j)}{h^2}$ (v) $\phi_{xy}(i,j) = \frac{1}{4h^2} \frac{((x_{i+1}, x_{j+1}) + (x_{i-1}, x_{j+1}) +}{(x_{i+1}, x_{j-1}) + (x_{i-1}, x_{j-1}))}$.

According to one embodiment, discretizing step (1) further comprises fixing a regularized Heaviside function as described in Equation (18):

$$H(z) = \begin{cases} 1, & \text{if } z > \epsilon \\ 0 & \text{if } z < -\epsilon \\ \frac{1}{2} + \frac{z}{2\epsilon} + \frac{1}{2\pi}\sin\left(\frac{\pi z}{\epsilon}\right) & \text{if } |z| \le \epsilon \end{cases} \quad (18)$$

According to one embodiment, curvature forces, n+ and n− can be further computed as described in Chan, T. F. et al., "Active contours without edges," IEEE Trans. on Image Processing, 2001, 10(2): 266-277.

(l) Achieving Final Segmentation Step

According to some embodiments, the method for segmenting single non-overlapping objects or multiple overlapping/occluded objects in an image scene via a hybrid adaptive active contour model comprises step (l) achieving final segmentation of the image scene via the computing device.

Method of Classifying the Image Scene Embodiment

According to another embodiment, the method for segmenting single non-overlapping objects or multiple overlapping/occluded objects in an image scene via a hybrid adaptive active contour model further comprises classifying the image scene comprising (m) extracting from the segmented objects via the computing device, at least one signature feature and computing at least one quantitative signature for the image scene;

(n) selecting, via the computing device, at least one reference feature in a dataset comprising reference features according to a minimum Redundancy Maximum Relevance (mRMR) feature selection scheme to identify a selected subset of reference features;

(o) discriminating, via the computing device, the at least one quantitative signature feature of the image scene from the selected subset of reference features to identify a class corresponding to the image scene; and (p) outputting, via the computing device, the class corresponding to the image scene.

(m) Extracting Signature Features Step

According to some embodiments, the classifying step further comprises step (m) extracting from the segmented objects via the computing device, at least one signature feature and computing at least one quantitative signature for the image scene.

Exemplary signature features include but are not limited to morphological, architectural, and textural information of the objects in the image scene. These features are used to make a quantitative signature representative of each image scene, describing both information in the image scene, such as, but not limited to, architectural information, and features such as, but not limited to, global textural, morphological, second-order co-adjacency, etc. For example, signature features may include but are not limited to nuclear morphology, nuclear architecture, tissue texture etc.

For example, in the context of histological pathology of cancer, the Gleason grading system extracts information such as nuclear and architectural information but not features such as nuclear morphology, second-order co-adjacency and global texture features.

(n) Selecting Via the Computing Device at Least One Reference Features Step

According to some embodiments, the classifying step further comprises step (n) selecting, via the computing device, at least one reference feature in a dataset comprising reference features according to a minimum Redundancy Maximum Relevance (mRMR) feature selection scheme to identify a selected subset of reference features.

The reference feature selection step (n) facilitates data visualization and data understanding, reducing the measurement and storage requirements, reducing training and utilization times, and improves prediction performance. The reference feature selection step (n) allows for optimal classification of a histological sample, e.g. a prostate cancer histological sample, into a Gleason. Each reference feature dataset comprises texture, architectural and nuclear features, which can be considered highly discriminatory for differentiating between Gleason grades of, for example, prostate cancer.

According to one embodiment, the minimum Redundancy Maximum Relevance (mRMR) feature selection scheme is performing as described in Peng et al. (Peng H, Long F, Ding C. Feature selection based on mutual information criteria of max-dependency, max-relevance, and min-redundancy. Pattern Analysis and Machine Intelligence, IEEE Transactions on 2005; 27:1226-1238) to identify a selected subset of reference features.

The Minimum Redundancy Maximum Relevance Scheme for Feature Selection

According to one embodiment, the selected subset of reference features Q is comprised of feature vectors $F_i$, $i \in \{1, \ldots, |Q|\}$, where $F=\{F_1, \ldots, F_N\}$, $Q \subset F$, and $|Q|<N$. The mRMR scheme attempts to simultaneously optimize two distinct criteria. The first criterion is "maximum relevance" which selects features $F_i$ that have the maximal mutual information (MI) with respect to the corresponding label vector L. This is expressed in Equation (19) as:

$$U = \frac{1}{|Q|} \sum_{F_i \in Q} MI(F_i, L). \quad (19)$$

The second criterion is "minimum redundancy" which ensures that selected reference features $F_i$, $F_j \in Q$, where i, $j \in \{1, \ldots, |Q|\}$, are those which have the minimum MI with respect to each other, given as described in Equation (20):

$$U = \frac{1}{|Q|^2} \sum_{F_i, F_j \text{ in } Q} MI(F_i, Fj). \quad (20)$$

Under the second criterion, the selected reference features are maximally dissimilar with respect to each other, while under the first criterion, the reference feature selection is directed by the similarity with respect to the class labels.

There are two major variants of the mRMR scheme: the MI difference (MID), given by (U−V) and the MI quotient (MIQ), given by (U/V). These represent different techniques to optimize the conditions associated with mRMR reference feature selection.

(o) Discriminating the at Least One Reference Feature Step

According to some embodiments, the classifying step further comprises step (o) discriminating, via the computing device, the at least one quantitative signature feature of the image scene from the selected subset of reference features to identify a class corresponding to the image scene.

According to one embodiment, discriminating step (o) comprises a quadratic discriminant analysis (QDA) classifier step comprising performing a transformation of the at least one quantitative signature feature of the image scene to discriminate from the selected subset of reference features to identify a class corresponding to the image scene.

According to one embodiment, the quadratic discriminant analysis (QDA) classifier solves for Equation (21):

$$Y = F^T A F + B^T F, \quad (21)$$

where $Y = \{Y_1, Y_2, \ldots\}$ denotes the result of QDA, for a set of samples C with associated feature set F.

For example, in case of Gleason pattern classes for classifying between prostate cancer grades 3 or 4, based on calculating the means $\mu_{l_{(C)=+1}}, \mu_{l_{(C)=-1}}$ (and covariances $\Sigma_{l_{C=+1}}, \Sigma_{l_{C=-1}}$ of the two classes in the dataset, Equation (21) can be solved to calculate the following log likelihood ratio as described in Equation (22):

$$\log(H) = \frac{(F - \mu_{l_{(C)=+1}})^T \sum_{l_C^{-1}=+1} (F - \mu_{l_{(C)=+1}})}{(F - \mu_{l_{(C)=-1}})^T \sum_{l_C^{-1}=-1} (F - \mu_{l_{(C)=-1}})} \quad (22)$$

The result of QDA classification is given by $h(C) \in H$.

(p) Outputting the Class of the Image Scene Step

According to some embodiments, the classifying step further comprises step (p) outputting, via the computing device, the class corresponding to the image scene.

The Gleason grading system is used to describe cancer aggressiveness; lower Gleason grade structures, such as glands, are medium-sized with round shapes, while in higher Gleason grade patterns, such as glands, tend to be small and have irregular shapes. Gleason grading ranges from very well differentiated (grade 1) to very poorly differentiated (grade 5).

GPU Implementation

General purpose computation on graphics processing units (GPU) is the technique of using graphics hardware to compute applications typically handled by the central processing unit (CPU). Graphics cards over the past two decades have been required to become highly efficient at rendering increasingly complex 3D scenes at high frame rates. This has forced their architecture to be massively parallel in order to compute graphics faster compared to general purpose CPUs. (Kilgari E. et al., and R. Fernando, GPU Gems 2, ch. The GeForce 6 Series GPU Architecture, pp. 471-491. Addison Wesley, 2005.) Memory is optimized for throughput and not latency, with strict access patterns. GPUs are not optimized for general purpose programs, and they do not feature the complex instruction sets, or branch control of the modern CPU. Although current high-performance CPUs feature multiple cores for limited parallel processing, GPUs are arguably a more attractive option in terms of lower price and power usage.

Figure 12:
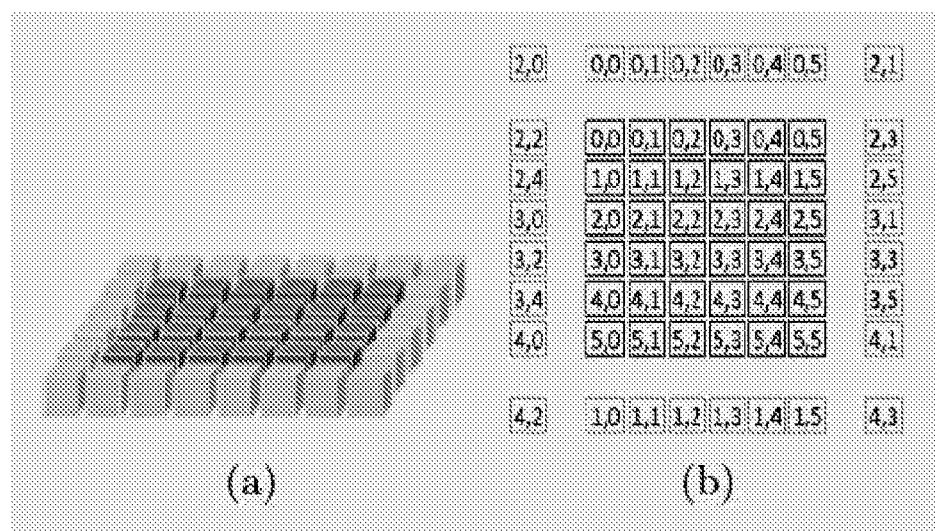
FIG. 12 (a) a 2D Shared Memory Arrangement; (b) Tile and halo showing a 6×6 block mapping of thread IDs to halo nodes.

More recently, languages have been developed that allow the programmer to implement algorithms without any knowledge of graphics APIs or architectures. One such language is NVIDIA CUDA (Compute Unified Device Architecture). CUDA, is NVIDIA's GPU technology that allows for programming of the GPU without any graphics knowledge. The C language model has at its core three key abstractions: hierarchies of thread groups (to allow for transparent scalability), shared memories (allowing access to low-latency cached memory), and barrier synchronization (to prevent race conditions). This breaks the task of parallelization into three sub problems, which allows for language expressivity when threads cooperate, and scalability when extended to multiple processor cores. CUDA allows a programmer to write kernels that when invoked execute thousands of lightweight identical threads in parallel. CUDA arranges these threads into a hierarchy of blocks and grids, as can be seen in FIG. 12, allowing for runtime transparent scaling of code within GPU. The threads are identified by their location within the grid and block, making CUDA well suited for tasks such as level set based image segmentations where each thread is easily assigned to an individual pixel or voxel, as described in Tejada E. et al., "Large steps in GPU-based deformable bodies simulation," Simulat Model Pract Theory" 13(8):703715, (2005).

According to one embodiment, the hybrid adaptive active model is implemented through a graphical processing unit (GPU) framework.

The GPU framework uses the CUDA toolkit to implement a sequential level set segmentation sequence according to Algorithm 1:

---

Algorithm 1: Sequential Level Set Segmentation

Input: Feature Image I, Initial Mask m, Threshold T, Range $\epsilon$, Iterations n, Reinitialize Every RI
Output: Nuclear Contours (boundaries)
Initialize $\phi_0$ to Signed Euclidean Distance Transform (SEDT) from mask m
Calculate Data Speed Term $D(I) = \epsilon - |I - T|$
forall the n Iterations do
| Calculate First Order Derivatives $\phi_x, \phi_y$.
| Calculate Second Order Derivatives $\phi_{xx}, \phi_{yy}, \phi_{xy}$.
| Calculate Curvature Terms $n^+, n^-$
| Calculate Gradient $\nabla \phi$
|
| Calculate Speed Term $F = \alpha D(\bar{x}) + (1 - \alpha) \nabla \cdot \frac{\nabla \phi}{|\nabla \phi|}$
|
| Update Level Set Function $\phi(t + \Delta t) = \phi(t) + \Delta t F |\nabla_\phi|$ -continued Algorithm 1: Sequential Level Set Segmentation

| if Iterations % RI = = 0 then
|    | Reinitialize φ to SEDT
| end
end

Specifically, the sequential level set segmentation sequence according to Algorithm 1 comprises the following steps (1) initializing φ with an initial contour or shape (for example an ellipse) and set n=0; (2) computing $u_{in}(\phi^n)$ and $u_{out}(\phi^n)$ from Equation (16); and (3) discretizing according to Equation (15) to obtain $$\phi^{n+1} = \phi^n + \Delta t \cdot \frac{\partial \phi}{\partial t}$$

with explicit forward Euler.

The GPU framework follows a parallel implementation scheme according to Algorithm 2:

Algorithm 2: Parallel Implementation

Initialize $\phi_{i,j}^0$, D on host memory
Allocate memory for $\phi^n$, $\phi^{n+1}$, D on device
Copy $\phi^0$, D from host to device
forall the n Iterations do
|    Execute Level Set Update CUDA Kernel $\phi_{i,j}^{n+1} = \phi_{i,j}^n + \Delta tF|\nabla\phi_{i,j}^n|$
|    Swap pointers of $\phi_{i,j}^n$, $\phi_{i,j}^{n+1}$
|    if Iterations % RIT S == 0 then
|    |    Copy φ from device to host
|    |    Reinitialize φ to Signed Euclidean Distance Transform
|    |    Copy φ from host to device
|    end
end
Copy φ from device to host According to one embodiment, the parallel implementation follows the structure shown in Algorithm 2. Input image, I and an initial contour φ (for example, a shape such as an ellipse) are both discretized and generated on equally sized 2D grids on CPU. The image and the computed contour φ are copied onto the GPU. From this point on, GPU effectively optimizes memory transfers with the central processing unit.

Kernel Threads Setup

According to one embodiment, a CUDA programming protocol is used. In CUDA, it is assumed that both the host (CPU) and device maintain their own DRAM. (see NVIDIA CUDA Programming Guide ver 2.2.1. described on the nvidia.com/object/cuda-develop website). Host memory is allocated using malloc and device memory is allocated using cudaMalloc. As memory bandwidth between the host memory and device memory is low (it is much lower than the bandwidth between the device and the device memory), it is recommended to keep the number of transfers to a minimum. In order to minimize the latency of accessing the shared memory, it is recommended to make the block size a multiple of 16 and use the cudaMallocPitch routine to allocate memory with padding if X dimension of the image is not a multiple of 16. Hence, most CUDA programs follow a standard structure of initialization, host to device data transfer, compute, and finally memory transfer of computed results from device to host. CUDA threads are assigned an unique thread ID that identifies its location within the thread block and grid. This provides a natural way to invoke computation across the image and level set domain, by using the thread IDs for addressing. This is best explained with Table 1. Assume an image has dimensions 4×4 and the block size is 2×2. Invoking the kernel with a grid size of 2 blocks×2 blocks results in the 16 threads shown in Table 1, in the form (threadIdx.y, threadIdx.x). These threads are grouped into blocks of four.

TABLE 1

| Threads of 16 IDs grouped into blocks of 4 | | | |
|---|---|---|---|
| (0, 0) | (0, 1) | (0, 1) | (0, 1) |
| (1, 0) | (1, 1) | (1, 0) | (1, 1) |
| (0, 0) | (0, 1) | (0, 0) | (0, 1) |
| (1, 0) | (1, 1) | (1, 0) | (1, 1) |

As each thread has access to its own threadIdx and blockIdx, global indices (i;j) are determined using the equations:

int i=blockIdx.x*blockDim.x+threadIdx.x;

int j=blockIdx.y*blockDim.y+threadIdx.y;

where blockDim.x and blockDim.y represent the dimensions of the block (which in this case are both equal to 2). Larger block sizes can be used keeping the block X dimension (BX) a multiple of 16 for maximum speed. Once these indices are set up, the level set update code is transferred to a CUDA kernel.

2D Shared Memory Optimization

Since finite differences are used to compute the curvature force in a grid cell, value from the neighboring grid cells are accessed. In order to keep the number of accesses to device memory at a minimum, on-chip shared memory is used.

Integrating use of the shared memory into the CUDA kernel requires partitioning the level set domain into tiles. For first order finite difference problems, such as the hybrid adaptive active contour model, each tile must also contain values for neighborhood nodes (often known as halo nodes) for the i±1 and j±1 elements, which are stored in separate tiles, so these must also be read into shared memory. As the size of the shared memory is only 16 KB, the sizes of the tiles and corresponding halo are limited. Micikevicius, P. ("3D Finite difference computation on GPUs using CUDA," In GPGPU-2: Proceedings of 2nd Workshop on General Purpose Processing on Graphics Processing Units, pages 79-84, New York, N.Y., USA, (2009). ACM) describes a framework for handling such a process. Such a process may serve as a good model for a multi GPU implementation, however the kernel will need to be modified as it is optimized for higher order stencils (without cross-derivative terms). Instead, a tiling code, adapted from Giles' (2008) "Jacobi iteration for Laplace discretization' algorithm" (Mike Giles. Jacobi iteration for a laplace discretization on a 3d structured grid. (2008)) is used, which supports cross-derivatives well. The shared memory management technique in this finite difference algorithm accelerates the global memory implementation by over an order of magnitude.

For a block (and tile) size of BX×BY there are 2×(BX+BY+2) halo elements, as can be seen in FIG. 12. In FIG. 12, darker elements represent the thread block (the active tile) and the lighter elements represent the halo. In this manner, the domain of the computation is partitioned and results in overlapping halo nodes.

Each thread loads $\phi_n$ values from global memory to the active tile stored in shared memory. However, depending on the location of the thread within the thread block, it may also load a single halo node into the shared memory. Therefore in order to load all halo nodes, this technique assumes that there are at least as many interior nodes as there are halo nodes.

Before data can be loaded into the halos, the thread ID needs to be mapped to the location of a halo node both within the halo and within the global indices.

The first 2×(BX+BY+2) threads are assigned to load values into the halo in this manner, for example, 6×6 thread block as shown in FIG. 12 (b). This method of loading elements has been chosen in order to maximize coalescence. Not only are the interior tile nodes loaded coalesced, but as can be seen above, the first 12 elements of the thread block load they halos (above and below the interior tile excluding corners) in a coalesced manner. The side halos (x halos) loads are non-coalesced. When writing back results to global memory, as only the interior nodes have updated values they are written to global memory coalesced.

Calculation of Forces

To compute $u_{in}$ and $u_{out}$, the computing device starts by computing the value of $u_{in}$ and $u_{out}$ in each grid cell, storing them in a temporary array. Since these are scalars values, a reduction technique is used, cutting the time spent to O(log n) time assuming an infinite number of threads. In a reduction technique described in Madabhushi (Madabhushi, A. "Digital Pathology Image Analysis: Opportunities and Challenges," (Editorial), Imaging in Medicine, vol. 1(1), pp. 7-10, 2009), a binary function is performed on all elements in an array; this can be done in a tree-like fashion, where the given operation can be performed concurrently on different parts of the array, and allows for combining the results at the end. NVIDIA has created an STL-like C++ library called Thrust that, among other things, can perform reduction technique efficiently on the GPU.

Hereafter, the computing device uses the values for $u_1$ and $u_2$ computed above to compute the image forces including the term $\lambda_1(f-u_1)^2+\lambda_2(f-u_2)^2$ in Equation (16) and the $F_{shape}$ term. Next, the computing device updates the next iteration. The final step is to copy the new $\phi$ back to the CPU.

System for Segmenting Single Non-overlapping Objects or Multiple Overlapping/Occluded Objects in an Image Scene The present invention provides a system for simultaneous segmentation of single non-overlapping and multiple overlapping/occluded objects in an image scene using a hybrid adaptive active contour model that requires minimal user intervention and that segments all overlapping and non-overlapping objects simultaneously. The hybrid adaptive active contour model is able to handle overlaps between multiple intersecting and adjacent objects. The system synergistically combines shape priors with boundary and region-based active contours in a level set formulation with a watershed scheme for model initialization for identifying and resolving multiple object overlaps in an image scene. The system allows ease of handling of topological changes of object boundary such as splitting or merging.

According to another aspect, the present invention provides a system for segmenting single non-overlapping objects or multiple overlapping/occluded objects in an image scene via a hybrid adaptive active contour model incorporating shape priors, comprises:

(a) a computing device configured to input the image scene;

(b) the computing device configured to collect a plurality of shapes, wherein the shapes correspond to the objects in the image scene;

(c) the computing device configured to determine a set of alignment parameters by performing a similarity transformation;

(d) the computing device configured to align the plurality of collected shapes in (b) to create a plurality of aligned shapes, such that the plurality of aligned shapes have the same pose compared to a reference shape based on the similarity transformation of (b);

(e) the computing device configured to create a training set, wherein the training set comprises the plurality of aligned shapes in (d), wherein each aligned shape of the plurality of aligned shapes is embedded as a zero level set of a higher dimensional embedding function describing a surface;

(f) the computing device configured to generate a shape prior;

(g) the computing device configured to integrate a shape term, wherein each aligned shape of the plurality of aligned shapes is embedded as the zero level set of the higher dimensional surface, and wherein the shape term is a signed distance function (SDF) used to encode the distance of the shape contour of each aligned shape to the nearest point in the shape space of the higher dimensional surface;

(h) the computing device configured to integrate a boundary-based term to direct the hybrid adaptive active contour model to a boundary of at least one object of the objects in the image scene;

(i) the computing device configured to integrate a region homogeneity term, wherein the region homogeneity term drives the shape term towards a homogeneous intensity region using the shape prior;

(j) the computing device configured to initialize the hybrid adaptive active contour model by a watershed transformation method comprising delineating object boundaries of at least one target object in the image scene, (k) the computing device configured to perform contour propagation of the delineated shape boundaries by evolving the integrated synergistic shape functional by minimizing variational energy; and (l) the computing device configured to achieve final segmentation of the image scene.

According to some embodiments, any object of interest can be segmented with trained shape prior of the object of interest, i.e., applications of the method are not limited to medical imaging. According to some embodiments, the object of interest that can be segmented with trained shape prior of the object of interest is a medical imaging application. According to some embodiments, the system is capable of resolving single non-overlapping objects or multiple overlapping/occluded objects simultaneously in the image scene of a histopathology sample. According to some embodiments, the histopathology sample has been stained by a histochemical staining method. Exemplary histochemical staining methods include but are not limited to a monoclonal antibody, a polyclonal antibody, CD34, hematoxylin & eosin, Hoeschst stain, 4',6-diamidino-2-phenylindole (DAPI), etc.

According to some such embodiments, the single non-overlapping objects or multiple overlapping/occluded objects in the image scene of the histopathology sample comprise nuclear and glandular structures. According to some such embodiments, the single non-overlapping objects or multiple overlapping/occluded objects in the image scene of the histopathology sample comprises cells, nuclei, and a combination thereof. Exemplary cells include but are not limited to epithelial cells, breast cancer cells, prostate cancer cells, lung cancer cells, pancreatic cancer cells, colon cancer cells, bone cancer cells, lymphocytes, and any other pluripotent cancer cells. According to some such embodiments, the overlapping/occluded objects in the image scene of the histopathology sample include nuclei. According to some embodiments, the method includes segmenting overlapping structures on microscopic light and confocal images, e.g., cells.

According to some embodiments, the system is capable of resolving single non-overlapping objects or multiple overlapping/occluded lymphocytes and nuclei in the histopathology sample with at least 90% accuracy.

According to one embodiment, the hybrid adaptive active contour model defines an energy functional, F, which is composed of three complimentary terms (A) a shape term, $F_{shape}$; (B) a boundary-based region homogeneity term, $F_{region}$; and (C) a region homogeneity term, $F_{region}$.

(a) A Computing Device Configured to Input the Image Scene

According to some embodiments, the system for segmenting single non-overlapping objects or multiple overlapping/occluded objects in an image scene via a hybrid adaptive active contour model comprises (a) a computing device configured to input the image scene.

(b) The Computing Device Configured to Collect a Plurality of Shapes Via a Computing Device According to some embodiments, the system for segmenting single non-overlapping objects or multiple overlapping/occluded objects in an image scene via a hybrid adaptive active contour model comprises (b) the computing device configured to collect a plurality of shapes, wherein the shapes correspond to the objects in the image scene. According to some embodiments, the shapes in the image scene are curves, circles, ellipses, parabolas, hyperbolas, planes, polygons, any two-dimensional shape of interest or a combination thereof. According to one embodiment, the plurality of shapes in the image scene comprises a plurality of ellipses.

According to one embodiment, the image scene is a multi-dimensional image scene described by a multi-dimensional grid comprising grid cells and grid points. According to one embodiment, the image scene is a two-dimensional image scene described by a two-dimensional grid comprising grid cells and grid points. According to one embodiment, the image scene is a three-dimensional image scene described by a three-dimensional grid comprising grid cells and grid points.

According to another embodiment, the image scene is a two-dimensional image scene described by a two-dimensional M-by-N grid comprising grid cells and grid points, wherein the spacing between the grid cells is h, and wherein the grid points are $(x_i, y_j)=(i_h, j_h)$, such that $0 \leq i \leq M$ and $0 \leq j \leq N$, and $M=\{1, 2, \ldots n\}$ and $N=\{1, 2, \ldots n\}$. According to one embodiment, the image scene is a two-dimensional image scene described by a two-dimensional 256×256 grid. According to one embodiment, the image scene is a two-dimensional image scene described by a two-dimensional 512×512 grid.

According to one embodiment, the two-dimensional image scene $\mathcal{E}$ is defined as $\mathcal{E} = (C, f)$, where C is a two-dimensional (2D) grid comprising a plurality of pixels c, wherein $c \in C$, $c=(x,y)$ representing Cartesian coordinates of a pixel c. A function $f(c)$ assigns intensity values to pixel c, $c \in C$, and is defined as $f(c) \in \mathbb{R}^3$. For gray scale or scalar images, a function $f_g(c)$ assigns intensity values to pixel c, $c \in C$, and is defined as $f_g(c) \in \mathbb{R}$. $\mathbb{R}$ is set of real numbers that defines a 2D region.

(c) The Computing Device Configured to Determine a Set of Alignment Parameters Via the Computing Device According to some embodiments, the system for segmenting single non-overlapping objects or multiple overlapping/occluded objects in an image scene via a hybrid adaptive active contour model comprises (c) the computing device configured to determine a set of alignment parameters by performing a similarity transformation.

According to one embodiment, the set of alignment parameters comprises an isotropic scaling factor, a translation vector, a rotation matrix, and a combination thereof. According to one embodiment, the similarity transformation comprises a Euclidean Similarity Transformation (EST).

An EST of a point $x_p$ into a point $x'_p$ is defined by the transformation described as in Equation (1):

$$x'_p = \alpha R x_p + T \quad (1),$$

wherein $\alpha$ is the isotropic scaling factor, R is the rotation matrix, and T is the translation vector. For each training shape, the set of parameters ($\alpha$, R, T) is found in order to adjust the training shape to the same pose (i.e., same position, orientation and scale) as compared to a predefined reference shape, that is arbitrarily chosen.

(d) The Computing Device Configured to Align the Plurality of Collected Shapes

According to some embodiments, the system for segmenting single non-overlapping objects or multiple overlapping/occluded objects in an image scene via a hybrid adaptive active contour model comprises (d) the computing device configured to align the plurality of collected shapes to create a plurality of aligned shapes, such that the plurality of aligned shapes have the same pose compared to a reference shape based on the similarity transformation of (b).

According to one embodiment, the computing device (d) configured to align the plurality of collected shapes further comprises the computing device configured to compute the distance between the centroid of a target training shape $(x_i, y_i)$ and the centroid of a reference shape $(x_j, y_j)$ to determine the translation vector T, described as in Equation (2):

$$T = \sqrt{(x'_i - x_j)^2 + (y'_i - y_j)^2} \ldots \quad (2).$$

According to one embodiment, the computing device configured to align the plurality of collected shapes (d) further comprises the computing device configured to compute the ratio of enclosed area of a reference shape ($A_{reference}$) over area of a target training shape ($A_{target}$) to determine the isotropic scaling factor $\alpha$, described as in Equation (3):

$$\alpha = \frac{|A_{reference}|}{|A_{target}|}. \quad (3)$$

According to one embodiment, the computing device configured to align the plurality of collected shapes (d) further comprises the computing device configured to compute a rotation matrix $R(\theta)$, described as in Equation (4):

$$R(\theta) = \begin{bmatrix} \cos(\theta) & -\sin(\theta) \\ \sin(\theta) & \cos(\theta) \end{bmatrix}. \quad (4)$$

(e) The Computing Device Configured to Create a Training Set

According to one embodiment, a level set method is employed for the purposes of model training. According to one embodiment, the system for segmenting single non-overlapping objects or multiple overlapping/occluded objects in an image scene via a hybrid adaptive active contour model comprises (e) the computing device configured to create a training set, wherein the training set comprises the plurality of aligned shapes, wherein each aligned shape of the plurality of aligned shapes is embedded as a zero level set of a higher dimensional embedding function describing a surface. According to one embodiment, the training set comprises shapes which are view angle independent or less affected by view angles. According to one embodiment, the training set comprises shapes which are subject to affine transformations.

According to one embodiment, the at least one shape of the plurality of aligned shapes is embedded as a zero level set of a higher dimensional embedding function describing a surface. According to one embodiment, the points on the surface encode the distance to the nearest point in the shape, with negative distance inside and positive distance outside the shape. According to one embodiment, each aligned shape of the plurality of aligned shapes is embedded as the zero level set of the higher dimensional surface.

According to one embodiment, the level set function $\psi_i$, is a matrix (or signed distance function). According to one embodiment, the level set function $\psi_i$, is of the same size as the training shape template. According to one embodiment, the level set function $\psi_i$, is defined as in Equation (5):

$$\psi_i = \begin{cases} 0 & S, \\ -D((x, y), S) & (x, y) \in \Omega_f, \\ D((x \cdot y), S) & (x, y) \in \Omega_b \end{cases} \quad (5)$$

where $D((x, y), S)$ is a function that returns the minimum Euclidean distance between the grid pixel $(x, y)$; $S$ is the shape contour; $\Omega_f$ is the foreground region; and $\Omega_b$ is the background region.

According to one embodiment, the computing device (e) configured to create a training set comprises the computing device configured to convert the level set function $\psi_i$ into feature vectors. According to one embodiment, the level set function $\psi_i$ is rearranged into column vectors, which form a matrix $M=\psi_1, \psi_2, \ldots, \psi_n$, where M is a N×n matrix, N is the dimensionality of the feature vectors and n is the number of training samples. The dimensionality of the data is reduced by applying principal component analysis (PCA). Assuming that the probability density function (PDF) of the training set is Gaussian, then the PDF associated with the projected data is given as in Equation (6):

$$P(x_{pca}) = \frac{1}{(2\pi)^{p/2}|\wedge_p|^{1/2}} \exp\left(-\frac{1}{2} x_{pca}^T \wedge_p^{-1} x_{pca}\right), \quad (6)$$

where $x_{pca}$ represents projected data from PCA and $\wedge_p$ is a diagonal matrix containing the first p eigenvalues.

(f) The Computing Device Configured to Generate a Shape Prior

According to one embodiment, the system for segmenting single non-overlapping objects or multiple overlapping/occluded objects in an image scene via a hybrid adaptive active contour model comprises (f) the computing device configured to generate a shape prior. According to one embodiment, the computing device (f). configured to generate a shape prior further comprises: (i) the computing device configured to minimize the probability distribution function (PDF) of the training set, (ii) the computing device configured to compute a similarity transform of the shape prior, and (iii) the computing device configured to encode the similarity transform of the shape prior into the hybrid active contour model.

According to one embodiment, the shape prior is constructed using a statistical method described in Chan, T., "Level set based shape prior segmentation," IEEE Computer Society Conference on Computer Vision and Pattern Recognition, 2005, 2: 1164-1170.

According to one embodiment, the computing device (i) is configured to minimize the probability distribution function (PDF) of the training set as described in Equation (6) and further configured to change a size of a principle axis with a Gaussian probability function.

According to one embodiment, the computing device (ii) is configured to compute the similarity transform of the shape prior comprises applying Principle Component Analysis (PCA) and a Signed Distance Function (SDF) and computing a similarity transform $A_S$ of the shape prior, described as $A_s=(\alpha, R, T)$ by performing a Euclidean Similarity Transformation (EST).

According to one embodiment, the computing device (iii) is configured to encode the similarity transform $A_s$, described as $A_s=(\alpha, R, T)$ of the shape prior into the hybrid active contour model to give $\psi(x_{pca}=\psi_0(A_s(x_{pca}))$.

An EST of a point $x_p$ into a point $x'_p$ is defined by the transformation described as in Equation (1):

$$x'_p = \alpha R x_p + T \quad (1),$$

wherein $\alpha$ is the isotropic scaling factor, R is the rotation matrix, and T is the translation vector. For each training shape, the set of parameters $(\alpha, R, T)$ is found in order to adjust the training shape to the same pose (i.e., same position, orientation and scale) as compared to a predefined reference shape, that is arbitrarily chosen.

According to one embodiment, the computing device (ii) configured to compute the similarity transform of the shape prior further comprises the computing device configured to compute the distance between the centroid of a target training shape $(x_i, y_i)$ and the centroid of a reference shape $(x_j, y_j)$ to determine the translation vector T, described as in Equation (2):

$$T = \sqrt{(x'_i - x_j)^2 + (y'_i - y_j)^2} \ldots \quad (2).$$

According to one embodiment, the computing device (ii) configured to compute the similarity transform of the shape prior further comprises the computing device configured to compute the ratio of enclosed area of a reference shape ($A_{reference}$) over area of a target training shape ($A_{target}$) to determine the isotropic scaling factor $\alpha$, described as in Equation (3):

$$\alpha = \frac{|A_{reference}|}{|A_{target}|}. \quad (3)$$

According to one embodiment, the computing device (ii) configured to compute the similarity transform of the shape prior further comprises the computing device configured to compute a rotation matrix $R(\theta)$, described as in Equation (4):

$$R(\theta) = \begin{bmatrix} \cos(\theta) & -\sin(\theta) \\ \sin(\theta) & \cos(\theta) \end{bmatrix}. \quad (4)$$

According to some embodiments, the shapes in the image scene are curves, circles, ellipses, parabolas, hyperbolas, a planes, polygons, or a combination thereof. According to one embodiment, the shapes in the image scene are ellipses.

According to one embodiment, the computing device (f) configured to generate the shape prior comprises the computing device configured to generate ellipses (i) by changing a size of a principle axis with a Gaussian probability function and (ii) by applying Principle Component Analysis (PCA) and a Signed Distance Function (SDF).

According to one embodiment, the shape prior is composed of the mean level set shape and a weighted sum of m strongest eigen modes of variation (obtained from the PCA of SDFs).

(g) The Computing Device Configured to Integrate a Shape Term

According to some embodiments, the system for segmenting single non-overlapping objects or multiple overlapping/occluded objects in an image scene via a hybrid adaptive active contour model comprises (g) the computing device configured to integrate a shape term via the computing device, wherein each aligned shape of the plurality of aligned shapes is embedded as the zero level set of the higher dimensional surface, and wherein the shape term is a signed distance function (SDF) used to encode the distance of the shape contour of each aligned shape to the nearest point in the shape to the nearest point in shape space of the higher dimensional surface.

(A) Shape Term—$F_{shape}$

According to one embodiment, the at least one shape of the plurality of aligned shapes is embedded as the zero level set of the higher dimensional embedding function describing the surface. According to one embodiment, the points on the surface encode the distance to the nearest point in the shape, with negative distance inside and positive distance outside the shape. According to one embodiment, each aligned shape of the plurality of aligned shapes is embedded as the zero level set of the higher dimensional surface.

According to one embodiment, the level set function is a signed distance function (SDF) used to encode the distance to the nearest point in the at least one shape of the plurality of collected and aligned shapes. According to one embodiment, the signed distance function (SDF) is a shape term $F_{shape}$, a functional that depends on the active contour providing the boundaries.

The shape term $F_{shape}$ evaluates the shape difference between the level set 0 and the zero level set of the shape prior function ψ at each iteration of the model training process. It should be noted that PCA applied on aligned SDFs of a training set produces shape functions very similar to SDFs.

According to one embodiment, the shape term $F_{shape}$ is described in Equation (7) as: $F_{shape}=\int_\Omega(\phi(x)-\psi(x))^2|\nabla\phi|\delta(\phi)dx$ (7), where $\phi(x)$ is a level set function, $\psi(x)$ is the shape prior, $\delta(\phi)$ is a Dirac function, and is a contour measure on $\{\phi=0\}$. Since φ undergoes a similarity transformation to adjust the pose and scale, $F_{shape}$ can also be written in terms of rotation, translation and scaling factor using standard linear transformations, such as Euclidean Similarity Transformation (EST).

A Dirac function or Dirac delta function or δ function is a function on a real line which is zero everywhere except at the origin, where it is infinite. A Dirac function $\delta(\phi)$ is described as:

$$\delta(\phi) = \begin{cases} +\infty, & \phi(c) = 0 \\ 0, & \phi(c) \neq 0 \end{cases},$$

where $\phi(c)$ is a level set function.

The shape prior ψ, can be obtained by a principal component analysis (PCA) as described in Cootes et al. who proposed to use principal component analysis (PCA) to capture the main shape variations of parametric active contours (active shapes) within a training set and thus to represent the prior shape information. (T. F. Cootes, D. Cooper, C. J. Taylor and J. Graham, "Active Shape Models—Their Training and Application," Computer Vision and Image Understanding. Vol. 61, No. 1, January 1995, pp. 38-59)

The shape prior ψ can be constructed using a level set function by a statistical method described in Chan, T., "Level set based shape prior segmentation," IEEE Computer Society Conference on Computer Vision and Pattern Recognition, 2005, 2: 1164-1170.

According to one embodiment, the level set function $\psi_i$, is a matrix (or signed distance function). According to one embodiment, the level set function $\psi_i$, is of the same size as the training shape template. According to one embodiment, the level set function $\psi_i$, is defined as in Equation (5):

$$\psi_i = \begin{cases} 0 & S, \\ -D((x,y),S) & (x,y) \in \Omega_f, \\ D((x\cdot y),S) & (x,y) \in \Omega_b \end{cases} \quad (5)$$

where $D((x, y), S)$ is a function that returns the minimum Euclidean distance between the grid pixel (x, y); S is the shape contour; $\Omega_f$ is the foreground region; and $\Omega_b$ is the background region.

According to one embodiment, the shape term $F_{shape}$ introduces the shape prior in such a way that only objects of interest similar to the shape prior can be recovered, and all unfamiliar image structures are suppressed, such that a single level set that is consistent with the shape prior is solved.

(h) The Computing Device Configured to Integrate a Boundary-Based Term

According to one embodiment, the system for segmenting single non-overlapping objects or multiple overlapping/occluded objects in an image scene via a hybrid adaptive active contour model comprises (h) the computing device configured to integrate a boundary-based term. According to one embodiment, the computing device (h) configured to integrate the boundary-based term further comprises (i) the computing device configured to change a size of a principle axis with a Gaussian probability function by applying Principle Component Analysis (PCA), to direct the hybrid adaptive active contour model to a boundary of at least one object of the objects in the image scene.

(B) Boundary-Based Term

According to one embodiment, the boundary-based term, $F_{boundary}$ directs the hybrid adaptive active contour model to the image gradient, wherein the image gradient is a derivative of the image scene.

According to one embodiment, $F_{boundary}$ is described as: $F_{boundary}=\int_0^T g(|\nabla I(C(q))|)|C'(q)|dq$, where C is the active contour, and g is an edge detecting function, q is the pixel value, and $\nabla I$ is the gradient of the image.

According to one embodiment, $F_{boundary}$ is defined as: $F_{boundary}=\int_\Omega g(f(x))|\nabla H(\phi)|dx$, where g is an edge detecting function, $f(x)$ is the data (image), and $\nabla H(\phi)$ denotes the gradient of Heaviside function, φ is a level set.

According to one embodiment, the shape prior ψ, is obtained by a principal component analysis (PCA) as described in Cootes et al. (T. F. Cootes, D. Cooper, C. J. Taylor and J. Graham, "Active Shape Models—Their Training and Application," Computer Vision and Image Understanding. Vol. 61, No. 1, January 1995, pp. 38-59), who proposed to use principal component analysis (PCA) to capture the main shape variations of parametric active contours (active shapes) within a training set and thus to represent the prior shape information.

According to one embodiment, the shape prior ψ is constructed using a level set function by a statistical method described in Chan, T., "Level set based shape prior segmentation," IEEE Computer Society Conference on Computer Vision and Pattern Recognition, 2005, 2: 1164-1170.

According to one embodiment, the shape prior ψ is obtained by: (i) minimizing the probability distribution function (PDF) of the training set as described in Equation (6), (ii) computing a similarity transform $A_s$ of the shape prior, described as $A_s=(\alpha, R, T)$ by performing a Euclidean Similarity Transformation (EST), and (iii) encoding the similarity transform $A_s$, described as $A_s=(\alpha, R, T)$ of the shape prior into the hybrid active contour model to give $\psi(x_{pca})=\psi_0(A_s(c_{pca}))$.

(i) The Computing Device Configured to Integrate a Region Homogeneity Term

According to some embodiments, the system for segmenting single non-overlapping objects or multiple overlapping/occluded objects in an image scene via a hybrid adaptive active contour model comprises (i) the computing device configured to integrate a region homogeneity term, wherein the region homogeneity term is capable of driving the shape term towards a homogeneous intensity region using the shape prior.

(C) Region Homogeneity Term

According to one embodiment, the region homogeneity term, $F_{region}$, is capable of driving the shape prior and the active contour towards a homogeneous intensity region corresponding to the shape of interest.

A Mumford-Shah (MS) model is used to segment objects with smooth intensity surface, as described in Chan et al., "Active contours without edges," IEEE TIP, vol. 10, no. 2, pp. 266-277, February 2001. The region homogeneity term is computed by applying the Mumford-Shah (MS) model on the shape prior, as described in Chan et al., "Level set based shape prior segmentation," in CVPR, 2005, 2: 1164-1170. Application of the MS model on the shape prior globally drives the shape prior towards a homogenous intensity region with the shape of interest.

According to one embodiment, the functional $F_{region}$ can be described as in Equation (8), incorporating the shape function ψ and statistics of partitioned foreground and background regions, $u_{in}$ and $u_{out}$:

$$F_{region}(\psi, u_{in}, u_{out}) = \int_\Omega \Theta_{in} H_\psi dx + \int_\Omega \Theta_{out} H - \psi dx, \quad (8)$$

where ψ is the shape prior, and H(.) is a Heaviside function, $\Theta_r$, defined as:

$$\Theta_r = I - u_r|^{2+\mu|\nabla} u_r|^2 \text{ and } r \in \{in, out\}.$$

A Heaviside function H is an integral of the Dirac delta function. Hence, $H' = \delta(\phi)$. The Heaviside function $H(\phi)$ is described as:

$$H(\phi) = \begin{cases} 1, & \phi(c) \geq 0; \\ 0, & \phi(c) < 0. \end{cases}$$

where $\phi(c)$ is a level set function.

(j) The Computing Device Configured to Initialize the Hybrid Adaptive Active Contour Model According to one embodiment, the system for segmenting single non-overlapping objects or multiple overlapping/occluded objects in an image scene via a hybrid adaptive active contour model comprises (j) the computing device configured to initialize the hybrid adaptive active contour model by a watershed transformation method comprising delineating object boundaries of at least one target object in the image scene. According to one embodiment, the computing device (j) configured to initialize the hybrid adaptive active contour model by the watershed transformation method comprising the computing device configured to delineate object boundaries of at least one target object in the image scene, is further configured:

(1) to create a binary mask enclosing the target object to form a closed sub-contour surrounding the target object;

(2) to detect concavity points in the at least one target object by comparing an area enclosed within the closed sub-contour surrounding the at least one target object with a predetermined area of a reference object;

(3) to determine a number of the detected concavity points;

(4) to ascertain a condition of the at least one target object based on the determined number of concavity points, such that the determined number of concavity points is equal to the number of overlapping target objects in the image scene, wherein the condition of the at least one target object is selected from: (i) the at least one target object in the image scene includes a single non-overlapping object or (ii) the at least one target object in the image scene includes multiple overlapping/occluded objects;

(5) to select at least one energy functional selected from the group consisting of (A) the shape term, (B) the boundary-based term, (C) the region homogeneity term, or a combination thereof, based on the ascertained condition of the at least one target object;

(6) to combine the at least one selected energy functional with the shape prior to yield at least one initial level set described by an integrated synergistic shape functional; and (7) to place the at least one initial level set on the at least one target object in the image scene According to some embodiments, any object of interest can be segmented with trained shape prior of the object of interest, i.e., applications of the method are not limited to medical imaging. According to some embodiments, the object of interest that can be segmented with trained shape prior of the object of interest is a medical imaging application. According to some such embodiments, the single non-overlapping objects or multiple overlapping/occluded objects in the image scene of the histopathology sample comprise nuclear and glandular structures. According to some such embodiments, the single non-overlapping objects or multiple overlapping/occluded objects in the image scene of the histopathology sample comprises cells, nuclei, and a combination thereof. Exemplary cells include but are not limited to epithelial cells, breast cancer cells, prostate cancer cells, lung cancer cells, pancreatic cancer cells, colon cancer cells, bone cancer cells, lymphocytes, and any other pluripotent cancer cells. According to some such embodiments, the overlapping/occluded objects in the image scene of the histopathology sample include nuclei. According to some embodiments, the method includes segmenting overlapping structures on microscopic light and confocal images, e.g., cells.

(1) The Computing Device Configured to Create a Binary Mask

According to one embodiment, the computing device (j) configured to delineate object boundaries of at least one target object in the image scene further comprises (1) the computing device configured to create a binary mask enclosing the target object to form a closed sub-contour surrounding the target object. A binary mask refers to an image where all pixels except for the foreground are unity and all background pixels are zero. A binary mask converts an image to black and white wherein object of interest is white and rest of the image is black.

(2) The Computing Device Configured to Detect Concavity Points

According to one embodiment, the computing device (j) configured to delineate object boundaries of the at least one target object in the image scene further comprises (2) the computing device configured to detect concavity points in the at least one target object by comparing an area enclosed within the closed sub-contour surrounding the at least one target object with a predetermined area of a reference object.

For example, high concavity points are characteristic of contours that enclose multiple objects and represent junctions where object intersection occurs, for example as observed in nuclei, as depicted in FIG. 2. For example, an area $\mathcal{A}(s)$ of the closed sub-contours is compared to a predetermined area of reference object $T_{A,A}$. The sub-contour can be further split, provided $\mathcal{A}(s) > T_{A,A}$. Since c=(x, y), the difference between any two points $c_w$, and $c_{w-1}$ represents a two-dimensional vector. Concavity points are detected by computing the angle between vectors defined by three consecutive points) ($c_{w-1}$, $c_w$, $c_{w+1}$)∈s. The degree of concavity/convexity is proportional to an angle $\theta(c_w)$, for example as shown in FIG. 1(d). The angle $\theta(c_w)$ can be computed from the dot product relation as described in Equation (9):

$$\theta(c_w) = \pi - \arccos\left(\frac{(c_w - c_{w-1}) \cdot (c_{w+1} - c_w)}{\|c_w - c_{w-1}\|\|c_{w+1} - c_w\|}\right). \quad (9)$$

(3) The Computing Device Configured to Determine a Number of the Detected Concavity Points According to one embodiment, the computing device (j) configured to delineate object boundaries of the at least one target object in the image scene further comprises (3) the computing device configured to determine a number of the detected concavity points.

According to one embodiment, when the number of detected concavity points is low, such that $c_w \leq 1$, the target object in the image scene includes a single non-overlapping object. According to one embodiment, when the number of detected concavity points is more than one, such that $c_w > 1$, the target object in the image scene includes multiple overlapping/occluded objects.

(4) The Computing Device Configured to Ascertain a Condition of the at Least One Target Object According to one embodiment, the computing device (j) configured to delineate object boundaries of the at least one target object in the image scene further comprises (4) the computing device configured to ascertain a condition of the at least one target object based on the determined number of concavity points, such that the determined number of concavity points is equal to the number of overlapping target objects in the image scene, wherein the condition of the at least one target object is selected from the group consisting of: (i) the at least one target object in the image scene includes a single non-overlapping object or (ii) the at least one target object in the image scene includes multiple overlapping/occluded objects.

(5) The Computing Device Configured to Select at Least One Energy Functional

According to one embodiment, the computing device (j) configured to delineate object boundaries of the at least one target object in the image scene further comprises (5) the computing device configured to select at least one energy functional selected from the group consisting of (A) the shape term, (B) the boundary-based term, (C) the region homogeneity term, or a combination thereof, based on the ascertained condition of the at least one target object such that if the ascertained condition is (i), the region homogeneity term is selected; or if the ascertained condition is (ii), the shape term, the boundary-based term, and the region homogeneity term are selected.

(6) The Computing Device Configured to Combine at Least One Selected Energy Functional with the Shape Prior According to one embodiment, the computing device (j) configured to delineate object boundaries of the at least one target object in the image scene further comprises (6) the computing device configured to combine the at least one selected energy functional with the shape prior to yield at least one initial level set described by an integrated synergistic shape functional.

According to one embodiment, the computing device (6) configured to combine the at least one selected energy functional with the shape prior to yield at least one initial level set described by an integrated synergistic shape functional further comprises the computing device configured to combine (A) the shape term $F_{shape}$, (B) the boundary-based term $F_{boundary}$, and (C) the region homogeneity term $F_{region}$ by integrating the shape prior with local and global intensity information obtained from the boundary-based term $F_{boundary}$ and the region homogeneity term $F_{region}$ to yield at least one level set described by an integrated synergistic shape functional F, according to the hybrid adaptive active contour model described in Equation (10):

$$F = F_1 + F_{region}(\psi, u_{in}, u_{out}), \quad (10)$$

where the term, $F_1$ is related to a shape and boundary force term, defined as:

$F_1 = \beta_1 F_{boundary}(C) + \beta_2 F_{shape}(\phi, \psi)$, wherein and $\beta_1$ and $\beta_2$ are arbitrary positive constants that balance the contributions of the boundary, and shape terms, respectively.

According to one embodiment, the term $F_1$ can be re-written as:

$\beta_s \int_\Omega (\phi(x) - \psi(x))^2 |\nabla \phi| \delta(\phi) dx$, wherein $\beta_s$ is an arbitrary positive constant that balance the contributions of the boundary and shape terms.

According to one embodiment, Equation (10) can be rearranged as Equation (11) describing the level set formulation of the integrated synergistic shape functional, F:

$$F(\phi, \psi u_{in}, u_{out}) = \beta_s \int_\Omega (\phi(x) - \psi(x))^2 |\nabla \phi| \delta(\phi) dx + \beta_T \int_\Omega (\Theta_{in} H_\psi + \int_\Omega \Theta_{out} H_{-\psi}) dx, \quad (11)$$

where $\beta_s$ and $\beta_T$ are arbitrary positive constants that balance the contributions of the boundary, shape and region terms According to one embodiment, the integrated synergistic shape functional is capable of allowing for segmentation of a single non-overlapping object at a time.

According to one embodiment, the integrated synergistic shape functional F as described in Equation (11) is capable of allowing for segmentation of a single object at a time.

According to some embodiments, the integrated synergistic shape functional is capable of allowing for segmentation of multiple overlapping/occluded objects at the same time.

According to one embodiment, the integrated synergistic shape functional is capable of allowing for segmentation of multiple overlapping/occluded objects at the same time by the method described in Zhang et al., "Segmenting multiple familiar objects under mutual occlusion," in ICH', 2006, for segmentation of objects of familiar shape simultaneously in the presence of occlusions.

According to one embodiment, the computing device (6) configured to combine the at least one selected energy functional with the shape prior to yield at least one initial level set described by an integrated synergistic shape functional comprises the computing device configured to combine (A) the shape term, (B) the boundary-based term, and (C) the region homogeneity term, by integrating the shape prior with local and global intensity information obtained from the boundary-based term and the region homogeneity term for an image with N independent multiply placed familiar objects of a set $O_i$, where $O_i \in \{O_1, O_2, \ldots, O_n\}$, and wherein $O_i$ is associated with a level set characteristic function, $\chi_i$ such that:

$$\chi_i(x) = \begin{cases} 1 & \text{if } x \in O_i, \\ 0 & \text{otherwise.} \end{cases}$$

to yield at least one level set described by an integrated synergistic shape functional $F(\phi, \psi, u_{in}, u_{out})$ according to the hybrid adaptive active contour model.

According to one embodiment, the one level set characteristic function is associated per object such that any $O_a$, and $O_b$ of the set $O_i$, where $a, b \in \{1, \ldots, n\}$ are allowed to overlap with each other within the image. In one embodiment, the level set characteristic function is positive within the area of overlap, such that the shape prior extracted from the objects of the image is enforced.

According to one embodiment, the computing device (6) configured to combine the at least one selected energy functional with the shape prior to yield at least one initial level set described by an integrated synergistic shape functional further comprises the computing device configured to combine the shape term, the boundary-based term, and the region homogeneity term, by integrating the shape prior with local and global intensity information for an image with N independent familiar objects of a set $O_i$, where $O_i \in \{O_1, O_2, \ldots, O_n\}$, and wherein $O_i$ is associated with a level set characteristic function, $\chi_i$ such that:

$$\chi_i(x) = \begin{cases} 1 & \text{if } x \in O_i, \\ 0 & \text{otherwise.} \end{cases}$$

where $N=1, \ldots, n$, to yield N level sets described by the integrated shape functional, $F(\phi, \psi, u_{in}, u_{out})$ according to the hybrid adaptive active contour model, wherein the integrated synergistic shape functional, $F(\phi, \psi, u_{in}, u_{out})$ is described as in equation (12):

$$F(\phi, \psi, u_{in}, u_{out}) = \qquad (12)$$

$$\sum_{a=1}^{N} \int_\Omega (\phi_a(x) - \psi(x))^2 |\nabla \phi_a| \delta(\phi_a) dx + \beta_r \int_\Omega \Theta_{in} H_{\chi 1 \vee \chi 2} dx +$$

$$\int_\Omega \Theta_{out} - H_{\chi 1 \vee \chi 2} dx + \omega \sum_{a \neq b} \int_\Omega H_{\chi 1 \wedge \chi 2} dx + \sum_{a=1}^{N} \int_\Omega (\phi_a - \psi_a)^2 dx$$

According to one embodiment, the computing device (6) configured to combine the at least one selected energy functional with the shape prior to yield at least one initial level set described by an integrated synergistic shape functional further comprises the computing device configured to combine (A) the shape term $F_{shape}$, (B) the boundary-based term $F_{boundary}$, and (C) the region homogeneity term $F_{region}$, by integrating the shape prior with local and global intensity information obtained from the boundary-based term $F_{boundary}$ and the region homogeneity term $F_{region}$ for an image with two similarly placed familiar objects, $O_a$, and $O_b$ of the set $O_i$, where $a, b \in \{1, \ldots, n\}$, and wherein $O_i$ is associated with a level set characteristic function $\chi_i$ such that:

$$\chi_i(x) = \begin{cases} 1 & \text{if } x \in O_i, \\ 0 & \text{otherwise.} \end{cases}$$

and $i=1, 2$, to yield two level sets described by an integrated synergistic shape functional, $F(\phi, \psi, u_{in}, u_{out})$ according to the hybrid adaptive active contour model as described in Equation (13):

$$F(\phi, \psi, u_{in}, u_{out}) = \qquad (13)$$

$$\sum_{i=1}^{2} \int_\Omega (\phi_i(x) - \psi(x))^2 |\nabla \phi_i| \delta(\phi_i) dx + \beta_r \int_\Omega \Theta_{in} H_{\chi 1 \vee \chi 2} dx +$$

$$\int_\Omega \Theta_{out} - H_{\chi 1 \vee \chi 2} dx + \omega \int_\Omega H_{\chi 1 \wedge \chi 2} dx + \sum_{i=1}^{2} \int_\Omega (\phi_i - \psi_i)^2 dx,$$

wherein $H_{\chi 1 \vee \chi 2} = H_{\psi 1} + H_{\psi 2} - H_{\psi 1} H_{\psi 2}$, $H_{\chi 1 \wedge \chi 2} = H_{\psi 1} H_{\psi 2}$, $\phi = (\phi_1, \phi_2)$, and $\psi = (\psi_1, \psi_2)$. H is a Heaviside function.

The fourth term $$\sum_{i=1}^{2} \int_\Omega (\phi_i - \psi_i)^2 dx$$

in Equation (13) penalizes the overlapping area between the two regions being segmented, and it prevents the two evolving level set functions from becoming identical.

Proof For the integrated synergistic shape functional, $F(\phi, \psi, u_{in}, u_{out})$ described in Equation (13)

The proof for Equation (13) can be shown by the mathematical study of the problem (14):

$$\min_{\psi, u_{in}, u_{out}} \left\{ F = \int_\Omega (\phi(x) - \psi(x))^2 |\nabla \phi| \delta(\phi) dx + \beta_r \int_\Omega \int_\Omega \begin{pmatrix} \Theta_{in} H_\psi + \\ \Theta_{out} H_{-\psi} \end{pmatrix} dx \right\} \qquad (14)$$

The existence of a minimizer as described in Equation (13) can be proved by following the methods described in Chen et al. (Chen, Y. et al., "Using prior shapes in geometric active contours in a variational framework," Int. J. Comput. Vision, 2002 50(3): 315-328; and Chan et al. (Chan, T. F. et al., "Active contours without edges," IEEE Trans. on Image Processing, 2001, 10(2): 266-277) using a direct method of the calculus of variations and compactness theorems on the space of functions with bounded variation. The methods described in Evans et al. (Evans, L. C. et al., "Measure Theory and Fine Properties of Functions," CRC Press: Boca Raton, Fla. 1992), Crandall et al. (Crandall, M. G. et al., "Users guide to viscosity solutions of second order partial differential equations," 1992, Amer. Math. Soc. Bull., 27:167), Chen et al. (Chen, Y. et al., "Using prior shapes in geometric active contours in a variational framework," Int. J. Comput. Vision, 2002, 50(3): 315-328), Chan et al. (Chan, T. F. et al., "Active contours without edges," IEEE Trans. On Image Processing, 2001, 10(2): 266-277), and De Giorgi et al. (De Giorgi E. et al., "New functionals in the calculus of variations," Atti. Accad.

Naz. Lincei Rend. Cl. Sci. Fis. Mat. Natur., 1998, 82(2):199-210) are further used in the proof of the minimization of problem (13).

The minimization problem is considered among characteristic functions $\chi_E$ of sets $E=\{x \in \Omega | \phi(x) \geq 0\}$. This minimization is over all $\chi_E$ in $BV(\Omega)$. The vector of PCA eigen-coefficients $\chi_{pca}=(x_{pca1}, \ldots, x_{pcah})$ is defined on $\Omega_{pca}=[-3\lambda_1, 3\lambda_1] \times \ldots \times [-3\lambda_h, 3\lambda_h]$. The functions $u_{in}$ and $u_{out}$ are supposed in $C^1(\Omega)$. The minimization problem involves a weighted total variation norm for the functions with finite perimeters. It also minimizes more than one argument. To study the existence for the problem (13), it is necessary to introduce the concept of weighted total variation norms for functions of bounded variation.

Definition 1

Let $\Omega \subset R^N$ be an open set and let $f \in L^1(\Omega)$. The total variation norm of $f$ is defined by Equation (14a):

$$TV(f) = \int_\Omega |\nabla f| = \sup_{\phi \in \Phi} \int_\Omega f(x) div \phi(x), \quad (14a)$$

$$\text{where } \phi = \{\phi \in C_0^1(\Omega, R^N) | |\phi(x)| \leq 1, \text{ on } \Omega\} \quad (14b)$$

Definition 2

The function $f \in L^1(\Omega)$ is said to have bounded variation in if its distributional derivative satisfies $TV(f) < \infty$. We define $BV(\Omega)$ as the space of all functions in $L^1(\Omega)$ with bounded variation and endowed with the norm (14c):

$$\|f\|_{BV(\Omega)} = \|f\|_{L^1(\Omega)} + TV(f) \quad (14c)$$

Hence $BV(\Omega)$ is a Banach space.

Theorem 1.

A measurable subset of $E$ of $R_N$ has finite perimeter ($\text{per}_\Omega$) in $\Omega$ if and only if the characteristic function $\chi_E \in BV(\Omega)$, which can be further described as:

$$\text{per}_\Omega = TV(\chi_E) = \int_\Omega |\nabla \chi_E| < \infty.$$

Definition 3

Let $\Omega \subset R^N$ be an open set and let $f \in L^1(\Omega)$ and $\phi(x)$ be positive valued continuous and bounded functions on $\Omega$. The weighted total variation norm $(TV_\varphi)$ of $f$ is defined by Equation (14d)

$$TV_\varphi(f) = \int_\Omega |\nabla f| = \sup_{\phi \in \Phi_\varphi} \int_\Omega f(x) div \phi(x), \quad (14d)$$

$$\text{where } \phi_\varphi = \{\phi \in C_0^1(\Omega, R^N) | |\phi(x)| \leq \varphi(x), \text{ on } \Omega\} \quad (14e)$$

If a function $f$ has a finite weighted total variation norm in $\Omega$ then it also belongs to $BV(\Omega)$.

Definition 4

A function $f \in BV(\Omega)$ is a special function of bounded variation if its distributional derivative is given by Equation (14f)

$$|Df| = TB(f) + \int_{\Omega \cap S_f} J_f dH^{N-1}, \quad (14f)$$

where $J_f$ is the jump part defined on the set of points $S_f$ and $\mathcal{H}^{N-1}$ is the (N-1)-dimensional Hausdorff measure, as described in De Giorgi, E. et al. (De Giorgi, E. et al., "Existence theorem for a minimum problem with free discontinuity set," Arch. Rational Mech. Anal., 1989, 108(3):195-218). The space of special functions of bounded variation $SBV(\Omega)$ is a Banach space, endowed with the norm (14g);

$$\|f\|_{SBV(\Omega)} = \|f\|_{L^1(\Omega)} + |D_f| \quad (14g).$$

Theorem 2.

Let $\Omega \subset R^N$ be an open set with a lipschitz boundary. If $\{f_n\}_{n \geq 1}$ is a bounded sequence in $BV(\Omega)$, then there exists a subsequence $\{f_{nj}\}$ of $\{f_n\}$ and a function $f \in BV(\Omega)$, such that $f_{nj} \to f$ strongly in $L^P(\Omega)$ for any $$1 \leq p < \frac{N}{N-1} \text{ and } TV(f) \leq \lim_{f_{nj} \to \infty} inf TV(f_{nj}). \quad (14h)$$

Theorem 3.

The following theorem is a generalization of the method described in Chen et al. (Chen, Y. et al., "Using prior shapes in geometric active contours in a variational framework," Int. J. Comput. Vision, 2002, 50(3): 315-328), the entire disclosure of which is incorporated herein by reference.

Let $\Omega \subset R^N$ be an open set with a lipschitz boundary. If $\{f_n\}_{n \geq 1}$ is a bounded sequence in $BV(\Omega)$, and if $\{f\}_{n \geq 1}$ is a positive valued continuous function that uniformly converges to $\alpha$ on $\Omega$, then there exists a subsequence $\{f_{nj}\}$ of $\{f_n\}$ and a function $f \in BV(\Omega)$, such that $f_{nj} \to f$ strongly in $L^P(\Omega)$ for any $$1 \leq p < \frac{N}{N-1} \text{ and } TV_\varphi(f) \leq 1 \lim_{f_{nj} \to \infty} inf TV_{\varphi nj}(f_{nj}). \quad (14i)$$

Theorem 4.

Let $\Omega$ be a bounded and open subset of R2 and $\mathcal{C}$ be an image with $\mathcal{C} \in L^\infty(\Omega)$. The minimization problem may be re-written in the following form (14j):

$$\min_{\alpha, u_{in}, u_{out}} \left[ F = \int_\Omega (\phi(x) - \psi(x))^2 + g(x)|\nabla \chi_E| + \beta_r F_{region}(u_{in}, u_{out}, \psi) \right], \quad (14j)$$

and has a solution $\chi_E \in BV(\Omega)$, $x_{pca} \in \Omega_{pca}$, and $u_{in}, u_{out} \in C^1(\Omega)$.

Proof:

The direct method of the calculus of variations may be used to prove the theorems, as described in De Giorgi et al. (De Giorgi E. et al., "New functionals in the calculus of variations," Atti. Accad. Naz. Lincei Rend. Cl. Sci. Fis. Mat. Natur., 1998, 82(2):199-210), according to the following steps:

(i) Let $\{\chi_E, \chi_{pca}, u_{in}, u_{out}\}$ be a minimizing sequence of the form (14j) to the form (13k), as described, $$\lim_{n \to \infty} F(\chi_{E_n}, x_{pca_n}, u_{in_n}, u_{out_n}) = \inf_{\chi_E, x_{pca}, u_{in}, u_{out}} F(\chi_E, x_{pca}, u_{in}, u_{out}). \quad (14k)$$

(ii) Since $\chi_{E_n}$ is a sequence of characteristic functions $E_n$, then) $\chi_{E_n}(\chi) \in \{0,1\}$—a.e. in $\Omega$. A constant M>0 exists uch that $\|\nabla \chi_{E_n}\|_{L^1(\Omega)} \leq M, \forall n \geq 1$. Therefore, $\chi_{E_n}$ is a uniformly bounded sequence on $BV(\Omega)$. Since $\{\chi_{pcan}\}$ are bounded sequences on compact space $\Omega_{pca a}$, a subsequence $\{\chi_{pca_{nj}}\}$ converge to limit $\chi_{pca}$ exists. The integrand $(\phi(x) - \psi(x))^2 + g(x)$ is positive and bounded because both functions are bounded on. Since PCA is applied on continuous functions (SDFs), the shape prior is also continuous and converges uniformly on $\Omega$. Following theorem 3, a subsequence of $\chi_{E_n}$ that converges to a function $\chi_E$ strongly in $L^1(\Omega)$ exists. Moreover, Theorem 3 also states that:

$$\int_\Omega f|\nabla \chi_E| \leq \liminf_{nj \to \infty} \int_\Omega f_{nj}|\nabla \chi_{E_{nj}}|. \tag{14l}$$

(iii) In the region homogeneity term $F_{region}$ described in Equation (8):
$F_{region}(\psi,u_{in},u_{out}) = \int_\Omega \Theta_{in} H_\psi dx + \int_\Omega \Theta_{out} H_{-\psi} dx$, the function $H_\psi$ is a characteristic function $\chi_G$ of sets $G = x \in \Omega | \psi(x) \geq 0$. Equation (8) can therefore be re-written as Equation (14m)

$$\int_\Omega \Theta_{in} \chi_G dx + \int_\Omega \Theta_{out}(1-\chi_G) dx \tag{14m},$$

and the function $u = u_{in}\chi_G + u_{out}(1-\chi_G)$ can be defined.

(iv) The minimization sequence of form (14j) in theorem 4 implies form $$\lim_{n \to \infty} F_{region}(x_{pca_n}, u_{in_n}, u_{out_n}) = \inf_{x_{pca}, u_{in}, u_{out}} F_{region}(x_{pca}, u_{in}, u_{out}) \tag{14n}$$

Since the function $\chi_G$ depends continuously on variable $\chi_{pca}$ and transformations $A_s$, we have $\chi_G(\psi) = \chi_{G_n}$ and $u_n = u_{in_n}\chi_{G_n} + u_{out_n}(1-\chi_{Gn})$. According to the methods described in De Giorgi et al. (De Giorgi E. et al., "New functionals in the calculus of variations," Atti. Accad. Naz. Lincei Rend. Cl. Sci. Fis. Mat. Natur., 1998, 82(2): 199-210), it can be deduced that there is a $u \in S BV(\Omega)$, such that a subsequence $u_{nj}$ converges to $u$ a.e. in BV and $$F_{region}(x_{pca_n}, u_{in_n}, u_{out_n}) = F_{region}(u) \leq \liminf_{nj \to \infty} F_{region}(u_{nj}), \tag{14o}$$

which means that $u$ is a minimizer of $F_{region}$. Then by combining Equations (14l) and (14o), $\chi_E$, $x_{pca}$, $u_{in}$ and $u_{out}$ are minimizers of form (14j) under Theorem 4.

(7) The Computing Device Configured to Place the at Least One Initial Level Set on the at Least One Target Object According to one embodiment, the computing device (j) configured to delineate object boundaries of the at least one target object in the image scene further comprises (7) the computing device configured to place the at least one initial level set on the at least one target object in the image scene.

(k) The Computing Device Configured to Perform Contour Propagation Step

According to some embodiments, the system for segmenting single non-overlapping objects or multiple overlapping/occluded objects in an image scene via a hybrid adaptive active contour model comprises (k) the computing device configured to perform contour propagation of the delineated shape boundaries via the computing device by evolving the integrated synergistic shape functional by minimizing variational energy.

According to one embodiment, the computing device (k) configured to perform contour propagation further comprises the computing device configured to minimize variational energy in Equation (13) iteratively with respect to dynamic variables to yield Euler-Lagrange equations, that parameterize a descent direction of the delineated object boundaries of initializing step (i), in terms of rotation, scale and translation, by time $t>0$, for an image with N independent familiar objects, where $N=1, \ldots, n$.

According to one embodiment, the computing device (k) configured to perform contour propagation further comprises the computing device configured to minimize variational energy in Equation (13) iteratively with respect to dynamic variables to yield Euler-Lagrange equations represented as Equation (15), that parameterize a descent direction of the delineated object boundaries of initializing step (i), in terms of rotation, scale and translation, by time $t>0$, for an image with two similarly placed objects, as follows:

$$\frac{\partial \phi_i}{\partial t} = \delta_{\phi_i}\mu\nabla \cdot \frac{|\nabla\phi|}{|\nabla\phi|} - \tag{15}$$
$$\left(((f-u_{in})^2 + (f-u_{out})^2)(1-H_{\phi_j})\right) - 2\nu(\phi_i - \psi_i),$$

$$\frac{\partial \theta_i}{\partial t} = 2\nu \int_\Omega (\phi_i - \psi_i)(\nabla\psi_i \cdot \nabla_\Theta A_i) dx$$

$$\frac{\partial T_i}{\partial t} = 2\nu \int_\Omega (\phi_i - \psi_i)(\nabla\psi_i \cdot \nabla_T A_i) dx$$

$$\frac{\partial \theta_i}{\partial t} = 2\nu \int_\Omega (\phi_i - \psi_i)\left[-\frac{\psi_i}{s} + \nabla\psi_i \cdot \nabla_\alpha A_i\right] dx$$

$i, j \in \{1, 2\}, i \neq j$

Equation (15) has a Euler-Lagrange set up extensible to N objects.

According to one embodiment, the computing device (k) configured to perform contour propagation further comprises the computing device configured to update $u_{in}$ and $u_{out}$ for each iteration as follows:

$$u_{in} = \frac{\int_\Omega f H_{\chi_1 \vee \chi_2} dx}{\int_\Omega H_{\chi_1 \vee \chi_2} dx}, u_{out} = \frac{\int_\Omega f(1-H_{\chi_1 \vee \chi_2}) dx}{\int_\Omega (1-H_{\chi_1 \vee \chi_2}) dx} \tag{16}$$

According to one embodiment, the computing device (k) configured to perform contour propagation further comprises the computing device configured to discretize on the two-dimensional image scene described by the two-dimensional M-by-N grid comprising grid cells and grid points, wherein the spacing between the grid cells is h and wherein the grid points are $(x_i, y_j) = (i_h, j_h)$, such that $0 \leq i \leq M$ and $0 \leq j \leq N$ and $M = \{1, 2, \ldots n\}$ and $N = \{1, 2, \ldots n\}$.

According to one embodiment, the computing device (k) configured to perform contour propagation further comprising the computing device configured to discretize further comprises the computing device configured to discretize the terms $u_{in}$ and $u_{out}$, on the two-dimensional image scene described by the two-dimensional M-by-N grid comprising grid cells and grid points, wherein the spacing between the grid cells is h and wherein the grid points are $(x_i, y_j) = (i_h, j_h)$, such that $0 \leq i \leq M$ and $0 \leq j \leq N$ and $M = \{1, 2, \ldots n\}$ and $N = \{1, 2, \ldots n\}$.

According to one embodiment, the computing device (k) configured to perform contour propagation further comprising the computing device configured to discretize further comprises the computing device configured to discretize the term $$\nabla \cdot \frac{\nabla_\Theta}{|\nabla_\Theta|},$$

wherein the term $$\nabla \cdot \frac{\nabla_\Theta}{|\nabla_\Theta|}$$

is the divergence of the normalized gradient of φ, as described in Equation (16), as follows:

$$\nabla \cdot \frac{\nabla_\Theta}{|\nabla_\Theta|} = \frac{\phi_{xx}\phi_y^2 - 2\phi_{xy}\phi_x\phi_y + \phi_{yy}\phi_x^2}{(\phi_x + \phi_y)^{3/2}}, \qquad (17)$$

wherein $\phi_x$, $\phi_y$ denote partial derivatives of φ, and $\phi_{xx}$, $\phi_{yy}$, and $\phi_{xy}$ are second-order partial derivatives of φ.

According to one embodiment, the computing device (k) configured to perform contour propagation further comprising the computing device configured to discretize further comprises the computing device configured to discretize the term $$\nabla \cdot \frac{\nabla_\Theta}{|\nabla_\Theta|},$$

by the following:

$$\phi_x(i, j) = \frac{(x_{i-1}, x_j) - (x_{i+1}, x_j)}{2h} \qquad (vi)$$

$$\phi_y(i, j) = \frac{(x_i, x_{j-1}) - (x_i, x_{j+1})}{2h} \qquad (vii)$$

$$\phi_{xx}(i, j) = \frac{(x_{i-1}, x_j) - (x_{i+1}, x_j) + 2(x_i, x_j)}{h^2} \qquad (viii)$$

$$\phi_{yy}(i, j) = \frac{(x_i, x_{j-1}) - (x_i, x_{j+1}))/2 + 2(x_i, x_j)}{h^2} \qquad (ix)$$

$$\phi_{xy}(i, j) = \frac{1}{4h^2}((x_{i+1}, x_{j+1}) + (x_{i-1}, x_{j+1}) + (x_{i+1}, x_{j-1}) + (x_{i-1}, x_{j-1})). \qquad (x)$$

According to one embodiment, the computing device (k) configured to perform contour propagation further comprising the computing device configured to discretize further comprises the computing device configured to fix a regularized Heaviside function as described in Equation (18):

$$H(z) = \begin{cases} 1, & \text{if } z > \epsilon \\ 0 & \text{if } z < -\epsilon \\ \frac{1}{2} + \frac{z}{2\epsilon} + \frac{1}{2\pi}\sin\left(\frac{\pi z}{\epsilon}\right) & \text{if } |z| \le \epsilon \end{cases} \qquad (18)$$

According to one embodiment, curvature forces, n+ and n− can be further computed as described in Chan, T. F. et al., "Active contours without edges," IEEE Trans. on Image Processing, 2001, 10(2): 266-277.

(l) The Computing Device Configured to Achieve Final Segmentation

According to some embodiments, the system for segmenting single non-overlapping objects or multiple overlapping/occluded objects in an image scene via a hybrid adaptive active contour model comprises (l) the computing device configured to achieve final segmentation of the image scene.

The Computing Device Configured to Classify the Image Scene

According to one embodiment, the system for segmenting single non-overlapping objects or multiple overlapping/occluded objects in an image scene via a hybrid adaptive active contour model comprises further comprises the computing device capable of classifying the image scene, and is further configured:

(m) to extract from the segmented objects via the computing device, at least one signature feature and computing at least one quantitative signature for the image scene;

(n) to select at least one reference feature in a dataset comprising reference features according to a minimum Redundancy Maximum Relevance (mRMR) feature selection scheme to identify a selected subset of reference features;

(o) to discriminate the at least one quantitative signature feature of the image scene from the selected subset of reference features to identify a class corresponding to the image scene; and (p) to output the class corresponding to the image scene.

(m) The Computing Device Configured to Extract Signature Features

According to some embodiments, the computing configured to classify the image scene further comprises (m) the computing device configured to extract from the segmented objects via the computing device, at least one signature feature and computing at least one quantitative signature for the image scene.

Exemplary signature features include but are not limited to morphological, architectural, and textural information of the objects in the image scene. These features are used to make a quantitative signature representative of each image scene, describing both information in the image scene, such as, but not limited to, architectural information, and features such as, but not limited to, global textural, morphological, second-order co-adjacency, etc. For example, signature features may include but are not limited to nuclear morphology, nuclear architecture, tissue texture etc.

For example, in the context of histological pathology of cancer, the Gleason grading system extracts information such as nuclear and architectural information but not features such as nuclear morphology, second-order co-adjacency and global texture features.

(n) The Computing Device Configured to Select at Least One Reference Features

According to some embodiments, the computing device configured to classify the image scene further comprises (n) the computing device configured to select at least one reference feature in a dataset comprising reference features according to a minimum Redundancy Maximum Relevance (mRMR) feature selection scheme to identify a selected subset of reference features.

According to one embodiment, the computing device (n) configured to select at least one reference feature is capable of facilitating data visualization and data understanding, reducing the measurement and storage requirements, reducing training and utilization times, and improving prediction performance. The computing device (n) configured to select at least one reference feature is capable of allowing for optimal classification of a histological sample, e.g. a prostate cancer histological sample, into a Gleason. Each reference feature dataset comprises texture, architectural and nuclear features, which can be considered highly discriminatory for differentiating between Gleason grades of, for example, prostate cancer.

According to one embodiment, the minimum Redundancy Maximum Relevance (mRMR) feature selection scheme is performing as described in Peng et al. (Peng H, Long F, Ding C. Feature selection based on mutual information criteria of max-dependency, max-relevance, and min-redundancy. Pattern Analysis and Machine Intelligence, IEEE Transactions on 2005; 27:1226-1238) to identify a selected subset of reference features.

The Minimum Redundancy Maximum Relevance Scheme for Feature Selection

According to one embodiment, the selected subset of reference features Q is comprised of feature vectors $F_i$, i∈{1, ..., |Q|}, where F={$F_1$, ..., $F_N$}, Q⊂F, and |q|<N. The mRMR scheme attempts to simultaneously optimize two distinct criteria. The first criterion is "maximum relevance" which selects features $F_i$ that have the maximal mutual information (MI) with respect to the corresponding label vector L. This is expressed in Equation (19) as:

$$U = \frac{1}{|Q|} \sum_{F_i \in Q} MI(F_i, L). \tag{19}$$

The second criterion is "minimum redundancy" which ensures that selected reference features $F_i$, $F_j$ ∈Q, where i,j ∈{1, ..., |Q|}, are those which have the minimum MI with respect to each other, given as described in Equation (20):

$$U = \frac{1}{|Q|^2} \sum_{F_i F_j in Q} MI(F_i, F_j). \tag{20}$$

Under the second criterion, the selected reference features are maximally dissimilar with respect to each other, while under the first criterion, the reference feature selection is directed by the similarity with respect to the class labels.

There are two major variants of the mRMR scheme: the MI difference (MID), given by (U−V) and the MI quotient (MIQ), given by (U|V). These represent different techniques to optimize the conditions associated with mRMR reference feature selection.

(o) The Computing Device Configured to Discriminate the at Least One Reference Feature According to some embodiments, the computing device configured to classify the image scene further comprises (o) the computing device configured to discriminate the at least one quantitative signature feature of the image scene from the selected subset of reference features to identify a class corresponding to the image scene.

According to one embodiment, the computing device (o) configured to discriminate the at least one quantitative signature feature of the image scene from the selected subset of reference features to identify a class corresponding to the image scene further comprises the computing device configured to use a quadratic discriminant analysis (QDA) classifier that performs a transformation of the at least one quantitative signature feature of the image scene to discriminate from the selected subset of reference features to identify a class corresponding to the image scene.

According to one embodiment, the quadratic discriminant analysis (QDA) classifier solves for Equation (21):

$$Y = F^t A F + B^t F, \tag{21}$$

where Y={$Y_1$, $Y_2$, ...} denotes the result of QDA, for a set of samples C with associated feature set F.

For example, in case of Gleason pattern classes for classifying between prostate cancer grades 3 or 4, based on calculating the means $\mu_{l_{(C)=+1}}$, $\mu_{l_{(C)=-1}}$ (and covariances $\Sigma_{l_{C=+1}}$, $\Sigma_{l_{C=-1}}$ of the two classes in the dataset, Equation (21) can be solved to calculate the following log likelihood ratio as described in Equation (22):

$$\log(H) = \frac{(F - \mu_{l_{(C)=+1}})^T \sum_{l_C^{-1}=+1} (F - \mu_{l_{(C)=+1}})}{(F - \mu_{l_{(C)=-1}})^T \sum_{l_C^{-1}=-1} (F - \mu_{l_{(C)=-1}})} \tag{22}$$

The result of QDA classification is given by h(C)∈H.

(p) the Computing Device Configured to Output the Class of the Image Scene

According to some embodiments, the computing device configured to classify the image scene further comprises (p) the computing device configured to output the class corresponding to the image scene.

The Gleason grading system is used to describe cancer aggressiveness; lower Gleason grade structures, such as glands, are medium-sized with round shapes, while in higher Gleason grade patterns, such as glands, tend to be small and have irregular shapes. Gleason grading ranges from very well differentiated (grade 1) to very poorly differentiated (grade 5).

GPU Implementation

General purpose computation on graphics processing units (GPU) is the technique of using graphics hardware to compute applications typically handled by the central processing unit (CPU). Graphics cards over the past two decades have been required to become highly efficient at rendering increasingly complex 3D scenes at high frame rates. This has forced their architecture to be massively parallel in order to compute graphics faster compared to general purpose CPUs. (Kilgari E. et al., and R. Fernando, GPU Gems 2, ch. The GeForce 6 Series GPU Architecture, pp. 471-491. Addison Wesley, 2005.) Memory is optimized for throughput and not latency, with strict access patterns. GPUs are not optimized for general purpose programs, and they do not feature the complex instruction sets, or branch control of the modern CPU. Although current high-performance CPUs feature multiple cores for limited parallel processing, GPUs are arguably a more attractive option in terms of lower price and power usage.

More recently, languages have been developed that allow the programmer to implement algorithms without any knowledge of graphics APIs or architectures. One such language is NVIDIA CUDA (Compute Unified Device Architecture). CUDA, is NVIDIA's GPU technology that allows for programming of the GPU without any graphics knowledge. The C language model has at its core three key abstractions: hierarchies of thread groups (to allow for transparent scalability), shared memories (allowing access to low-latency cached memory), and barrier synchronization (to prevent race conditions). This breaks the task of parallelization into three sub problems, which allows for language expressivity when threads cooperate, and scalability when extended to multiple processor cores. CUDA allows a programmer to write kernels that when invoked execute thousands of lightweight identical threads in parallel. CUDA arranges these threads into a hierarchy of blocks and grids, as can be seen in FIG. 12, allowing for runtime transparent scaling of code within GPU. The threads are identified by their location within the grid and block, making CUDA well suited for tasks such as level set based image segmentations where each thread is easily assigned to an individual pixel or voxel, as described in Tejada E. et al., "Large steps in GPU-based deformable bodies simulation," Simulat Model Pract Theory" 13(8):703715, (2005).

According to one embodiment, the hybrid adaptive active model is implemented through a graphical processing unit (GPU) framework.

The GPU framework uses the CUDA toolkit to implement a sequential level set segmentation sequence according to Algorithm 1:

---

Algorithm 1: Sequential Level Set Segmentation

Input: Feature Image I, Initial Mask m, Threshold T, Range $\epsilon$, Iterations n, Reinitialize Every RI
Output: Nuclear Contours (boundaries)
Initialize $\phi_0$ to Signed Euclidean Distance Transform (SEDT) from mask m
Calculate Data Speed Term $D(I) = \epsilon - |I - T|$
forall the n Iterations do
| Calculate First Order Derivatives $\phi_x$, $\phi_y$
| Calculate Second Order Derivatives $\phi_{xx}$, $\phi_{yy}$, $\phi_{xy}$
| Calculate Curvature Terms $n^+$, $n^-$
| Calculate Gradient $\nabla\phi$
|
| Calculate Speed Term $F = \alpha D(\bar{x}) + (1 - \alpha)\nabla \cdot \frac{\nabla\phi}{|\nabla\phi|}$
|
| Update Level Set Function $\phi(t + \Delta t) = \phi(t) + \Delta t F |\nabla\phi|$
| if Iterations % RI == 0 then
| | Reinitialize $\phi$ to SEDT
| end
end

---

Specifically, the sequential level set segmentation sequence according to Algorithm 1 comprises the following steps (1) initializing $\phi$ with an initial contour or shape (for example an ellipse) and set n=0; (2) computing $u_{in}$ ($\phi''$) and $u_{out}$($\phi''$) from Equation (16); and (3) discretizing according to Equation (15) to obtain $$\phi^{n+1} = \phi^n + \Delta t \cdot \frac{\partial \phi}{\partial t}$$

with explicit forward Euler.

The GPU framework follows a parallel implementation scheme according to Algorithm 2:

---

Algorithm 2: Parallel Implementation

Initialize $\phi_{i,j}^0$, D on host memory
Allocate memory for $\phi^n$, $\phi^{n+1}$, D on device
Copy $\phi^0$, D from host to device
forall the n Iterations do
| Execute Level Set Update CUDA Kernel $\phi_{i,j}^{n+1} = \phi_{i,j}^n + \Delta t F |\nabla\phi_{i,j}^n|$
| Swap pointers of $\phi_{i,j}^n$, $\phi_{i,j}^{n+1}$
| if Iterations % RIT S == 0 then
| | Copy $\phi$ from device to host
| | Reinitialize $\phi$ to Signed Euclidean Distance Transform
| | Copy $\phi$ from host to device
| end
end
Copy $\phi$ from device to host

---

According to one embodiment, the parallel implementation follows the structure shown in Algorithm 2. Input image, I and an initial contour $\phi$ (for example, a shape such as an ellipse) are both discretized and generated on equally sized 2D grids on CPU. The image and the computed contour $\phi$ are copied onto the GPU. From this point on, GPU effectively optimizes memory transfers with the central processing unit.

Kernel Threads Setup

According to one embodiment, a CUDA programming protocol is used. In CUDA, it is assumed that both the host (CPU) and device maintain their own DRAM. (see NVIDIA CUDA Programming Guide ver 2.2.1. described on the nvidia.com/object/cuda-develop website). Host memory is allocated using malloc and device memory is allocated using cudaMalloc. As memory bandwidth between the host memory and device memory is low (it is much lower than the bandwidth between the device and the device memory), it is recommended to keep the number of transfers to a minimum. In order to minimize the latency of accessing the shared memory, it is recommended to make the block size a multiple of 16 and use the cudaMallocPitch routine to allocate memory with padding if X dimension of the image is not a multiple of 16. Hence, most CUDA programs follow a standard structure of initialization, host to device data transfer, compute, and finally memory transfer of computed results from device to host. CUDA threads are assigned an unique thread ID that identifies its location within the thread block and grid. This provides a natural way to invoke computation across the image and level set domain, by using the thread IDs for addressing. This is best explained with Table I. Assume an image has dimensions 4×4 and the block size is 2×2. Invoking the kernel with a grid size of 2 blocks×2 blocks results in the 16 threads shown in Table 1, in the form (threadIdx.y, threadIdx.x). These threads are grouped into blocks of four.

TABLE 1

| Threads of 16 IDs grouped into blocks of 4 | | | |
|---|---|---|---|
| (0, 0) | (0, 1) | (0, 1) | (0, 1) |
| (1, 0) | (1, 1) | (1, 0) | (1, 1) |
| (0, 0) | (0, 1) | (0, 0) | (0, 1) |
| (1, 0) | (1, 1) | (1, 0) | (1, 1) |

As each thread has access to its own threadIdx and blockIdx, global indices (i, j) are determined using the equations:

int i=blockIdx.x*blockDim.x+threadIdx.x;

int j=blockIdx.y*blockDim.y+threadIdx.y;

where blockDim.x and blockDim.y represent the dimensions of the block (which in this case are both equal to 2). Larger block sizes can be used keeping the block X dimension (BX) a multiple of 16 for maximum speed. Once these indices are set up, the level set update code is transferred to a CUDA kernel.

2D Shared Memory Optimization

Since finite differences are used to compute the curvature force in a grid cell, value from the neighboring grid cells are accessed. In order to keep the number of accesses to device memory at a minimum, on-chip shared memory is used.

Integrating use of the shared memory into the CUDA kernel requires partitioning the level set domain into tiles. For first order finite difference problems, such as the hybrid adaptive active contour model, each tile must also contain values for neighborhood nodes (often known as halo nodes) for the i±1 and j±1 elements, which are stored in separate tiles, so these must also be read into shared memory. As the size of the shared memory is only 16 KB, the sizes of the tiles and corresponding halo are limited. Micikevicius, P. ("3D Finite difference computation on GPUs using CUDA," In GPGPU-2: Proceedings of 2nd Workshop on General Purpose Processing on Graphics Processing Units, pages 79-84, New York, N.Y., USA, (2009). ACM) describes a framework for handling such a process. Such a process may serve as a good model for a multi GPU implementation, however the kernel will need to be modified as it is optimized for higher order stencils (without cross-derivative terms). Instead, a tiling code, adapted from Giles' (2008) "Jacobi iteration for Laplace discretization' algorithm" (Mike Giles. Jacobi iteration for a laplace discretization on a 3d structured grid. (2008)) is used, which supports cross-derivatives well. The shared memory management technique in this finite difference algorithm accelerates the global memory implementation by over an order of magnitude.

For a block (and tile) size of BX×BY there are 2×(BX+BY+2) halo elements, as can be seen in FIG. 12. In FIG. 12, darker elements represent the thread block (the active tile) and the lighter elements represent the halo. In this manner, the domain of the computation is partitioned and results in overlapping halo nodes.

Each thread loads $\phi_n$ values from global memory to the active tile stored in shared memory. However, depending on the location of the thread within the thread block, it may also load a single halo node into the shared memory. Therefore in order to load all halo nodes, this technique assumes that there are at least as many interior nodes as there are halo nodes. Before data can be loaded into the halos, the thread ID needs to be mapped to the location of a halo node both within the halo and within the global indices.

The first 2×(BX+BY+2) threads are assigned to load values into the halo in this manner, for example, 6×6 thread block as shown in FIG. 12 (b). This method of loading elements has been chosen in order to maximize coalescence. Not only are the interior tile nodes loaded coalesced, but as can be seen above, the first 12 elements of the thread block load they halos (above and below the interior tile excluding corners) in a coalesced manner. The side halos (x halos) loads are non-coalesced. When writing back results to global memory, as only the interior nodes have updated values they are written to global memory coalesced.

Calculation of Forces

To compute $u_{in}$ and $u_{out}$, the computing device starts by computing the value of $u_{in}$ and $u_{out}$ in each grid cell, storing them in a temporary array. Since these are scalars values, a reduction technique is used, cutting the time spent to O(log n) time assuming an infinite number of threads. In a reduction technique described in Madabhushi (Madabhushi, A. "Digital Pathology Image Analysis: Opportunities and Challenges," (Editorial), Imaging in Medicine, vol. 1(1), pp. 7-10, 2009), a binary function is performed on all elements in an array; this can be done in a tree-like fashion, where the given operation can be performed concurrently on different parts of the array, and allows for combining the results at the end. NVIDIA has created an STL-like C++ library called Thrust that, among other things, can perform reduction technique efficiently on the GPU.

Hereafter, the computing device uses the values for $u_1$ and $u_2$ computed above to compute the image forces including the term $\lambda(f-u_1)^2+\lambda_2(f-u_2)^2$ in Equation (16) and the $F_{shape}$ term. Next, the computing device updates the next iteration. The final step is to copy the new $\phi$ back to the CPU.

- - -

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges which may independently be included in the smaller ranges is also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any method and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural references unless the context clearly dictates otherwise. All technical and scientific terms used herein have the same meaning.

Each of the publications discussed herein, the contents of which are incorporated herein by reference in their entirety, are provided solely for their disclosure prior to the filing date of the present application. Nothing herein is to be considered as an admission that the present invention is not entitled to antedate such publication by virtue of prior invention. Further, the dates of publication provided may be different from the actual publication dates which may need to be independently confirmed.

EXAMPLES

The following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Example 1

Segmentation with Watershed Initialization and Concavity Detection

The method steps according to the hybrid adaptive active contour model for segmenting single non-overlapping objects or multiple overlapping/occluded objects, such as nuclei or lymphocytes on an image scene of a histological sample from a cancer patient are depicted in a flow chart shown in FIG. 1.

Figure 3:
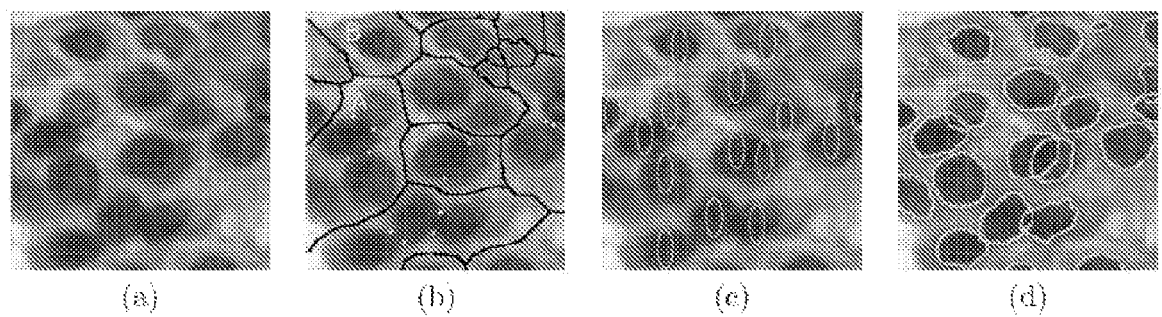
FIG. 3 shows snapshots of the constituent modules of the hybrid adaptive active contour model. 3(a) Original image scene (breast cancer); 3(b) Watershed segmentation of individual nuclei with an overlay detected concavity points. In region A, where 3 concavity points were detected, 3 level sets were initialized with the shape prior, whereas in region B, only a single level set (the region homogeneity term) was initialized; 3(c) Placement of initial level sets in the image; 3(d) final segmentation.

The segmentation method according to the hybrid adaptive active contour model includes the elective incorporation of variational terms based on the detection of concavity points as shown in FIG. 2. FIG. 3 shows snapshots of the constituent modules of the hybrid adaptive active contour model.

For example, the number of detected concavity points, $c_w \leq 1$ indicates presence of a single non-overlapping object, such as a nucleus in the image scene of the histological sample. In such cases, the shape prior is not necessary for the initializing step and the hybrid adaptive active contour model is reduced only based on the region homogeneity term. In this case, setting the constant $\beta_s=0$, the integrated synergistic shape functional, F according to the hybrid adaptive active contour model becomes reduced to:

$$F(\phi,\psi,u_{in},u_{out})=\beta_r\int_\Omega(\Theta_{in}H_\psi+\int_\Omega\Theta_{out}H_{-\psi})dx$$

For example, 1 number of $c_w$ indicates the presence of 1 overlapping objects. In such case, the hybrid adaptive active contour model with 1 level sets includes all three terms, the shape term, the boundary-based term and the region homogeneity term. In such a case, N is set to 1 in Equation (12) to determine the integrated synergistic shape functional.

Example 2

Segmentation of Nuclei and Lymphocytes of a Prostate Cancer Histological Sample

A. Model Parameters and Data Description

Size of a training set is determined empirically depending on the complexity of the shape of interest. According to one embodiment, the size of a training set is 5 or more shapes. According to one embodiment, size of a training set is 10 or more shapes. According to one embodiment, size of a training set is 15 or more shapes. According to one embodiment, size of a training set is 20 or more shapes. According to one embodiment, size of a training set is 25 or more shapes. According to one embodiment, size of a training set is 30 or more shapes. According to one embodiment, size of a training set is 35 or more shapes. According to one embodiment, size of a training set is 40 or more shapes. According to one embodiment, size of a training set is 45 or more shapes. According to one embodiment, size of a training set is 5 or more shapes.

Figure 4:
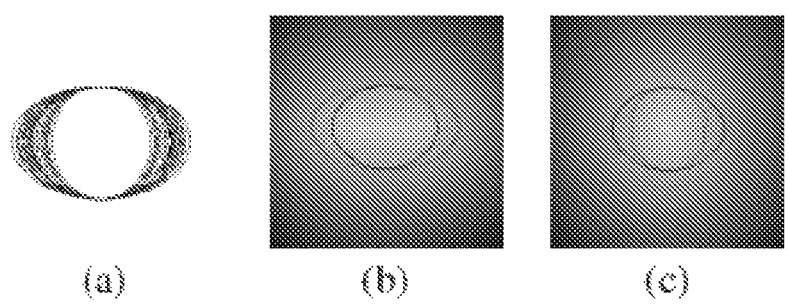
FIG. 4 depicts the results of a method of aligning a training set of 30 ellipses according to the hybrid active contour model. 4(a) depicts the set of 30 aligned training ellipses with the mean ellipse shown by a dotted line; 4(b) and 4(c) present the eigenmode variation of SDF ellipses ±2$\lambda_1$, where $\lambda_1$ is the eigenvalue.

A training set of 30 ellipses (nuclei and lymphocytes being elliptical in shape) were generated by changing the size of a principal axis with a gaussian probability function and applied PCA on the SDFs of 30 training ellipses. The manner of choosing the weighting parameters for the term $F_1$ in Equation (10) is as follows: $\beta_1$ is always equal to 1, $\mu$ determines the size of the neighborhood where the grey value information is averaged by means of diffusion, r is chosen such that the shape prior is attracted towards the region to be segmented, and $\beta_2$ is selected in order to allow the active contour to move around the shape prior to capture local boundaries. FIG. 4(a) shows a set of 30 aligned training ellipses with the mean ellipse shown by a dotted line. FIG. 4(b) and FIG. 4(c) shows the 30 aligned training ellipses with $\pm 2\lambda_1$, a unique eigenmode of variation of SDF ellipses where $\lambda_1$ is the eigenvalue.

For example, a training set of 30 curves is generated by changing the size of a principal axis with a gaussian probability function and applied PCA on the SDFs of the training curves. For example, a training set of 30 circles is generated by changing the size of a principal axis with a gaussian probability function and applied PCA on the SDFs of the training circles. For example, a training set of 30 parabolas is generated by changing the size of a principal axis with a gaussian probability function and applied PCA on the SDFs of the training parabolas. For example, a training set of 30 hyperbolas is generated by changing the size of a principal axis with a gaussian probability function and applied PCA on the SDFs of the training hyperbolas. For example, a training set of 30 planes is generated by changing the size of a principal axis with a gaussian probability function and applied PCA on the SDFs of the training planes. For example, a training set of 30 polygons is generated by changing the size of a principal axis with a gaussian probability function and applied PCA on the SDFs of the training polygons.

Evaluation was performed on two different histopathology datasets: prostate cancer and breast cancer cohorts comprising 100 and 14 images respectively (see Table 2). A total of 100 cancer nuclei from the images in dataset 1 and 800 lymphocytes from the images in dataset 2 were manually delineated by an expert pathologist (serving as the ground truth annotation for quantitative evaluation). Qualitative evaluation of the model was visually done across all 114 images.

Evaluation is done on histopathology data sets including, for example: epithelial cells, breast cancer cells, prostate cancer cells, lung cancer cells, pancreatic cancer cells, colon cancer cells, bone cancer cells, lymphocytes, and other pluripotent cancer cells. Evaluation includes cells, nuclei and other glandular structures.

Table 2 summarizes a description of the data sets considered in the study.

TABLE 2

Description of data sets considered in the study

| | Name | Number |
|---|---|---|
| Dataset 1 | Hematoxylin & Eosin (H&E) stained prostate needle core biopsy images | 14 |
| Dataset 2 | Hematoxylin & Eosin (H&E) stained breast cancer images | 100 |

B. Comparative Strategies and Experiments

The segmentation performance according to the hybrid active contour (HAC) model according to the present invention was compared qualitatively and quantitatively with segmentation performance according to a Geodesic Active Contour (GAC) model described in Caselles et al. (Caselles, V. et al, "Geodesic active contours," Int. J. Comput. Vision, vol 22, no. 1, pp. 61-79, 1997) and the Rousson shape based model (RD) described in Rousson et al. (Rousson M. et al., "Shape priors for level set representation," European Conference on Computer Vision, pp. 78-92, 2002). The RD model is a popular region-based AC model where the model is driven by the Gaussian distribution of both foreground and background and also involves a shape prior.

1) Experiment 1: Evaluating Overlap Resolution:

This example demonstrates the ability of the hybrid adaptive active contour model to correctly resolve the overlap between all intersecting lymphocytes and nuclei across 114 breast and prostate cancer histopathology images.

2) Experiment 2: Comparing the hybrid adaptive active contour model with the GAC and RD models in terms of detection accuracy:

This example compares nuclear detection accuracy of the hybrid adaptive active contour model over two state-of-the-art AC models, GAC and RD.

3) Experiment 3: Comparing our hybrid model against GAC and RD models in terms of segmentation accuracy:

This example compares segmentation performance in terms of boundary and area overlap metrics of the hybrid adaptive active contour model as compared to the GAC and RD models.

Table 3 summarizes a description of the data sets used in the three experiments (detection, segmentation and overlap resolution) for which the hybrid adaptive active contour model was evaluated.

TABLE 3

Description of the data sets used in the three experiments (detection, segmentation and overlap resolution) for which the hybrid adaptive active contour model was evaluated

| Comparative Strategy | Dataset 1 No. of Nuclei | Dataset 2 No. of Nuclei |
|---|---|---|
| Detection | 100 | 800 |
| Segmentation | 100 | 800 |
| Overlap resolution | 50 | 200 |

C. Performance Measures

1) Evaluation of Detection Performance:

The measures used to evaluate object detection include: 1) sensitivity (SN); 2) positive predictive value (PPV); and 3) overlap detection ratio (OR) (see Table 3). The detection results from the three models (GAC, the model according to the present invention, and RD) are compared to manual detection results obtained via an expert clinician. The SN and PPV values are computed from the true-positive (TP), false positive (FP), and false-negative (FN) values (TP, FN, FP are subsequently defined:

$$SN = \frac{TP}{TP + FN}, \quad (23)$$

$$PPV = \frac{TP}{TP + FP}. \quad (24)$$

where TP refers to the number of nuclei correctly identified while FP refers to the number of objects incorrectly identified as lymphocyte nuclei and FN refers to the number of lymphocyte nuclei missed by the model. The detection results are represented as the centroid of the region enclosed by a closed contour. A nuclear object was determined to be a TP if the model detected centroid was found to be within some pre-defined distance of the expert delineated nuclear centroid. Similarly, a FP is identified as an object centroid identified by the model which is greater than some pre-defined distance of a true nuclear centroid. A FN is a true nuclear centroid, for which has no model detected centroid was located within some pre-defined distance.

The pre-defined distance is set empirically based on the training set. According to one embodiment, the pre-defined distance is 5 µm or less. According to one embodiment, the pre-defined distance is 10 µm or less. According to one embodiment, the pre-defined distance is 15 µm or less. According to one embodiment, the pre-defined distance is 20 µm or less According to one embodiment, the pre-defined distance is 25 µm or less. According to one embodiment, the pre-defined distance is 30 µm or less. According to one embodiment, the pre-defined distance is 35 µm or less According to one embodiment, the pre-defined distance is 40 µm or less. According to one embodiment, the pre-defined distance is 45 µm or less. According to one embodiment, the pre-defined distance is 50 µm or less. According to one embodiment, the pre-defined distance is 5 µm or more. According to one embodiment, the pre-defined distance is 10 µm or more. According to one embodiment, the pre-defined distance is 15 µm or more. According to one embodiment, the pre-defined distance is 20 µm or more According to one embodiment, the pre-defined distance is 25 µm or more. According to one embodiment, the pre-defined distance is 30 µm or more. According to one embodiment, the pre-defined distance is 35 µm or more According to one embodiment, the pre-defined distance is 40 µm or more. According to one embodiment, the pre-defined distance is 45 µm or more. According to one embodiment, the pre-defined distance is 50 µm or more.

2) Evaluating Overlap Resolution:

The overlap resolution (OR) measure is computed as follows:

$$OR = \frac{\text{Number of overlaps resolved}}{\text{Total number of overlaps}}.$$

An overlap is characterized by the existence of a common boundary between two objects, for example, between two or more nuclei.

3) Evaluation of Segmentation Performance:

Segmentation results are compared to manual delineations performed by an expert oncologist (which serves as ground truth for segmentation evaluation) by computing boundary-based metrics, namely Hausdorff distance (HD), mean absolute distance (MAD), and area overlap metrics (true positive area ($TP_\alpha$), false-positive area ($FP_\alpha$), true-negative area ($TN_\alpha$), and false-negative area ($FN_\alpha$)). The manual delineation is represented as a closed boundary G.

An expert was asked provide manual delineations of 100 nuclei randomly chosen from histology images from the two datasets. For each of the 100 object boundary segmentations, corresponding values for HD and MAD were obtained. HD and MAD values close zero correspond to better segmentation. The area overlap metrics were used to compute the sensitivity $SN_\alpha$, specificity $SP_\alpha$, positive predictive value PPV, and the overlap ratio $OV_\alpha$ of the segmentation results for each of the three models. The area overlap metrics are computed as follows:

$$TP_a = \frac{|\mathcal{A}(S) \cap \mathcal{A}(\mathcal{G})|}{\mathcal{A}(\mathcal{G})},$$

$$FP_a = \frac{|\mathcal{A}(S) \cup \mathcal{A}(\mathcal{G}) - \mathcal{A}(\mathcal{G})|}{\mathcal{A}(\mathcal{G})},$$

$$FN_a = \frac{|\mathcal{A}(S) \cup \mathcal{A}(\mathcal{G}) - \mathcal{A}(S)|}{\mathcal{A}(\mathcal{G})},$$

and $$TN_a = \frac{|C - \mathcal{A}(\mathcal{G})|}{\mathcal{A}(\mathcal{G})}.$$

where $\mathcal{A}( )$ is the area of the closed boundary. For each image, the set of pixels lying within the manual delineations of the nuclei is denoted as $\mathcal{A}(G)$. $\mathcal{A}(S)$ is the set of pixels whose level set functions are positive, after the convergence of the active contour model. The $SN_\alpha$ and $PPV_\alpha$ values are computed as described in Equations (23) and (24) respectively. $SP_\alpha$ and $OV_\alpha$ values are computed as follows:

$$SP_a = \frac{TN_a}{TN_a + FP_a},$$

$$OV_a = \frac{TP_a}{TP_a + FP_a + FN_a}.$$

Results

A. Quantitative Results

Figure 5:
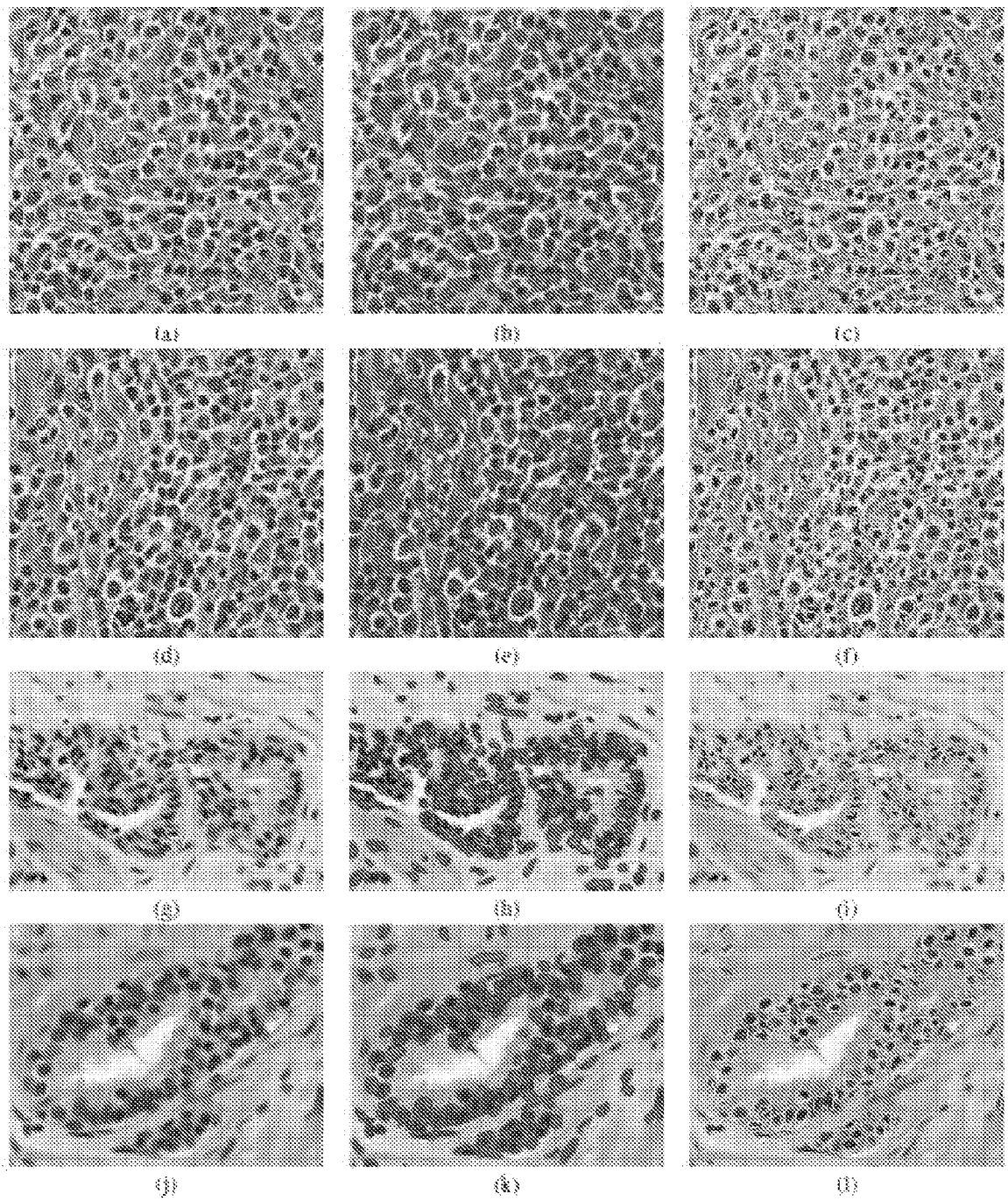
FIG. 5 shows a comparison of the segmentation results using the hybrid adaptive active contour model versus the GAC model. (a), (d), (g), and (j) show original breast cancer histological image scenes. (b), (e), (h), and (k) show segmentation results using the GAC model for the respective image scenes shown in a), (d), (g), and (j); (c), (f), (i), and (l) show segmentation results using the hybrid adaptive active contour model for the respective image scenes shown in (a), (d), (g), and (j).
Figure 6:
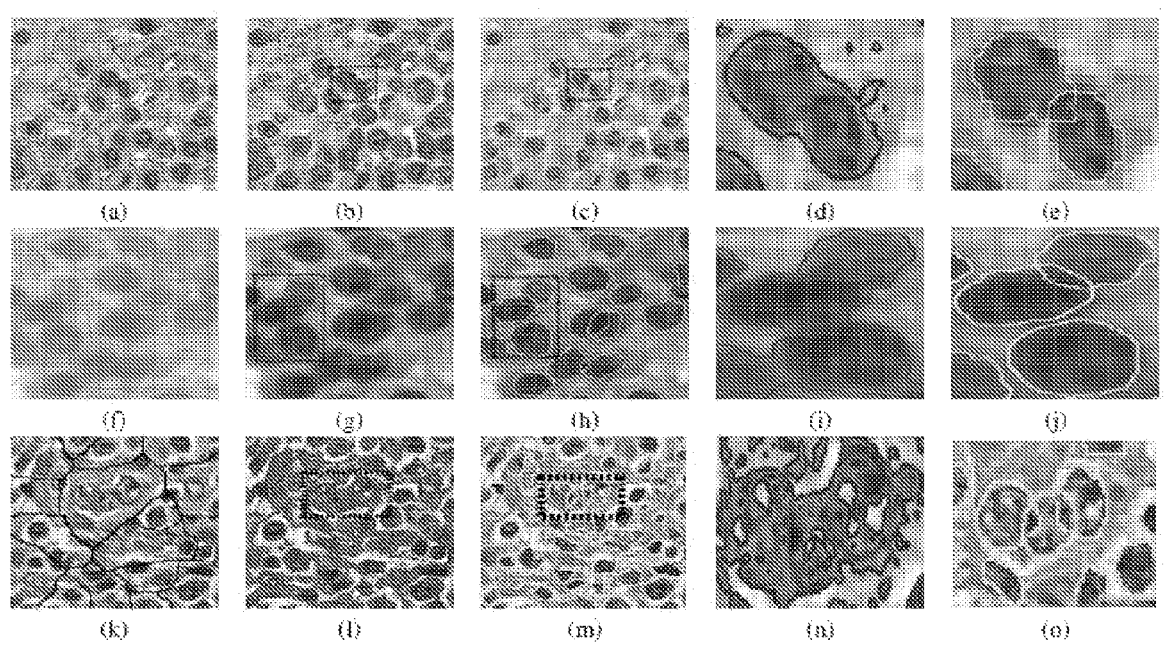
FIG. 6 shows Watershed initialization of nuclei and lymphocytes on prostate and breast cancer histopathology with corresponding segmentation results. ((a), (f), (k)) Original prostate cancer histological images; ((b), (g), (l)) segmentation results obtained via a Geodesic Active Contour (GAC) model described in Caselles et al. (Caselles, V. et al, "Geodesic active contours," Int. J. Comput. Vision, vol 22, no. 1, pp. 61-79, 1997); ((c), (h), (m)) segmentation results obtained via the hybrid adaptive active contour AC model; ((d), (i), (n)) shows a magnified region from ((b), (g), (l)); ((e), (j), (o)) shows a magnified region from ((c), (h) and (m)).
Figure 7:
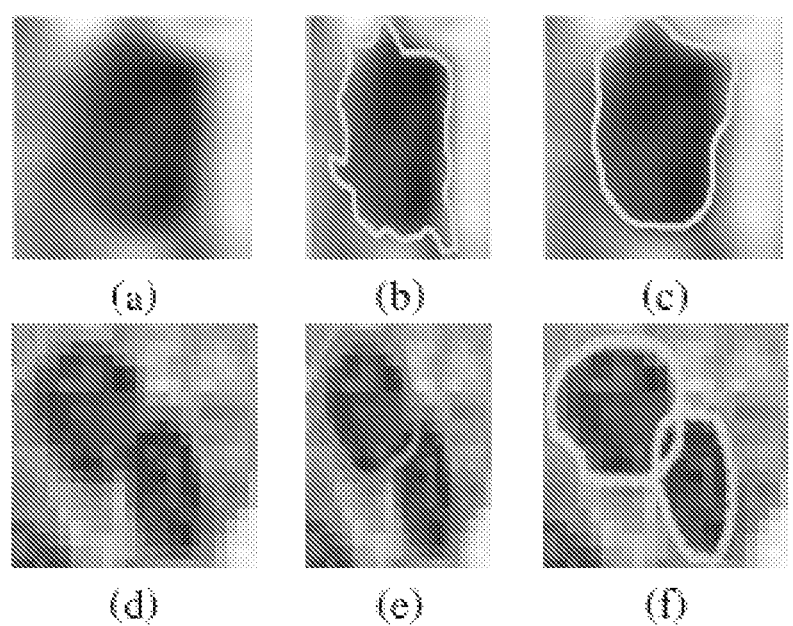
FIG. 7 shows a comparison of the segmentation results using the hybrid adaptive active contour model versus the Rousson shape based model (RD) model described in Rousson et al. (Rousson M. et al., "Shape priors for level set representation," European Conference on Computer Vision, pp. 78-92, 2002). (a), (d) Original Images (top row displays Breast Cancer lymphocyte, bottom row illustrates Prostate Cancer nuclei); (b), (e) Segmentation given via RD; (c), (f) Segmentation given via the hybrid adaptive active contour model.

Qualitative results for 3 of the 114 different studies are illustrated in FIGS. 5 and 6 and reflect the superiority of the hybrid adaptive active contour model. For the prostate and breast histology images considered in this study, the hybrid adaptive active contour model was used for segmenting the gland lumen and lymphocytes, respectively. The results shown in FIGS. 5 and 6 for nuclei segmentation demonstrate the strength of the hybrid adaptive active contour model in terms of detection, segmentation, and overlap resolution. For both the breast and prostate histology images in FIGS. 5 and 6 respectively, the hybrid adaptive active contour model was able to detect and segment lymphocytes and cancer nuclei accurately. FIG. 7 demonstrates the robustness of the hybrid adaptive active contour model as it provides boundaries close to the actual nuclear boundary and the shape constraint prevents spurious edges. FIG. 7 also demonstrates the ability of the hybrid adaptive active contour model to segment multiple overlapping objects compared to the RD model.

B. Quantitative Results

Results of quantitative evaluation of detection and segmentation performance for each of the three models are shown in Tables 4, 5 and 6. These results reflect the improved performance of the hybrid adaptive active contour model over RD and GAC models respectively. The SN and PPV values listed in Table 4 and 5 reflect the accuracy of our model in detecting lymphocytes in BC images and detecting nuclei in prostate images as compared to the other two models. A total of 250 cases of overlapping objects were manually identified in 114 images from datasets 1 and 2 (see Table 3). The hybrid adaptive active contour model was able to resolve 228 (91:2%) overlaps.

Figure 8:
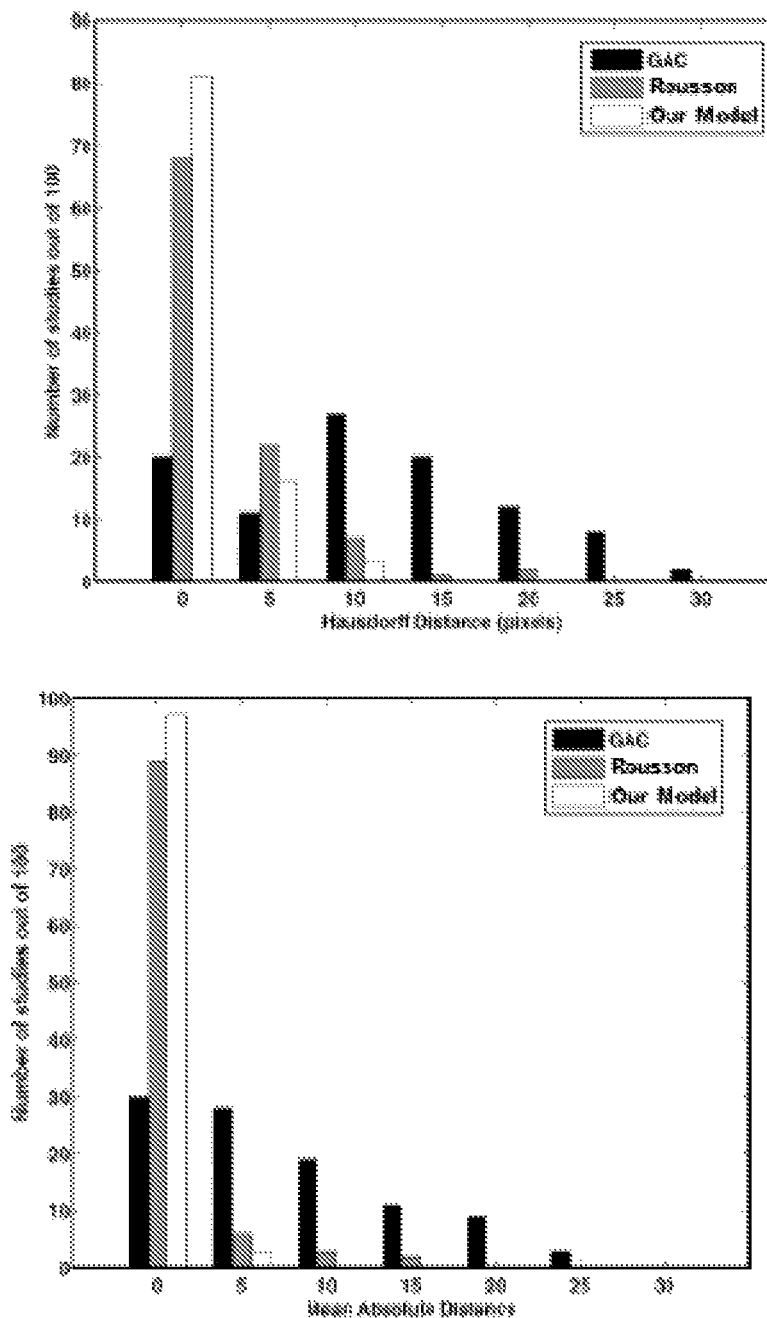
FIG. 8 shows histograms for (a) Hausdorff distance (HD) and (b) mean absolute distance (MAD) for each of the three models. The plot reflects the number of studies (y-axis) for which the HD and MAD values were below a certain number of image pixels (X-axis).

In terms of segmentation performance, the hybrid adaptive active contour model easily out performed the RD and GAC models, in terms of all six segmentation evaluation measures over 800 lymphocytes obtained from 100 breast cancer histopathology images. FIG. 8 shows histogram plots of the HD and MAD values for the three models over 800 lymphocytes from 100 breast histology images for which segmentation evaluation was done. The HD and MAD values for our model were less than 5 pixels in over 95% and 99% of the cases, respectively. The statistical measures from the area overlap metrics are summarized in Table 6.

Tables 4 and 5 contain the summary of detection results for both datasets in terms of SN, PPV and OR. Results reflect the superiority of our model in terms of detection compared to the RD and GAC models.

TABLE 4

Quantitative evaluation of detection results with the GAC, RD and the hybrid adaptive active contour models over 100 breast cancer histology images

|  | SN | PPV | OR |
| --- | --- | --- | --- |
| GAC model | 0.20 | 0.58 | 0.022 |
| RD model | 0.59 | 0.63 | 0.74 |
| Hybrid Active Contour Model | 0.86 | 0.67 | 0.91 |

TABLE 5

Quantitative evaluation of detection results with the GAC, RD and the hybrid adaptive active contour models over 14 prostate histology images

|  | SN | PPV | OR |
| --- | --- | --- | --- |
| GAC model | 0.22 | 0.55 | 0.030 |
| RD model | 0.63 | 0.63 | 0.73 |
| Hybrid Active Contour Model | 0.87 | 0.64 | 0.90 |

TABLE 6

Quantitative evaluation of segmentation results between the GAC, RD and the hybrid adaptive active contour models for 800 lymphocytes

|  | $SN_a$ | $SP_a$ | $PPV_a$ | $OV_a$ | HD | MAD |
| --- | --- | --- | --- | --- | --- | --- |
| GAC model | 0.31 | 0.94 | 0.21 | 0.17 | 11.3 | 7.6 |
| RD model | 0.81 | 0.90 | 0.60 | 0.49 | 2.9 | 1.5 |
| Hybrid Active Contour Model | 0.80 | 1.0 | 0.86 | 0.72 | 2.1 | 1.1 |

C. Test of Statistical Significance Between the Models

For each of the 114 studies, performance evaluation metrics (SN, PPV, $SN_a$, $PPV_a$, $SP_a$, $OV_a$, HD, and MAD) were compared for every pair of models (RD and hybrid active contour, GAC and hybrid active contour, RD and GAC) using the paired t-test under the null hypothesis that there is no significant difference in the values of the metrics between all three models. The null-hypothesis was rejected for p-value ≤0:05 (see Table 7). For almost every performance metric, the hybrid adaptive active contour model showed a statistically significant improvement compared to GAC and RD models.

Table 7 Summarizes p-Values of t-Test Between the GAC, RD and the Hybrid Adaptive Active Contour (HAAC) Models for Performance Statistics from 114 Studies

|  | SN | PPV | OR | $SN_a$ | $SP_a$ | $PPV_a$ | $OV_a$ | HD | MAD |
| --- | --- | --- | --- | --- | --- | --- | --- | --- | --- |
| GAC/RD | $2.6 \times 10^{-34}$ | $6.1 \times 10^{-3}$ | $1.8 \times 10^{-14}$ | $1.1 \times 10^{-16}$ | $8.1 \times 10^{-3}$ | $1.9 \times 10^{-15}$ | $1.9 \times 10^{-17}$ | $4.5 \times 10^{-16}$ | $1.5 \times 10^{-13}$ |
| GAC/HAAC | $1.3 \times 10^{-73}$ | $1.4 \times 10^{-3}$ | $1.3 \times 10^{-81}$ | $6.1 \times 10^{-18}$ | $8.2 \times 10^{-4}$ | $2.8 \times 10^{-33}$ | $1.2 \times 10^{-31}$ | $3.8 \times 10^{-21}$ | $2.1 \times 10^{-17}$ |
| RD/HAAC | $1.6 \times 10^{-50}$ | $6.9 \times 10^{-1}$ | $1.4 \times 10^{-57}$ | $9.5 \times 10^{-1}$ | $1.3 \times 10^{-4}$ | $7.9 \times 10{-12}$ | $1.7 \times 10^{-10}$ | $4.6 \times 10^{-3}$ | $1.7 \times 10^{-2}$ |

Example 3

Feature Extraction

A signature feature set was developed. The signature feature set describes the nuclear morphological, architectural, and textural information from segmented nuclei per of prostate cancer (CaP) histological image. These features were used to make a quantitative signature for each image, describing both information in the image traditionally used in the Gleason grading paradigm (such as nuclear and architectural) as well as features not considered in Gleason grading (such as nuclear morphology, second-order co-adjacency and global texture features).

From each image I, a set of nuclear, graph- and texture-based features were extracted to capture the discriminating characteristics of the tissue/nuclear patterns in each image. A feature vector F was created for I where each element of F is a distinct feature value. These values were calculated as described below.

Nuclear Morphology

A total of 7 nuclear features from each of the segmented nuclei were extracted. These nuclear morphologic features include: Area Overlap Ratio, Average Radial Ratio, Compactness, Convexity, Mean Nuclear Area, Mean Nuclear Perimeter, Mean Nuclear Diameter.

4.2. Nuclear Architecture

Features that describe the spatial location of nuclei within the histological image were calculated. On each of the segmented nuclei, center of mass was calculated to represent the nuclear centroid. From these nuclear centroids, a set of features such as the number of density of the nuclei in the image were calculated. To analyze the nuclear architecture in greater detail, a series of graphs, using the nuclear centroids as nodes of the graph, was prepared. Quantifiable features were then extracted from these graphs (see Table 8).

Table 8 shows a summary of image derived features used to characterize architectural arrangement and morphological appearance of CaP nuclei. Relationship of graph, morphological features to visual attributes is also shown.

TABLE 8

Summary of image derived features used to characterize architectural arrangement and morphological appearance of CaP nuclei

| Feature Class | Extracted Features | Relevance to Histology |
|---|---|---|
| Voronoi Tesselation | Area Standard Deviation, Area Average, Area Minimum/Maximum Area Disorder, Perimeter Standard Deviation, Perimeter Average, Perimeter Minimum/Maximum, Perimeter Disorder, Chord Standard Deviation, Chord Average, Chord Minimum/Maximum, Chord Disorder | Tissue Architecture |
| Delaunay Triangulation | Side Length Minimum/Maximum, Side Length Standard Deviation, Side Length Average, Side Length Disorder, Triangle Area Minimum/Maximum, Triangle Area Standard Deviation, Triangle Area Average, Triangle Area Disorder | |
| Minimum Spanning Tree | MST Edge Length Average, MST Edge Length Standard Deviation, MST Edge Length Minimum/Maximum, MST Edge Length Disorder | |
| Nuclear Morphology | Margin spicularity, fractal dimension, height to width ratio, roundness factor, area overlap ratio, area disorder, perimeter, diameter. | Nuclear, size boundary, appearance |

Figure 9:
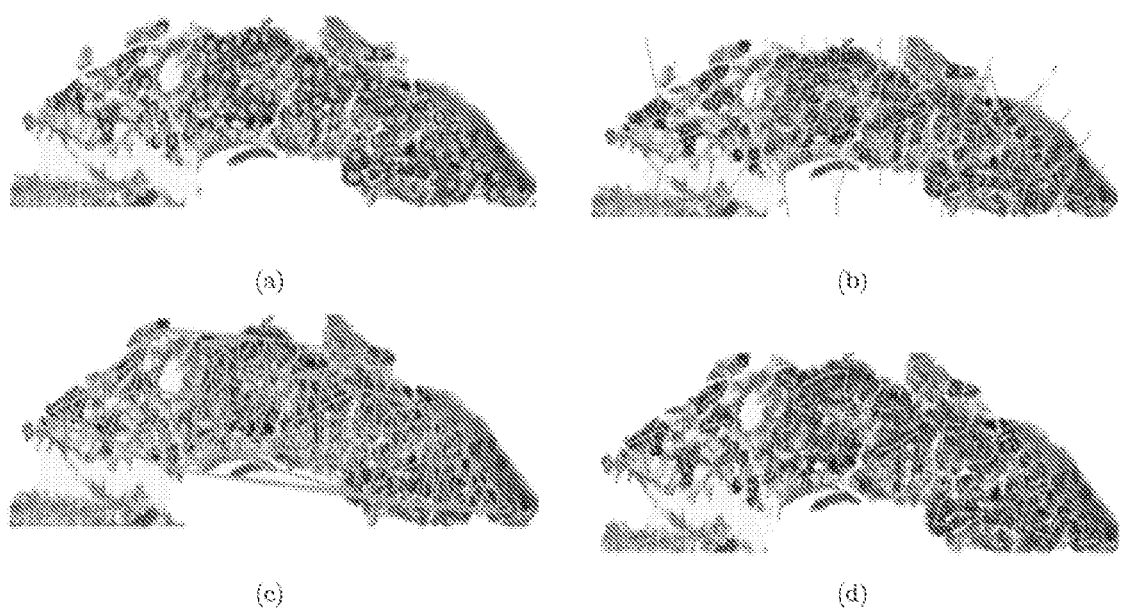
FIG. 9 shows: from (left to right) Different graph features being used model nuclear architecture of Grade 6 CaP. Shown from left to right (a) original histology image with detected nuclear centroids, (b) Delaunay triangulation, (c) minimum spanning tree, and (d) Voronoi diagram. Nuclear centroids were used as graph vertices.

A graph is denoted as $\mathcal{G}=(V;E;W)$, where V are vertices, E are edges, and W are edge weights, proportional to length. The set of vertices, edges, and weights make up a unique graph on $\mathcal{R}$. The following graphs were constructed (for example as shown in FIG. 9).

(a) Voronoi Diagram ($\mathcal{G}_V$): The Voronoi Diagram partitions $\mathcal{R}$ into a set of polygons with centroids V, where a non-centroid pixel is assigned to the polygon of the closest centroid pixel. This yields a tessellation of the image, as shown in FIG. 9. Pixels that are equidistant from exactly two centroids make up E (edges of the graph), while pixels equidistant from three or more centroids make up the intersections of multiple edges. The perimeter, area, and chord lengths of each, polygon in $\mathcal{G}_V$ are computed, and the average, standard deviation, disorder, and minimum to maximum ratio of each are calculated for a total of 12 Voronoi-based features per I.

(b) Delaunay Triangulation ($\mathcal{G}_D$): The Delaunay Triangulation is a triangulation of vertices V such that the circumcircle of each triangle contains no other vertices. The Delaunay and Voronoi graphs are dual to each other, meaning that two points are connected in $\mathcal{G}_D$ if and only if their polygons in $\mathcal{G}_V$ share an edge. An example of $\mathcal{G}_D$ is given in FIG. 9(b). From this graph, we compute the area and perimeter of each triangle, and the average, standard deviation, disorder, and minimum to maximum ratio of these are calculated to yield 8 Delaunay-based features per I.

(c) Minimum Spanning Tree ($\mathcal{G}_M$): A spanning tree of a set of points V is an undirected, fully connected graph on V. The weight W of the graph is the sum total of all edges E, and the Minimum Spanning Tree (MST) is the spanning tree with the lowest overall W. The MST, denoted $\mathcal{G}_M$, is a subgraph of the Delaunay Triangulation. An example of $\mathcal{G}_A$, is given in FIG. 9(c). The average, standard deviation, disorder, and minimum to maximum ratio of the weights W were calculated to yield 4 MST-based features per I.

Example 4

Tissue Texture Feature Extraction

The proliferation of nuclei, difference in size and shape leads to a change in overall textural characteristics in a region of interest (ROI). To quantify this change in tissue texture characteristics, a number of low-level image statistics from each ROI were calculated. These statistics can be broadly characterized into two groups, namely first-order statistics and second-order co-occurrence features. Each of these was calculated in a pixel-wise fashion and are computed independently for each of the hue, saturation, and intensity channels of the original scanned image, generating a set of feature images. The average, standard deviation, and mode of each of these feature images were calculated, yielding a texture feature vector to quantify the image. In total, 253 texture features were calculated in this manner. The details of each feature type are given below.

First-order Statistics: 15 different first-order statistics from each image were calculated. These features included average, median, standard deviation, and range of the image intensities within the sliding neighborhood, as well as the Sobel filters in the vertical, horizontal, and both diagonal axes, 3 Kirsch filter features, gradients in the vertical and horizontal axes, difference of gradients, and diagonal derivative. By calculating these 15 features for each channel in the image, and then calculating the mean, standard deviation, and mode of the feature images, we obtain a total of 135 first-order statistics for I.

Co-occurrence Features: Co-occurrence features, also referred to as Haralick features, as described by Haralick et al. (Haralick et al. 1973, Texture features for image classification, IEEE Trans on Man, Systems, and Cybernetics), were computed by constructing a symmetric 256×256 co-occurrence matrix, which describes the frequency with which two different pixel intensities appear together within a fixed neighborhood. The number of rows and columns in the matrix were determined by the maximum possible value in a channel of $\mathcal{R}$; for 8-bit images, this corresponds to $2^8=256$. Element (a, b) in the matrix is equal to the number of times pixel value αoccurs adjacent to pixel value b in $\mathcal{R}$. From the co-occurrence matrix, a set of 13 Haralick features were calculated: contrast energy, contrast inverse moment, contrast average, contrast variance, contrast entropy, intensity average, intensity variance, intensity entropy, energy, correlation, entropy, and two measures of information. Extracting these values from each channel and taking the mean, standard deviation, and mode of each feature image yielded a total of 117 co-occurrence features.

Discriminating Gleason Patterns

The hybrid adaptive active contour model was evaluated in terms of the ability of the morphologic descriptors extracted from the nuclear boundaries to distinguish different Gleason patterns of CaP from a total of 40 (2 images per study) TMA images obtained from prostate needle core biopsy samples. This method is adapted from the method described in Veltri et al. (Veltri, R. et al., "Nuclear Roundness Variance Predicts Prostate Cancer Progression, Metastasis, and Death: A Prospective Evaluation With up to 25 Years of Follow-Up After Radical Prostatectomy", The Prostate., vol. 70, 1333-1339, 2010). The 40 studies comprised 13 Gleason patterns 6 (3+3), 8 pattern 7 (3+4), 7 pattern 8 (4+4) and 5 pattern, 9 (4+5) studies where the first number in the parenthesis refers to the primary and the second number to the secondary Gleason grade. Additionally the ability of the model to selectively invoke energy terms in the integrated synergistic shape functional was also evaluated in terms of the (a) overlaps between nuclei resolved (for a randomly selected subset of nuclei) and (b) computational savings over a hybrid model without selective invocation of the shape term.

Figure 10:
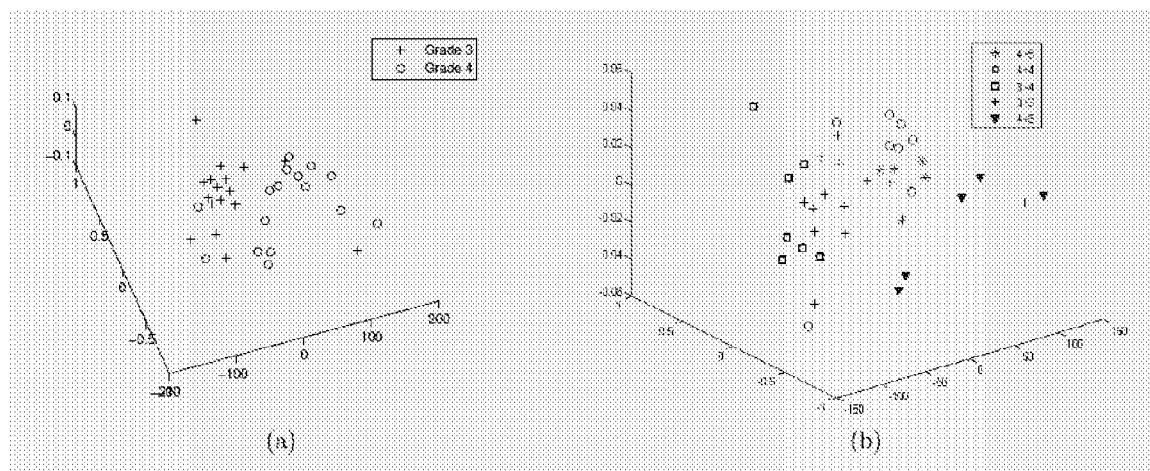
FIG. 10 shows PCA representation of extracted features reveals separation of (a) primary grade 3 and grade 4 and (b) Gleason patterns 6, 7, 8 and 9.

The extracted features are aggregated into feature set: $Q^{Tot}=\{Q^{Arc}, Q^{Tex}, Q^{Nuc}\}$, where $Q^{Arc}$, $Q^{Tex}$, $Q^{Nuc}$ refer to architectural, textural and nuclear features. The PCA method was applied to $Q^{Tot}$ to visualize the arrangement of different Gleason patterns in the reduced embedding space. FIG. 10(a) illustrates the PCA representation of the 7 morphologic features averaged over each of 40 studies (total of 80 images) and reveals a clear separation between Gleason patterns 3 and 4. Similarly, by exposing the labels for the Gleason scores for each of 40 studies (FIG. 10(b)), one can appreciate the separation between Gleason patterns 6, 7, 8, and 9. Note that the PCA plots suggest that the nuclear shape features are able to capture the subtle morphologic differences between the different Gleason patterns, in turn reflecting the accuracy of the hybrid adaptive active contour model.

Classification Accuracy

Figure 11:
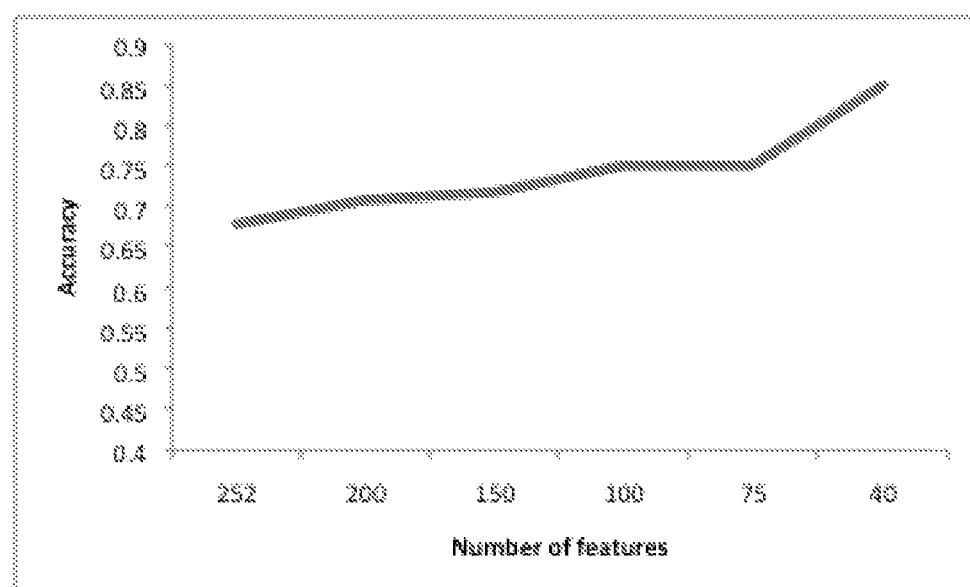
FIG. 11 shows a plot demonstrating classification accuracy of Grade 3 versus Grade 4 CaP with various feature ranks.

An mRMR algorithm was employed to prune $Q^{Tot}$ to provide an optimal number of features that can be used to train the QDA classifier to accurately distinguish between intermediate primary grade 3 and grade 4 tumors. The main free parameter associated with the mRMR scheme is the number of features to be selected) (|Q|). The number of features and evaluated the classification performance of each resulting using a QDA classifier were empirically varied. Top 40 features from mRMR were found to be optimal. Top 10 features are listed in Table 9. The plot in FIG. 11 illustrates effect of various feature ranks on the classification accuracy.

TABLE 9

List of top 10 ranked features

| | Feature Name | Feature Type |
|---|---|---|
| 1 | Average Radial Ratio | Nuclear |
| 2 | Perimeter Standard Deviation | Voronoi |
| 3 | Mean Nuclear Perimeter | Nuclear |
| 4 | Intensity Variation | Harlick |
| 5 | Side Length Average | Delaunay |
| 6 | Area Overlap Ration | Nuclear |
| 7 | Chord Standard Deviation | Voronoi |
| 8 | $\theta = \frac{\pi}{6}$, window: 5×5 | Gabor (sin) |
| 9 | MST Edge Length Standard Deviation | Minimum Spanning Tree |
| 10 | Compactness | Nuclear |

For a database of 80 images, the QDA classifier achieved an accuracy of 86:1±0:5% in distinguishing primary grade 3 from 4 using best selected features from all the feature class. Classifier evaluation was done via a 3 fold cross validation scheme, over 10 successive runs. QDA classification accuracies and the pruned number of features are given in Table 10.

TABLE 10

Classification Results

| | QDA Accuracy |
|---|---|
| All Features (40) | 0.861 |
| Nuclear Features | 0.812 |
| Architectural Features | 0.787 |
| Textural Features | 0.683 |

Evaluating Overlap Resolution and Segmentation Accuracy

Quantitative comparison of the hybrid adaptive active contour (HAAC) model with a Geodesic Active Contour (GAC) model described in Caselles et al. (Caselles, V. et al, "Geodesic active contours," Int. J. Comput. Vision, vol 22, no. 1, pp. 61-79, 1997) and the Rousson shape based model (RD) described in Rousson et al. (Rousson M. et al., "Shape priors for level set representation," European Conference on Computer Vision, pp. 78-92, 2002) was performed. The overlap resolution (OR) measure is computed as follows:

$$OR = \frac{\text{Number of overlaps resolved}}{\text{Total number of overlaps}}.$$

Table 11 summarizes the results of overlap resolution and segmentation accuracy comparison of the three models.

TABLE 11

Quantitative evaluation of segmentation, and Overlap Resolution between the Geodesic Active Contour (GAC), Rousson-Deriche (RD) and the hybrid adaptive active contour (HAAC) model for 200 randomly selected nuclei across the 80 TMA images

| | Sensitivity | Specificity | Mean Average Distance | OR |
|---|---|---|---|---|
| GAC | 0.28 | 0.92 | 7.1 | 0.04 |
| RD | 0.76 | 0.88 | 1.5 | 0.74 |
| AdACM | 0.82 | 1.0 | 1.1 | 0.90 |

Computational Efficiency

The computational efficiency of the hybrid adaptive active contour model was evaluated with respect to a hybrid active contour model which did not employ selective invocation of the shape prior. On image patches of 200×200 pixels and in the presence of 120 nuclei with 40 overlaps, the hybrid adaptive active contour model required 250s to accurately segment all objects and resolve all intersections, compared to HACM which took 550s; all evaluations being performed on a 3 GHz, dual core processor with 4 GB RAM.

Example 5

GPU Implementation of the Hybrid Adaptive Active Contour Model

A. Model Parameters, Implementation and Initialization

A training set of 30 ellipses (nuclei and lymphocytes being elliptical in shape) were generated using the PCA method by changing the size of a principal axis with a gaussian probability function. The manner of choosing the weighting parameters in Equations (11) and (16) is as follows: $\lambda_1=1$, $\lambda_2=2$, and $\mu=0.2$ determines the size of the neighborhood where the grey value information is averaged by means of diffusion, $\beta_r$ is chosen such that the shape prior is attracted towards the region to be segmented.

Level sets were manually initialized and the model assumes that the level sets are strategically placed in the vicinity of the objects. Some features such as the Courant-Friedrichs-Lewy (CFL) condition could not be implemented in this parallel version without slowing down computation time significantly. This is because such a condition requires the determination of the largest element of $\nabla\phi$ which is computed roughly half way through the update procedure. Therefore, integrating this condition would require transferring $\nabla\phi$ and curvature terms back to host memory to determine max $\{F|\nabla\phi|\}$, or perhaps more efficiently calling a CUDA kernel to determine the largest element. The cost of this added complexity and slowdown outweighed the benefits, and therefore $\Delta t$ was chosen to be a fixed parameter.

All hardware testing was done on a single PC with an Intel Core 2 Duo T8100 Processor with a clock speed of 2.1 GHz and 4 GB of RAM. The graphics hardware used was the NVIDIA GeForce 8600M GT, with CUDA 2.2 software installed. Timing code used was from the cutil library provided in the CUDA toolkit.

Evaluation is done on two different histopathology datasets: prostate cancer and breast cancer cohorts comprising 52 and 14 images respectively. A total of 70 cancer nuclei from 14 images for prostate and 504 lymphocytes from 52 images for breast cancer were manually delineated by an expert pathologist (serving as the ground truth annotation for quantitative evaluation). For both datasets, the objective was to detect, segment the individual nuclei and lymphocytes, and, where appropriate, resolve the overlap between intersecting objects.

Table 12 summarizes the description of the different data sets in the GPU implementation example.

TABLE 12

Description of the data sets considered in this study

| | Name | Number |
|---|---|---|
| Dataset 1 | Hematoxylin & Eosin (H&E) stained prostate needle core biopsy images | 52 |
| Dataset 2 | Hematoxylin & Eosin (H&E) stained breast cancer images | 14 |

Table 13 summarizes a description of patch sizes from the two data sets for which the GPU accelerated model was evaluated.

TABLE 13

Description of patch sizes from two data sets for which the GPU accelerated hybrid adaptive active contour model (HAAC) was evaluated

| Patch Size | Dataset 1 No. of Images | Dataset 2 No. of Images |
|---|---|---|
| 512 × 512 | 4 | 25 |
| 256 × 256 | 5 | 37 |
| 128 × 128 | 5 | 20 |

Evaluation of Segmentation and Detection Accuracy

Figure 13:
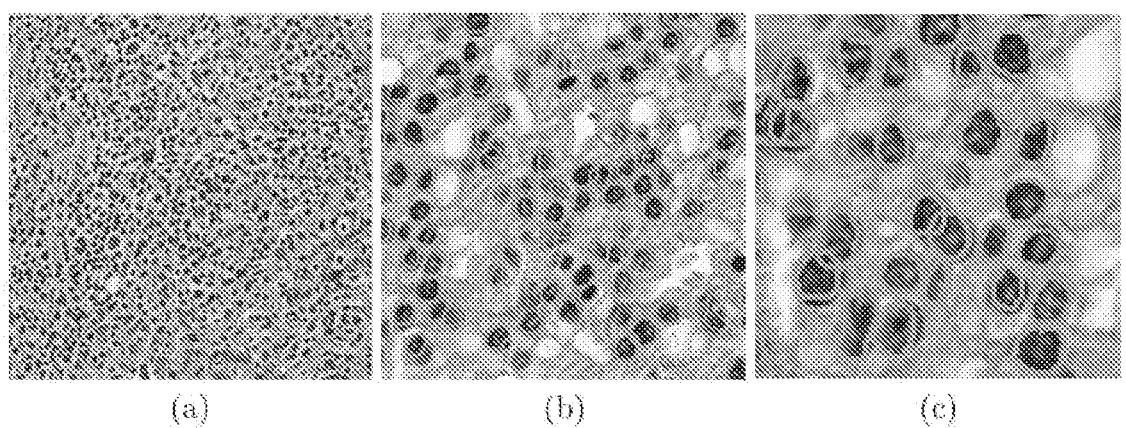
FIG. 13 shows segmentation results from the GPU accelerated hybrid adaptive active contour model applied to histological image patches of sizes (a) 512×512, (b) 256×256, and (c) 128×128.
Figure 14:
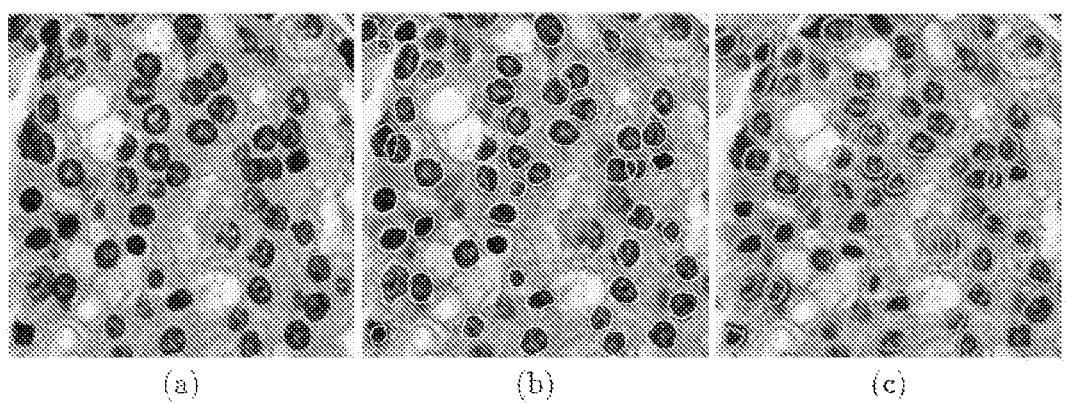
FIG. 14 shows segmentation results comparing (a) the mCV model (a model described in Chan et al., "Active contours without edges", IEEE Trans. on Image Processing, vol. 10, no. 2, pp. 266-277, (2001)), (b) the hybrid adaptive active contour model, and (c) the GPU accelerated hybrid adaptive active contour model.

The results shown in FIG. 13 for nuclei segmentation demonstrate the strength of the GPU accelerated hybrid adaptive active contour model in terms of detection, segmentation, and overlap resolution. as compared to a model described in Chan et al. (Chan T. F. et al., "Active contours without edges," IEEE Trans. on Image Processing, vol. 10, no. 2, pp. 266-277, (2001)) (mCV) and the hybrid adaptive active contour model (HAAC). FIG. 14 shows nuclear segmentation achieved by the three models.

The SN, PPV, OR (Overlap detection Ratio) for each image were computed, and the average and standard deviation across the 66 images were determined. The overlap resolution (OR) measure is computed as follows:

$$OR = \frac{\text{Number of overlaps resolved}}{\text{Total number of overlaps}}.$$

Table 14 summarized the quantitative results of the segmentation scheme according to the three models demonstrating the efficacy of our model in segmenting nuclei and lymphocytes in CaP and BC images.

TABLE 14

Quantitative evaluation of segmentation results between models over 66 images

| | SN | PPV | OR |
|---|---|---|---|
| mCV model | 0.23 | 0.57 | 0.089 |
| HAAC model | 0.82 | 0.67 | 0.91 |
| GPU accelerated HAAC model | 0.73 | 0.64 | 0.87 |

Evaluation of Speed Up

Various runtime speed ups were achieved on image sizes 256×256 and 512×512. First we compare the average time taken for 2000 iterations in MATLAB, C and CUDA on histopathology data, identified as having good and with image dimensions of contrast and dimension 256×256 (a multiple of 16 implying no memory padding is required in CUDA). Results shown in Table 15 reflect the speed up achieved by our GPU accelerated method.

TABLE 15

Comparison of average runtimes for the GPU accelerated HAAC model in different programming environments. All comparisons were performed for image patches of sixe 256 × 256 and 512 × 512 respectively

| Algorithm version | 256 × 256 Time (s) | 512 × 512 Time (s) |
|---|---|---|
| MATLAB | 2615.95 | 4415 |
| C | 960.44 | 1320.5 |
| CUDA (optimized) | 80.73 | 69.4 |

The average runtime speed up attained from sequential code in C to CUDA optimized code is approximately 13×. The block size used for 2D CUDA compute was 32×8.

A set of images with relatively poor contrast and patch size of dimensions 512×512 were selected. The average performance speedup attained on this larger image set was 19×.

Evaluation of Effects of Image Size on Speed Up

Figure 15:
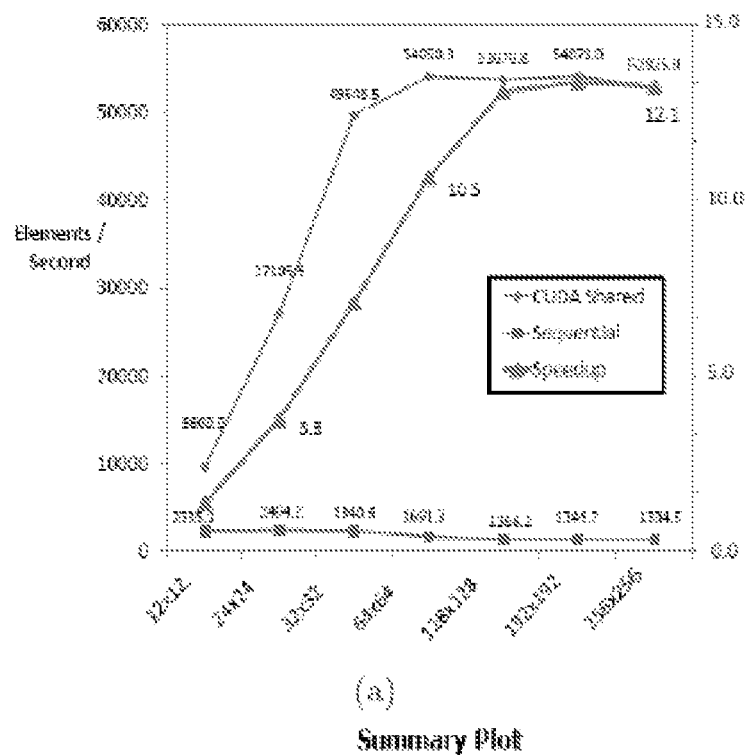
FIG. 15 shows (a) Number of elements computed per second for different volume sizes; (b) Profile obtained from cudaprof that shows the percent wise time consumption for all kernels. This profile comes from data set I and II with 512× 512 images.
Figure 15:
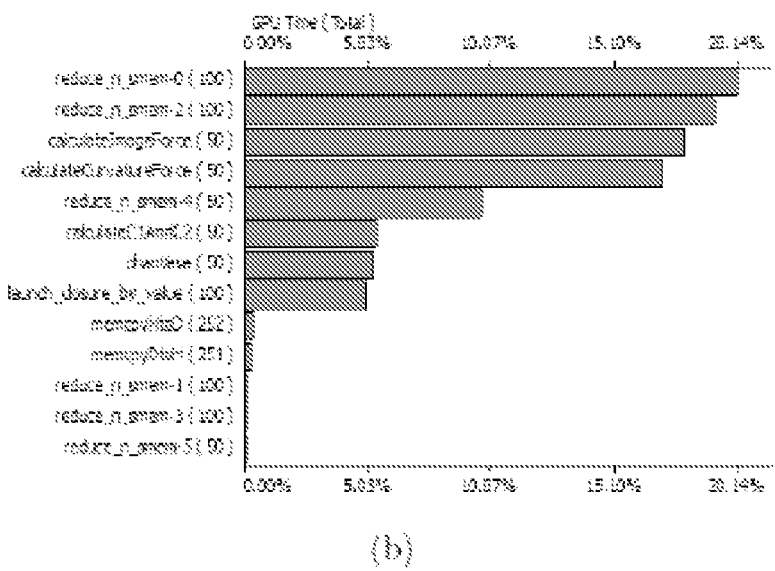

FIG. 15 shows the effect of multiple patch sizes on computational time for up to 1000 iterations on the optimized CUDA algorithm. FIG. 15 demonstrates that the speed up for smaller sized image patches is relatively less when compared to the speed up obtained for images with larger sizes. The sequential algorithm performs almost half as slowly for volume sizes larger than $64^2$. This is most likely due to the fast on board CPU cache being used for smaller volume sizes ($<64^2$) volume sizes larger cannot fit on the CPU cache and hence are stored on the slower DRAM.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform steps of and whole processes and functionalities as described in the present disclosure.

In this description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field-Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

In one embodiment, a user terminal can be a computing device, such as a in the form of or included within a PDA, a cellular phone, a notebook computer, a personal desktop computer, etc. Alternatively, the traditional communication client(s) may be used in some embodiments of the disclosed subject matter.

While some embodiments of the disclosed subject matter have been described in the context of fully functioning computing devices and computing systems, those skilled in the art will appreciate that various embodiments of the disclosed subject matter are capable of being distributed, e.g., as a program product in a variety of forms and are capable of being applied regardless of the particular type of computing device machine or computer-readable media used to actually effect the distribution.

The disclosed subject matter is described with reference to block diagrams and operational illustrations of methods and devices to provide a system and methods according to the disclosed subject matter. It is understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, which executed by the computing device, e.g., on a processor within the computing device or other data processing apparatus, such that, when so executed, the program software code/instructions cause the computing device to perform functions, functionalities and operations of a method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of methods presented and described as a flowchart(s) in the form of a block diagram in the present application are provided by way of example in order to provide a more complete understanding of the disclosed subject matter. The disclosed flow and concomitantly the method(s) performed as recited in the accompanying claims are not limited to the functions, functionalities and operations illustrated in the block diagram and/or logical flow presented therein. Alternative embodiments are contemplated in which the order of the various functions, functionalities and operations may be altered and in which sub-operations described as being part of a larger operation may be performed independently or performed differently than illustrated or not performed at all.

Although some of the drawings illustrate a number of operations in a particular order, functions, functionalities and/or operations which are not now known to be order dependent or become understood to not be order dependent may be reordered and other operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) thereof co-located or remotely located, at least in part, from each other, e.g., in arrays or networks of computing devices, over interconnected networks, including the Internet, and the like.

Equivalents

While the described invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the described invention. All such modifications are intended to be within the scope of the claims appended hereto.

What is claimed is:

1. A method for segmenting single non-overlapping objects or multiple overlapping/occluded objects in an image scene via a hybrid adaptive active contour model incorporating shape priors, comprises:
   (a) inputting the image scene via a computing device;
   (b) collecting a plurality of shapes via the computing device, wherein the shapes correspond to the objects in the image scene;
   (c) determining a set of alignment parameters via the computing device, by performing a similarity transformation;
   (d) aligning the plurality of collected shapes in (b) via the computing device to create a plurality of aligned shapes, such that the plurality of aligned shapes have the same pose compared to a reference shape based on the similarity transformation of (b);
   (e) creating a training set via the computing device, wherein the training set comprises the plurality of aligned shapes in (d), wherein each aligned shape of the plurality of aligned shapes is embedded as a zero level set of a higher dimensional surface;
   (f) generating a shape prior via the computing device;
   (g) integrating a shape term via the computing device, wherein each aligned shape of the plurality of aligned shapes is embedded as the zero level set of the higher dimensional surface, and wherein the shape term is a signed distance function (SDF) used to encode the distance of the shape contour of each aligned shape to the nearest point in the shape space of the higher dimensional surface;
   (h) integrating a boundary-based term via the computing device to direct the hybrid adaptive active contour model to a boundary of at least one object of the objects in the image scene;
   (i) integrating a region homogeneity term via the computing device, wherein the region homogeneity term drives the shape term towards a homogeneous intensity region using the shape prior;
   (j) initializing the hybrid adaptive active contour model via the computing device by a watershed transformation method comprising delineating object boundaries of at least one target object in the image scene;
   (k) performing contour propagation of the delineated shape boundaries via the computing device by evolving the integrated synergistic shape functional by minimizing variational energy; and
   (l) achieving final segmentation of the image scene via the computing device.

2. The method according to claim 1, wherein step (f) generating a shape prior via the computing device comprises: (i) minimizing the probability distribution function (PDF) of the training set, (ii) computing a similarity transform of the shape prior, and (iii) encoding the similarity transform of the shape prior into the hybrid active contour model.

3. The method according to claim 1, wherein step (h) integrating a boundary-based term via the computing device to direct the hybrid adaptive active contour model to a boundary of at least one object of the objects in the image scene is by changing a size of a principle axis with a Gaussian probability function to generate the shape, and encoding the shape described by a Signed Distance Function (SDF).

4. The method according to claim 1, wherein the watershed transformation method in step (j) comprising delineating object boundaries of at least one target object in the image scene further comprises:
   (1) creating a binary mask enclosing the target object to form a closed sub-contour surrounding the target object;
   (2) detecting concavity points in the at least one target object by comparing an area enclosed within the closed sub-contour surrounding the at least one target object with a predetermined area of a reference object;
   (3) determining a number of the detected concavity points; and
   (4) ascertaining a condition of the at least one target object based on the determined number of concavity points, such that the determined number of concavity points is equal to the number of overlapping target objects in the image scene, wherein the condition of the at least one target object is selected from the group consisting of: (i) the at least one target object in the image scene includes a single non-overlapping object or (ii) the at least one target object in the image scene includes multiple overlapping/occluded objects;
   (5) selecting at least one energy functional selected from the group consisting of (A) the shape term, (B) the boundary-based term, (C) the region homogeneity term, or a combination thereof, based on the ascertained condition of the at least one target object such that if the ascertained condition is (i), the region homogeneity term is selected; or if the ascertained condition is (ii), the shape term, the boundary-based term, and the region homogeneity term are selected;
   (6) combining the at least one selected energy functional with the shape prior to yield at least one initial level set described by an integrated synergistic shape functional; and
   (7) placing the at least one initial level set on the at least one target object in the image scene.

5. The method according to claim 4, wherein in (5), if the ascertained condition of the at least one target object is (i), the region homogeneity term is selected.

6. The method according to claim 4, wherein in (5) if the ascertained condition of the at least one target object is (ii), the shape term, the boundary-based term, and the region homogeneity term are selected.

7. The method according to claim 4, wherein (h) integrating a boundary-based term via the computing device to direct the hybrid adaptive active contour model to a boundary of at least one object of the objects in the image scene is by changing a size of a principle axis with a Gaussian probability function by applying Principle Component Analysis (PCA).

8. The method according to claim 1, wherein the method resolves multiple overlapping/occluded objects simultaneously in a histopathology sample.

9. The method according to claim 8, wherein the overlapping/occluded objects in the histopathology sample comprise nuclear and glandular structures.

10. The method according to claim 8, wherein the overlapping/occluded objects in the histopathology sample comprise lymphocytes and nuclei.

11. The method according to claim 10, wherein the method resolves segment overlapping/occluded lymphocytes and nuclei in the histopathology sample with at least 90% accuracy.

12. The method according to claim 8, wherein the histology sample is prepared from a patient with a cancer.

13. The method according to claim 12, the cancer is selected from prostate cancer or breast cancer.

14. The method according to claim 1, wherein the hybrid adaptive active model is implemented through a graphical processing unit (GPU) framework.

15. The method according to claim 14, wherein run time for completion of the segmenting method is in a range of from 70 seconds to 80 seconds.

16. A method according to claim 1, wherein the method further comprises classifying the image scene, by:
   (m) extracting from the segmented objects via the computing device, at least one signature feature and computing at least one quantitative signature for the image scene;
   (n) selecting, via the computing device, at least one reference feature in a dataset comprising reference features according to a minimum Redundancy Maximum Relevance (mRMR) feature selection scheme to identify a selected subset of reference features;
   (o) discriminating, via the computing device, the at least one quantitative signature feature of the image scene from the selected subset of reference features to identify a class corresponding to the image scene; and
   (p) outputting, via the computing device, the class corresponding to the image scene.

17. The method according to claim 16, wherein the at least one signature feature is selected from the group consisting of nuclear morphology, nuclear architecture, nuclear texture, and a combination thereof.

18. The method according to claim 16, wherein the at least one quantitative signature feature is selected from the group consisting of nuclear morphology, nuclear architecture, nuclear texture, and a combination thereof.

19. The method according to claim 16, wherein the class corresponding to the image scene is a grade of the cancer.

20. The method according to claim 19, wherein the grade of the cancer is selected from the group consisting of Gleason grade 1, Gleason grade 2, Gleason grade 3, Gleason grade 4 or Gleason grade 5.

21. The method according to claim 19, wherein the cancer is selected from prostate cancer or breast cancer.

22. The method according to claim 16, wherein the hybrid adaptive active model of claim 1 is implemented through a graphical processing unit (GPU) framework.

23. The method according to claim 22, wherein run time for completion of the classifying method is within a range of between 70 seconds to 80 seconds.

24. A system, comprising a processor coupled to memory, for segmenting single non-overlapping objects or multiple overlapping/occluded objects in an image scene via a hybrid adaptive active contour model incorporating shape priors, comprises:
   (a) a computing device configured to input the image scene;
   (b) the computing device configured to collect a plurality of shapes, wherein the shapes correspond to the objects in the image scene;
   (c) the computing device configured to determine a set of alignment parameters by performing a similarity transformation;
   (d) the computing device configured to align the plurality of collected shapes in (b) to create a plurality of aligned shapes, such that the plurality of aligned shapes have the same pose compared to a reference shape based on the similarity transformation of (b);
   (e) the computing device configured to create a training set, wherein the training set comprises the plurality of aligned shapes in (d), wherein each aligned shape of the plurality of aligned shapes is embedded as a zero level set of a higher dimensional embedding function describing a surface;
   (f) the computing device configured to generate a shape prior;
   (g) the computing device configured to integrate a shape term, wherein each aligned shape of the plurality of aligned shapes is embedded as the zero level set of the higher dimensional surface, and wherein the shape term is a signed distance function (SDF) used to encode the distance of the shape contour of each aligned shape to the nearest point in the shape space of the higher dimensional surface;
   (h) the computing device configured to integrate a boundary-based term to direct the hybrid adaptive active contour model to a boundary of at least one object of the objects in the image scene;
   (i) the computing device configured to integrate a region homogeneity term, wherein the region homogeneity term drives the shape term towards a homogeneous intensity region using the shape prior;
   (j) the computing device configured to initialize the hybrid adaptive active contour model by a watershed transformation method comprising delineating object boundaries of at least one target object in the image scene,
   (k) the computing device configured to perform contour propagation of the delineated shape boundaries by evolving the integrated synergistic shape functional by minimizing variational energy; and
   (l) the computing device configured to achieve final segmentation of the image scene.

25. The system according to claim 24, wherein the computing device (h) configured to integrate the boundary-based term to direct the hybrid adaptive active contour model to a boundary of the at least one object of the objects in the image scene, is further configured to change a size of a principle axis with a Gaussian probability function by applying Principle Component Analysis (PCA).

26. The system according to claim 24, wherein the computing device (j) configured to initialize the hybrid adaptive active contour model by the watershed transformation method comprising the computing device configured to delineate object boundaries of at least one target object in the image scene, is further configured:
   (1) to create a binary mask enclosing the target object to form a closed sub-contour surrounding the target object;
   (2) to detect concavity points in the at least one target object by comparing an area enclosed within the closed sub-contour surrounding the at least one target object with a predetermined area of a reference object;
   (3) to determine a number of the detected concavity points;

(4) to ascertain a condition of the at least one target object based on the determined number of concavity points, such that the determined number of concavity points is equal to the number of overlapping target objects in the image scene, wherein the condition of the at least one target object is selected from: (i) the at least one target object in the image scene includes a single non-overlapping object or (ii) the at least one target object in the image scene includes multiple overlapping/occluded objects;

(5) to select at least one energy functional selected from the group consisting of (A) the shape term, (B) the boundary-based term, (C) the region homogeneity term, or a combination thereof, based on the ascertained condition of the at least one target object;

(6) to combine the at least one selected energy functional with the shape prior to yield at least one initial level set described by an integrated synergistic shape functional; and (7) to place the at least one initial level set on the at least one target object in the image scene.

27. The system according to claim 26, wherein in (5), if the ascertained condition of the at least one target object is (i), the region homogeneity term is capable of being selected.

28. The system according to claim 26, wherein in (5) if the ascertained condition of the at least one target object is (ii), the shape term, the boundary-based term, and the region homogeneity term are capable of being selected.

29. The system according to claim 26, wherein the computing device (h) configured to integrate the boundary-based term to direct the hybrid adaptive active contour model to a boundary of the at least one object of the objects in the image scene is further configured to change a size of a principle axis with a Gaussian probability function by applying Principle Component Analysis (PCA).

30. The system according to claim 24, wherein the system is capable of resolving multiple overlapping/occluded objects simultaneously in a histopathology sample.

31. The system according to claim 30, wherein the overlapping/occluded objects in the histopathology sample comprise nuclear and glandular structures.

32. The system according to claim 30, wherein the overlapping/occluded objects in the histopathology sample comprise lymphocytes and nuclei.

33. The system according to claim 32, wherein the system is capable of resolving segment overlapping/occluded lymphocytes and nuclei in the histopathology sample with at least 90% accuracy.

34. The system according to claim 30, wherein the histology sample is prepared from a patient with a cancer.

35. The system according to claim 34, the cancer is selected from prostate cancer or breast cancer.

36. The system according to claim 24, wherein the hybrid adaptive active model is capable of being implemented through a graphical processing unit (GPU) framework.

37. The system according to claim 36, wherein run time for completion of the segmenting method is in a range of from 70 seconds to 80 seconds.

38. A system according to claim 24, wherein the computing device is capable of classifying the image scene, and is further configured:

(m) to extract from the segmented objects via the computing device, at least one signature feature and computing at least one quantitative signature for the image scene;

(n) to select at least one reference feature in a dataset comprising reference features according to a minimum Redundancy Maximum Relevance (mRMR) feature selection scheme to identify a selected subset of reference features;

(o) to discriminate the at least one quantitative signature feature of the image scene from the selected subset of reference features to identify a class corresponding to the image scene; and (p) to output the class corresponding to the image scene.

39. The system according to claim 38, wherein the at least one signature feature is selected from the group consisting of nuclear morphology, nuclear architecture, nuclear texture, and a combination thereof.

40. The system according to claim 38, wherein the at least one quantitative signature feature is selected from the group consisting of nuclear morphology, nuclear architecture, nuclear texture, and a combination thereof.

41. The system according to claim 38, wherein the class corresponding to the image scene is a grade of the cancer.

42. The system according to claim 41, wherein the grade of the cancer is selected from the group consisting of Gleason grade 1, Gleason grade 2, Gleason grade 3, Gleason grade 4 or Gleason grade 5.

43. The system according to claim 41, wherein the cancer is selected from prostate cancer or breast cancer.

44. The system according to claim 38, wherein run time for completion of the classifying method is within a range of between 70 seconds to 80 seconds.

* * * * *